(12) United States Patent
Aoki

(10) Patent No.: US 10,871,499 B2
(45) Date of Patent: Dec. 22, 2020

(54) REAGENT CARTRIDGE, REAGENT CARTRIDGE SET, AND PATHOLOGICAL SPECIMEN PREPARATION DEVICE

(71) Applicant: SEIKO EPSON CORPORATION, Tokyo (JP)

(72) Inventor: Taro Aoki, Yuzawa (JP)

(73) Assignee: Seiko Epson Corporation (JP)

( * ) Notice: Subject to any disclaimer, the term of this patent is extended or adjusted under 35 U.S.C. 154(b) by 274 days.

(21) Appl. No.: 16/135,610

(22) Filed: Sep. 19, 2018

(65) Prior Publication Data
US 2019/0086434 A1 Mar. 21, 2019

(30) Foreign Application Priority Data

Sep. 20, 2017 (JP) .................................. 2017-179870
Sep. 6, 2018 (JP) .................................. 2018-166986

(51) Int. Cl.
| | | |
|---|---|---|
| G01N 1/00 | (2006.01) | |
| G01N 35/10 | (2006.01) | |
| G01N 1/31 | (2006.01) | |
| B01L 3/00 | (2006.01) | |
| B01L 3/02 | (2006.01) | |

(52) U.S. Cl.
CPC ........ *G01N 35/1002* (2013.01); *B01L 3/0293* (2013.01); *B01L 3/523* (2013.01); *G01N 1/312* (2013.01); *G01N 35/1016* (2013.01); *B01L 3/508* (2013.01); *B01L 2200/026* (2013.01); *B01L 2200/04* (2013.01); *B01L 2200/16* (2013.01); *B01L 2300/0654* (2013.01); *B01L 2400/0616* (2013.01)

(58) Field of Classification Search
None
See application file for complete search history.

(56) References Cited

U.S. PATENT DOCUMENTS

| | | |
|---|---|---|
| 6,045,759 A | 4/2000 | Ford et al. |
| 6,093,574 A | 7/2000 | Druyor-Sanchez et al. |

FOREIGN PATENT DOCUMENTS

| | | |
|---|---|---|
| JP | 2007-283673 A | 11/2007 |
| JP | 2009-002952 A | 1/2009 |
| JP | 2013-230632 A | 11/2013 |

*Primary Examiner* — Jyoti Nagpaul
(74) *Attorney, Agent, or Firm* — Harness, Dickey & Pierce, P.L.C.

(57) ABSTRACT

A reagent cartridge includes a drug solution storage section which has a first window section and a drug solution chamber, a case section which holds the drug solution storage section movably in the negative Z-axis direction and has a second window section and a nozzle section, a spring which biases the drug solution storage section, and a discharge mechanism for discharging a predetermined amount of the drug solution from the nozzle section by the moving motion of the drug solution storage section within a predetermined range.

15 Claims, 26 Drawing Sheets

REAGENT CARTRIDGE, REAGENT CARTRIDGE SET, AND PATHOLOGICAL SPECIMEN PREPARATION DEVICE

BACKGROUND

Technical Field

The present invention relates to a reagent cartridge, a reagent cartridge set, and a pathological specimen preparation device.

Related Art

In the past, a treatment device which automatically performs immunostaining or the like by applying any of various drug solutions containing an antibody or the like to a tissue specimen (biological sample) has been known. In such a treatment device, it is necessary to change various types of drug solutions according to the type of the tissue specimen or the contents of the treatment. For example, JP-A-2009-2952 discloses a fluid dispenser, which is used in an automated bioreactor, and in which a user can fill a reagent solution (drug solution).

However, the fluid dispenser described in JP-A-2009-2952 had a problem that it is difficult to ascertain the residual amount of the drug solution. More specifically, when a user filled the drug solution, a variation sometimes occurred in the amount of the filled drug solution. Even in the case where the residual amount is automatically calculated from the discharged amount of the drug solution and the number of discharges in the bioreactor, there was a fear that small variations in the discharged amount of the drug solution are accumulated, and a gap between the actual residual amount of the drug solution and the calculated value thereof occurs. When it was difficult to ascertain the residual amount of the drug solution in this manner, it was necessary to refill the drug solution or to replace the fluid dispenser in a state where a large amount of the drug solution was left with a new one. Such an operation should be avoided in an intraoperative pathological diagnosis which requires a rapid treatment. That is, a reagent cartridge capable of easily ascertaining the residual amount of a drug solution to be used in a pathological specimen preparation device has been demanded.

SUMMARY

The invention has been made for solving at least a part of the problems described above, and can be implemented as the following forms or application examples.

APPLICATION EXAMPLE

A reagent cartridge according to the invention includes a drug solution storage section which has a light transmissive first window section and a drug solution chamber capable of storing a drug solution, a case section which holds the drug solution storage section movably in a first direction and has a light transmissive second window section, a drug solution flow path, and a nozzle section communicating with the drug solution flow path, a biasing unit which biases the drug solution storage section in a direction opposite to the first direction with respect to the case section, and a discharge mechanism for discharging a predetermined amount of the drug solution stored in the drug solution chamber from the nozzle section by the moving motion of the drug solution storage section in the first direction within a predetermined range, wherein the second window section is provided on a first side face of the case section, and the first window section and the second window section are disposed along a second direction crossing the first direction to form an optical path with respect to the drug solution chamber.

According to this application example, the residual amount of the stored drug solution can be easily ascertained. More specifically, the presence or absence of the drug solution inside the drug solution chamber can be optically confirmed using the optical path from the outside of the reagent cartridge. Therefore, it becomes easy to ascertain the time when the reagent cartridge is to be replaced. That is, a reagent cartridge which is favorable for a pathological specimen preparation device to be used in an intraoperative pathological diagnosis can be provided.

In the reagent cartridge according to the above application example, it is preferred that the drug solution storage section has a constricted section disposed in the first direction, and a protruding section located on the side closer to the tip than the constricted section in the first direction, and the optical path includes the constricted section.

According to this configuration, the optical path is provided at a position of the constricted section which is on the tip side with respect to the nozzle section in the drug solution storage section. Therefore, as compared with the case where the optical path is not provided on the tip side, a state where the residual amount of the drug solution is small can be ascertained. Further, the drug solution storage section has a shape constricted on the tip side (constricted section), and therefore, as compared with the case where the shape thereof is not a constricted shape, a state where the residual amount of the drug solution is smaller can be confirmed. Accordingly, it becomes possible to ascertain a state where the residual amount of the drug solution in the drug solution storage section is small, and thus, the drug solution can be used up until reaching the state, and the dead volume can be reduced.

In the reagent cartridge according to the above application example, it is preferred that a portion of the drug solution chamber is exposed in a direction opposite to the first direction in a state where the drug solution storage section is held in the case section and the drug solution storage section has a light transmissive section having light transmissivity in the portion of the drug solution chamber, and the light transmissive section forms another optical path in parallel to the optical path.

According to this configuration, it is possible to confirm the presence or absence of the drug solution inside the drug solution chamber corresponding to the other optical path formed by the light transmissive section provided in a portion of the drug solution chamber exposed in a direction opposite to the first direction in a state where the drug solution storage section is held in the case section.

In the reagent cartridge according to the above application example, it is preferred that the drug solution storage section has a second drug solution flow path which communicates with the drug solution chamber and is provided inside the protruding section, the second drug solution flow path includes a through-hole which is provided on the tip side in the first direction of the protruding section and passes through from the inner face to the outer face along the first direction of the protruding section, and a bottom section which closes the tip of the protruding section, the discharge mechanism is provided in the drug solution flow path, and includes a stroke chamber in which the protruding section is housed along the first direction, a ring member having elasticity, which is disposed on the drug solution storage section side of the stroke chamber, and on which the outer face of the protruding section is provided slidably in the first direction, a ball chamber which communicates with the stroke chamber, a spherical body which is housed in the ball chamber, and a ball stopper section which is disposed on the opposite side to the stroke chamber with respect to the spherical body of the ball chamber, and the through-hole is sealed by the ring member when the drug solution storage section is held in the case section by being biased in a direction opposite to the first direction with respect to the case section by the biasing unit, and the sealing by the ring member is released and the through-hole faces the stroke chamber when the drug solution storage section moves in the first direction from a state where the drug solution storage section is held in the case section.

According to this configuration, by moving the drug solution storage section in the first direction by one push, a predetermined amount of the drug solution stored in the drug solution storage section (drug solution chamber) can be discharged from the nozzle section through the second drug solution flow path provided in the drug solution storage section and the discharge mechanism provided in the drug solution flow path.

In the reagent cartridge according to the above application example, it is preferred that the ball stopper section is provided attachably to and detachably from the ball chamber.

According to this configuration, the attachable and detachable ball stopper section is attachable and detachable, and therefore, the volume of the drug solution flow path can be changed by replacing the ball stopper section with another one having a different thickness. As a result, the discharged amount of the drug solution to be discharged from the nozzle section by one push for moving the drug solution storage section in the first direction can be changed. In other words, the discharged amount of the drug solution to be discharged by one push can be adjusted according to the type of the drug solution to be used.

In the reagent cartridge according to the above application example, it is preferred that a plurality of ball stopper sections are provided.

According to this configuration, by changing the number of ball stopper sections, the thickness of the ball stopper section can be made variable, and the volume of the drug solution flow path can be changed. As a result, the discharged amount of the drug solution from the nozzle section can be changed.

In the reagent cartridge according to the above application example, it is preferred that the ball stopper section includes an opening section having a circular planar shape, and the center of the circular opening section is located eccentrically with respect to the center of the spherical body housed in the ball chamber.

According to this configuration, the opening section of the ball stopper section cannot be blocked by the spherical body, and therefore, the drug solution can be reliably sent to the nozzle section through the opening section.

In the reagent cartridge according to the above application example, it is preferred that the ball stopper section includes an opening section having a polygonal shape through which the spherical body housed in the ball chamber is not inserted.

According to this configuration, the opening section of the ball stopper section cannot be blocked by the spherical body, and therefore, the drug solution can be reliably sent to the nozzle section through the opening section.

In the reagent cartridge according to the above application example, it is preferred that the drug solution storage section is provided with a scale indicating the volume of the drug solution chamber on the outer face which has light transmissivity and is exposed from the case section.

According to this configuration, the volume of the drug solution remaining in the drug solution chamber of the drug solution storage section can be easily estimated.

In the reagent cartridge according to the above application example, it is preferred that the reagent cartridge has a cartridge lid which can be attached to and detached from the drug solution storage section, and the cartridge lid has a communication hole which communicates with the drug solution chamber.

According to this configuration, the cartridge lid can be attached and detached, and therefore, the drug solution can be stored in the drug solution chamber by detaching the cartridge lid from the drug solution storage section. Further, mixing or contamination with a foreign substance from the outside into the stored drug solution can be prevented. Moreover, the inside and the outside of the drug solution chamber communicate with each other through the communication hole, and therefore, even if the drug solution is discharged so as to reduce the amount of the stored drug solution, negative pressure is hardly generated in the drug solution chamber. Accordingly, the discharge of the drug solution can be promptly performed.

In the reagent cartridge according to the above application example, it is preferred that the cartridge lid is formed integrally with the drug solution storage section.

According to this configuration, the cartridge lid and the drug solution storage section are integrally formed, and therefore, the cartridge lid can be prevented from being lost.

In the reagent cartridge according to the above application example, it is preferred that the case section has a nozzle cap which can be attached so as to cover the nozzle section.

According to this configuration, by attaching the nozzle cap to the nozzle section, contamination of the nozzle section or drying of the drug solution at the tip of the nozzle section can be suppressed during storage of the reagent cartridge or the like.

In the reagent cartridge according to the above application example, it is preferred that the nozzle cap is formed integrally with the case section.

According to this configuration, the nozzle cap and the case section are integrally formed, and therefore, the nozzle cap can be prevented from being lost.

In the reagent cartridge according to the above application example, it is preferred that a locking section is provided on the first side face of the case section or a second side face facing the first side face.

According to this configuration, by using the locking section, the reagent cartridge can be stably attached to a pathological specimen preparation device.

In the reagent cartridge according to the above application example, it is preferred that the locking section and the case section are disposed spaced apart from each other, and a locking projection section is provided on the first side face or the second side face facing the locking section.

According to this configuration, the reagent cartridge can be stably attached to a pathological specimen preparation device by the locking section and the locking projection section provided on the case section so as to face the locking section.

In the reagent cartridge according to the above application example, it is preferred that the predetermined amount is 10 µL or more and 1 mL or less.

According to this configuration, the drug solution in a volume corresponding to the type or size of the tissue specimen (pathological specimen), the type of the drug solution, or the like can be supplied to the tissue specimen.

In the reagent cartridge according to the above application example, it is preferred that the drug solution chamber can store the drug solution in an amount of 1 mL or more and 50 mL or less.

According to this configuration, for example, with respect to a treatment using 200 μL of the drug solution per treatment, the volume for about 250 times at the maximum can be ensured, and also the increase in the size of the reagent cartridge can be suppressed.

In the reagent cartridge according to the above application example, it is preferred that a barcode relating to the information of the drug solution is attached.

According to this configuration, by the barcode, the information on the stored drug solution such as the type, the amount of content, the date of preparation, or the matters to be attended can be found.

In the reagent cartridge according to the above application example, it is preferred that the drug solution is selected from the group consisting of a primary antibody reagent, a secondary antibody reagent, a coloring reagent, a tissue staining reagent, a nuclear staining reagent, an endogenous peroxidase blocking reagent, hematoxylin, a color developing reagent, a reagent for a deparaffinization treatment, a reagent for activation, and a washing solution.

According to this configuration, by using the drug solution to be discharged from the reagent cartridge, an antigen-antibody reaction treatment, a coloring reaction treatment, a deparaffinization treatment, an activation treatment, an endogenous peroxidase (PO) blocking treatment, a washing treatment, or the like can be performed.

APPLICATION EXAMPLE

A reagent cartridge set according to the invention includes two or more types of reagent cartridges according to the above application example.

According to this application example, in treatments such as an antigen-antibody reaction treatment, a coloring reaction treatment, a deparaffinization treatment, an activation treatment, an endogenous peroxidase (PO) blocking treatment, and a washing treatment, two or more types of treatments can be performed.

APPLICATION EXAMPLE

A pathological specimen preparation device according to the invention includes a holding section capable of attaching and detaching the reagent cartridge according to the above application example thereto and therefrom, a stage capable of supporting a substrate having a tissue specimen fixed thereto, and a cartridge operation section capable of supplying the drug solution stored in the reagent cartridge to the substrate supported by the stage, wherein the cartridge operation section has a pusher capable of a reciprocating motion in the first direction, and the pusher comes into contact with the drug solution storage section of the reagent cartridge attached to the holding section by the reciprocating motion in the first direction so as to move the drug solution storage section in the first direction.

According to this application example, the drug solution storage section is moved in the first direction by the pusher and the drug solution is discharged from the nozzle section, so that the drug solution can be supplied to the tissue specimen fixed to the substrate.

In the pathological specimen preparation device according to the above application example, it is preferred that the drug solution storage section has a light transmissive first window section and a light transmissive section in a portion exposed in a direction opposite to the first direction in a state where the drug solution storage section is held in the case section, and the case section has a light transmissive second window section, the first window section and the second window section form an optical path disposed along a second direction crossing the first direction with respect to the drug solution chamber, and the light transmissive section forms another optical path in parallel to the optical path, the device includes an emission section which can emit a light beam onto the optical path and the other optical path, a light receiving section, and an arithmetic section which calculates the luminous quantity of the light beam received by the light receiving section and converts the luminous quantity into an electrical signal, and the emission section and the light receiving section are disposed in a state where the light receiving section can receive the light beam emitted from the emission section.

According to this configuration, the light receiving section receives the light beam emitted from the emission section onto the optical path, and the luminous quantity of the light beam received by the light receiving section is calculated, whereby the presence or absence of the drug solution in the drug solution chamber through which the light beam has passed can be detected. That is, the residual amount of the drug solution in the reagent cartridge can be confirmed.

In the pathological specimen preparation device according to the above application example, it is preferred that the device includes a control unit and a display section, the arithmetic section determines the presence or absence of the drug solution on the optical path or the other optical path through which the light beam has passed from the luminous quantity of the light beam, and the control unit displays the presence or absence of the drug solution on the display section.

According to this configuration, a user of the pathological specimen preparation device can be notified of information such as the presence or absence of the drug solution in the reagent cartridge.

In the pathological specimen preparation device according to the above application example, it is preferred that the arithmetic section emits the light beam from the emission section when the reagent cartridge is attached, and determines the presence or absence of the drug solution on the optical path and the other optical path through which the light beam has passed, and the control unit displays the presence or absence of the drug solution on the display section.

According to this configuration, at the time point when the reagent cartridge is attached, the presence or absence of the drug solution in the reagent cartridge is notified. Therefore, according to the residual amount thereof, it is possible to take measures such as planning of pathological specimen preparation or preparation of a new reagent cartridge.

In the pathological specimen preparation device according to the above application example, it is preferred that the arithmetic section calculates the value of the residual amount of the drug solution from the integrated value of the discharged amount of the drug solution by the cartridge operation section and the presence or absence of the drug solution calculated from the luminous quantity of the light beam, and the control unit displays the value of the residual amount on the display section.

According to this configuration, the value of the residual amount of the drug solution is notified, and therefore, it becomes easy to make a plan for pathological specimen preparation.

In the pathological specimen preparation device according to the above application example, it is preferred that the light beam has a wavelength of 570 nm or more and 750 nm or less.

According to this configuration, a visible light beam in a range from yellow light to red light is emitted. Therefore, since light having a longer wavelength than that of blue light is emitted, the occurrence of denaturation of a component contained in the drug solution, for example, a protein or the like by the incident light can be suppressed. Further, light having a shorter wavelength than the infrared wavelength region is emitted, and therefore, excessive heating of the drug solution by the incident light can be suppressed. In addition, attenuation of the light beam by being absorbed by the molecular structure of a compound contained in the drug solution can be suppressed.

In the pathological specimen preparation device according to the application example, it is preferred that the device includes a barcode reader which reads a barcode relating to the information of the drug solution attached to the reagent cartridge.

According to this configuration, by reading the barcode, the information on the stored drug solution such as the type, the amount of content, the date of preparation, or the matters to be attended can be collected and managed.

In the pathological specimen preparation device according to the above application example, it is preferred that the device includes a washing section which can supply a washing solution to the substrate supported by the stage, an electric field stirring section which can perform stirring by applying an electric field to the drug solution or the washing solution supplied to the substrate supported by the stage, and a stage moving mechanism which can move the stage to the washing section, the electric field stirring section, and the cartridge operation section.

According to this configuration, the tissue specimen fixed to the substrate can be washed using the washing solution. Further, by the electric field stirring, the efficiency of stirring of the drug solution or the washing solution is improved, and a time required for preparing a pathological specimen such as various reaction treatments and a washing operation is reduced. Moreover, by the stage moving mechanism, the substrate is promptly moved to the electric field stirring section, the washing section, and the cartridge operation section. Accordingly, the treatment of the tissue specimen can be rapidly performed.

DETAILED DESCRIPTION

Hereinafter, embodiments of the invention will be described with reference to the drawings. The embodiments described below are for describing examples of the invention. In addition, the invention is not limited to the embodiments below and appropriate modifications are possible without departing from the gist or idea of the invention readable from the appended claims and the entire specification, and a reagent cartridge, a reagent cartridge set, and a pathological specimen preparation device thus modified are also included in the technical scope of the invention. In the following respective drawings, in order to make respective layers and respective members have a recognizable size, the dimensions of the respective layers and the respective members are made different from the actual ones. Further, in the following respective drawings, XYZ axes which are coordinate axes mutually orthogonal to one another are given as needed. In such a case, in the XYZ axes in each drawing, the XY plane is made to coincide with a substantially horizontal plane, and the direction indicated by the Z-axis arrow is assumed to be the direction opposite to the direction of gravity.

First Embodiment

Figure 1:
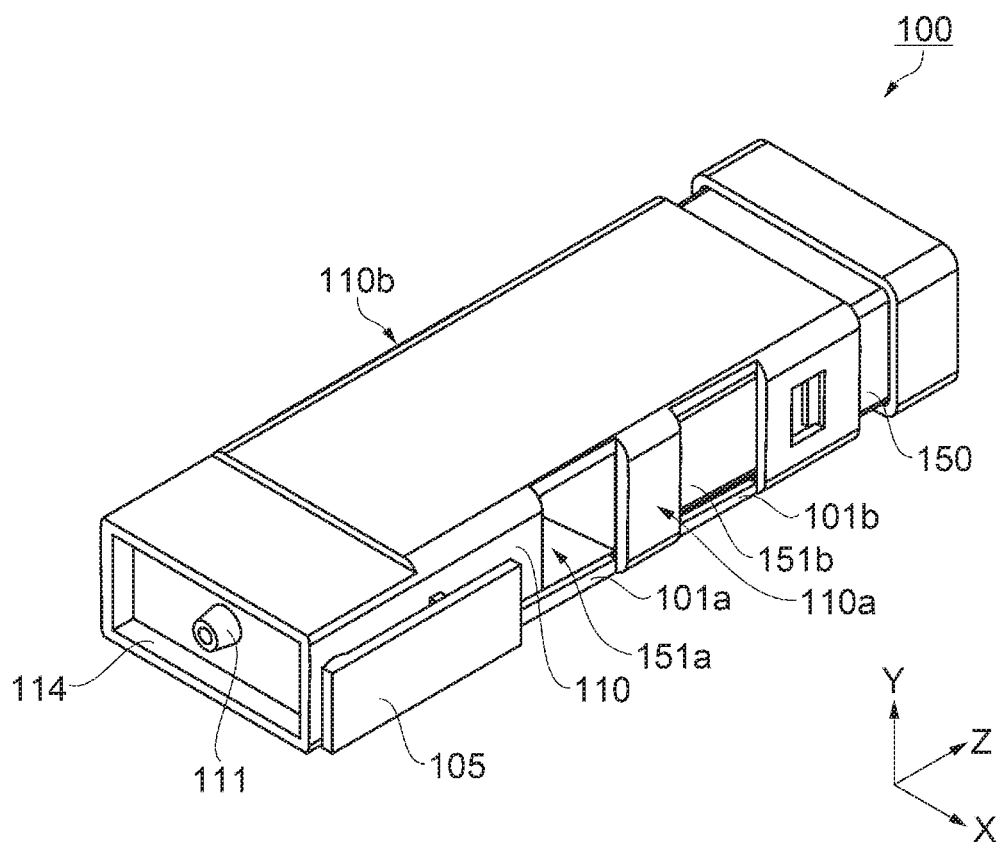
FIG. 1 is a perspective view showing the external appearance of a reagent cartridge according to a first embodiment.

A reagent cartridge and a reagent cartridge set according to a first embodiment will be described.
Reagent Cartridge
External Appearance A schematic structure of a reagent cartridge of a first embodiment will be described with reference to FIGS. 1 to 7. FIG. 1 is a perspective view showing the external appearance of the reagent cartridge according to the first embodiment. FIGS. 2, 3, 4, 5, 6, and 7 are sequentially a front view, a rear view, a right side view, a left side view, a top view, and a bottom view showing the external appearance of the reagent cartridge, respectively. Note that a state shown in FIG. 1 shows a posture in a used state (a posture in use) of each member, each component, and a device. Unless otherwise specified, the following description is made with respect to a posture in use, and for convenience of explanation, the direction indicated by the Z-axis arrow is sometimes referred to as "positive direction" or "upper side", and the direction opposite thereto is sometimes referred to as "negative Z-axis direction" or "lower side".

A reagent cartridge 100 according to the first embodiment shown in FIG. 1 includes a locking section 105 and a case section 110 which has light transmissive first window sections 151a and 151b, a drug solution storage section 150 capable of storing a drug solution, light transmissive second window sections 101a and 101b, and a nozzle section 111, and holds the drug solution storage section 150 movably in the negative Z-axis direction as a first direction. The reagent cartridge 100 can discharge a predetermined amount of the stored drug solution from the nozzle section 111 by the moving motion of the drug solution storage section 150 in the negative Z-axis direction in a predetermined range.

The reagent cartridge 100 is a substantially rectangular parallelepiped body, and the case section 110 which is a main exterior component of the reagent cartridge 100 is also a substantially rectangular parallelepiped body. Among the six faces having a substantially rectangular shape constituting the reagent cartridge 100, faces facing each other in the Z-axis direction are referred to as "upper face" (face on the upper side) and "bottom face" (face on the lower side), side faces facing each other in the Y-axis direction are referred to as "front face" and "rear face", and faces facing each other in the X-axis direction as a second direction crossing the Z-axis direction are referred to as "right side face 110a" and "left side face 110b". Therefore, in the reagent cartridge 100, the substantially rectangular areas constituting the front face and the rear face are the largest, the areas of the left and right side faces 110b and 110a are the second largest, and the areas of the upper face and the bottom face are the smallest. Here, among the above-mentioned six faces having a substantially rectangular shape, the upper face is constituted by the drug solution storage section 150 protruding from the case section 110, and the other faces are constituted by the case section 110. That is, a portion on the upper side of the drug solution storage section 150 housed in the case section 110 is exposed from the case section 110. The second window sections 101a and 101b are provided on the right side face 110a as a first side face of the case section 110.

In the case section 110 (reagent cartridge 100), a face where the second window sections 101a and 101b are located on the right side is determined to be "front face". On the bottom face of the case section 110 (reagent cartridge 100), the nozzle section 111 is provided. On the outer edge of the bottom face of the case section 110, a rib 114 is provided. The base portion of the nozzle section 111 and the base portion of the rib 114 are on the same plane, and the nozzle section 111 is surrounded by the rib 114. Therefore, by the rib 114, the nozzle section 111 is protected from collision or the like. Further, the nozzle section 111 is formed protruding from the bottom face of the case section 110, and therefore, when the drug solution is discharged, the liquid draining is improved, and the drug solution is prevented from going around the nozzle section 111 and adhering thereto.

Figure 2:
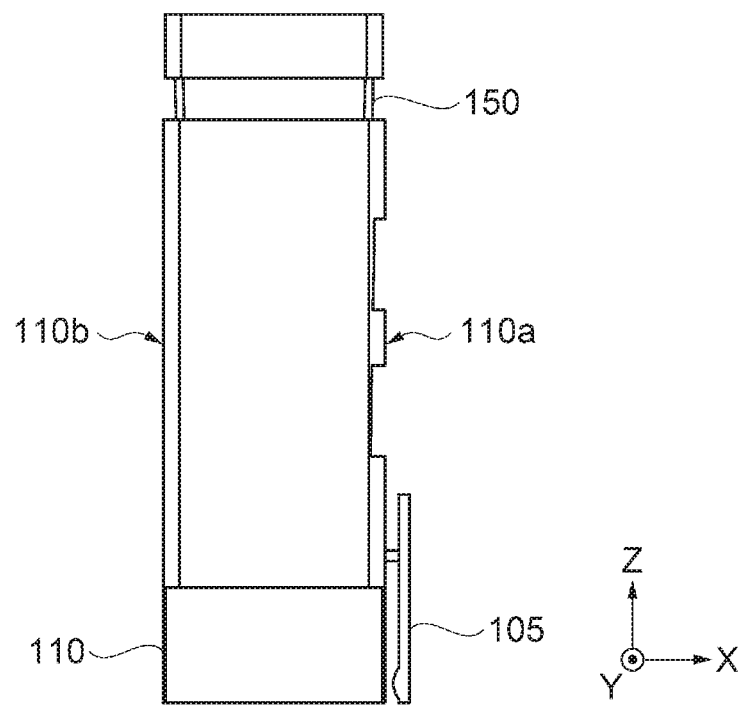
FIG. 2 is a front view showing the external appearance of the reagent cartridge.
Figure 3:
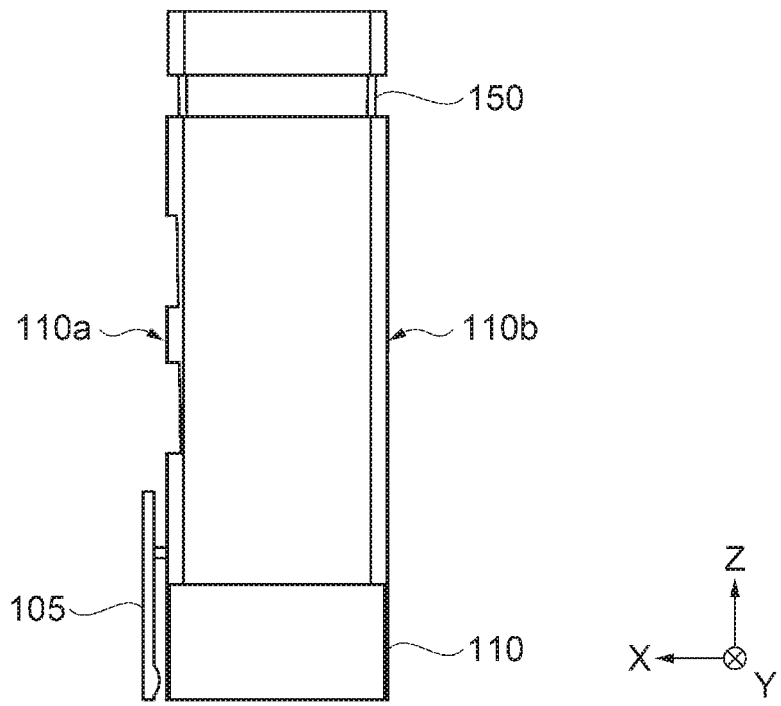
FIG. 3 is a rear view showing the external appearance of the reagent cartridge.

As shown in FIG. 2 (front view) and FIG. 3 (rear view), on the right side face 110a of the case section 110, the locking section 105 is provided. The locking section 105 is supported by the case section 110 slightly protruding in the positive X-axis direction from the right side face 110a of the case section 110 and extends downward. When viewed from the Y-axis direction, about a 2-mm gap is provided between the locking section 105 and the right side face 110a of the case section 110. This gap opens downward, and therefore, when the reagent cartridge is held in the below-mentioned pathological specimen preparation device 300 (see FIG. 25), by inserting a holding section or the like provided in the pathological specimen preparation device 300 into the gap, the case section 110 is locked. A lower end portion of the locking section 105 may be molded into a rib-like shape by slightly narrowing the gap so that the locking section hardly comes off from the holding section. In this embodiment, an example in which the locking section 105 is provided on the right side face 110a of the case section 110 is shown, however, the invention is not limited thereto. The locking section 105 may be provided on the left side face 110b (the face on the left side when facing FIG. 2) as the second side face facing the right side face 110a of the case section 110 according to the specification of the below-mentioned pathological specimen preparation device 300, or the like.

Figure 4:
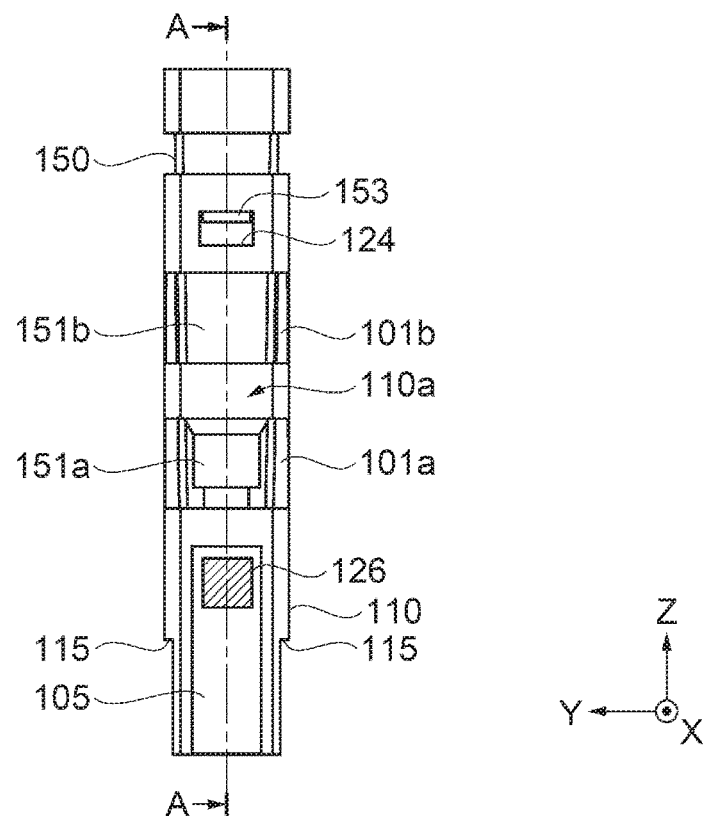
FIG. 4 is a right side view showing the external appearance of the reagent cartridge.

As shown in FIG. 4 (right side view), on the right side face 110a (first side face) on the right side when facing the front face of the case section 110, two second window sections 101a and 101b are provided spaced apart from each other in the middle of the Z-axis direction. The second window sections 101a and 101b are substantially rectangular openings. It is possible to face the first window sections 151a and 151b of the drug solution storage section 150 housed in the case section 110 through the second window sections 101a and 101b, respectively. The second window sections 101a and 101b are not limited to the openings, and may be covered with a forming material having light transmissivity. Further, the shape of the second window sections 101a and 101b is not limited to a substantially rectangular shape, and may be a circular shape, a polygonal shape, or the like.

On the right side face 110a of the case section 110, an opening section 124 having a substantially rectangular shape is provided on the upper side of the second window section 110b. In the drug solution storage section 150, a locking convex section 153 is provided at a position corresponding to the opening section 124. The locking convex section 153 is formed into a convex shape protruding in the X-axis direction, and therefore, when the drug solution storage section 150 is housed in the case section 110, the opening section 124 and the locking convex section 153 are fitted to each other.

On the face facing the positive X-axis direction of the locking section 105, a barcode 126 relating to the information of the drug solution stored in the reagent cartridge 100 is attached. According to this, information such as the type of the drug solution, the amount of content, the date of preparation, or the matters to be attended can be held on the reagent cartridge 100. The form of the barcode 126 is not particularly limited, and any of a one-dimensional code and a two-dimensional code such as a data matrix or a QR code (registered trademark) can be applied.

Figure 5:
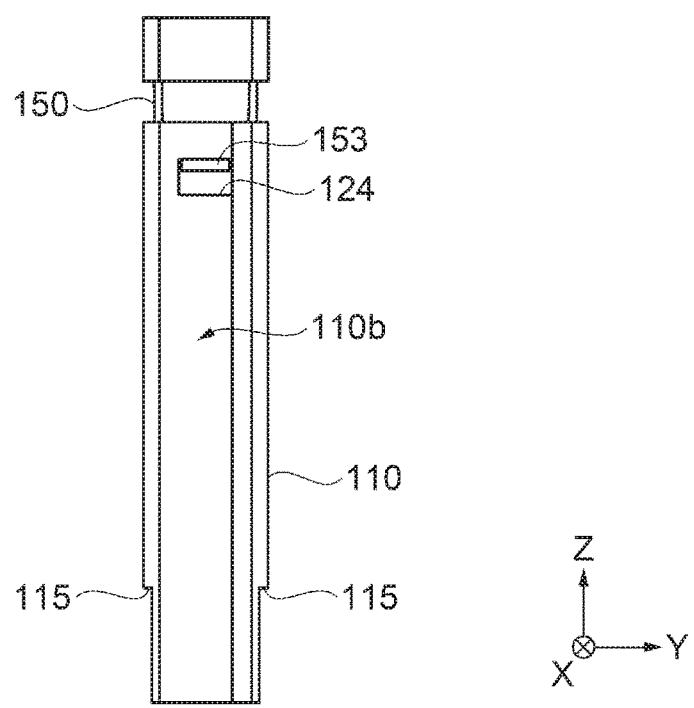
FIG. 5 is a left side view showing the external appearance of the reagent cartridge.

As shown in FIG. 5 (left side view), on the left side face 110b (the face on the left side when facing FIG. 2) facing the right side face 110a of the case section 110, in the same manner as the right side face 110a, the opening section 124 having a substantially rectangular shape is provided, and on the left side face of the drug solution storage section 150, a locking convex section 153 having a convex shape protruding in the X-axis direction is provided at a position corresponding to the opening section 124. Also on the left side face 110b side, when the drug solution storage section 150 is housed in the case section 110, the opening section 124 and the locking convex section 153 are fitted to each other. In this manner, on the right side face 110a and the left side face 110b, by fitting the opening section 124 and the locking convex section 153 to each other, when the drug solution storage section 150 in which the drug solution is stored is housed in the case section 110, the drug solution storage section 150 is hardly detached from the case section 110. In other words, the drug solution storage section 150 cannot be easily pulled out from the case section 110.

As shown in the left and right side views of FIGS. 4 and 5, on the lower side of the front face and the rear face of the case section 110, a step 115 is provided. Therefore, the thickness in the Y-axis direction of the case section 110 on the lower side (bottom face side) is slightly smaller than on the upper side (upper face side). The step 115 is provided for improving holding stability when the reagent cartridge is held by the holding section of the below-mentioned pathological specimen preparation device 300 (see FIG. 25) along with the above-mentioned locking section 105.

Figure 6:
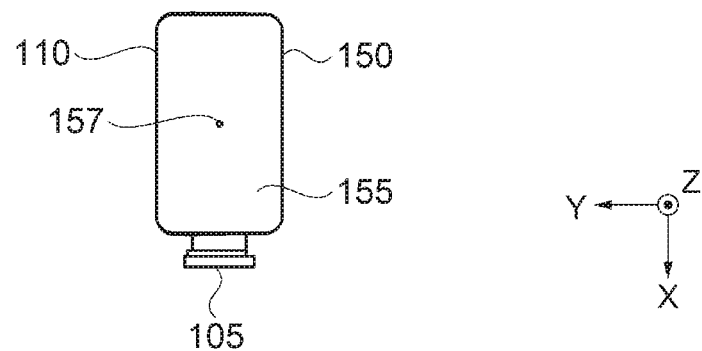
FIG. 6 is a top view showing the external appearance of the reagent cartridge.

As shown in FIG. 6 (top view), the reagent cartridge 100 has a cartridge lid 155 which can be attached to and detached from the drug solution storage section 150, and the cartridge lid 155 has a communication hole 157 which communicates with the below-mentioned drug solution chamber 160 (see FIG. 8). The communication hole 157 is a substantially circular opening and allows the inside and the outside of the drug solution storage section 150 to communicate with each other.

Therefore, in the drug solution chamber 160, by the cartridge lid 155, mixing or contamination with a foreign substance from the outside into the stored drug solution can be suppressed. Further, the inside (the drug solution chamber 160) and the outside of the drug solution storage section 150 communicate with each other through the communication hole 157, and therefore, even if the drug solution is discharged so as to reduce the amount of the stored drug solution, negative pressure is hardly generated in the drug solution storage section 150. Accordingly, the discharge of the drug solution can be promptly performed. The shape of the opening of the communication hole 157, and the number and arrangement of the communication holes 157 are not particularly limited. Further, an air-permeable waterproof film may be provided on the opening of the communication hole 157 so as to prevent mixing with moisture (liquid). Alternatively, when the drug solution stored in the drug solution storage section 150 is in an unused state, the communication hole 157 may be blocked by covering the upper face (cartridge lid 155) thereof with a film or the like.

Figure 7:
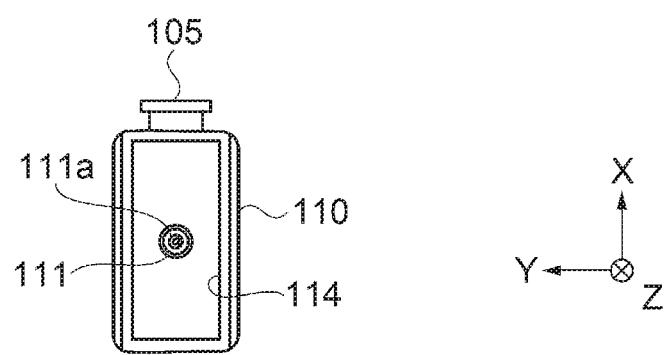
FIG. 7 is a bottom view showing the external appearance of the reagent cartridge.

As shown in FIG. 7 (bottom view), the nozzle section 111 is formed facing the negative Z-axis direction on the bottom face of the case section 110. On the bottom face of the case section 110, the nozzle section 111 is disposed approximately on the central side in the Y-axis direction and the X-axis direction. At the tip of the nozzle section 111, an opening section 111a having a cylindrical inner face and an inner diameter of about 2.0 mm is provided for discharging the drug solution stored in the reagent cartridge 100. In the reagent cartridge 100 of this embodiment, the discharged amount of the drug solution to be discharged from the nozzle section 111 by one discharge is very small, and therefore, the liquid draining from the nozzle section 111 is important, and in order to further improve the draining of the drug solution, the bottom face of the case section 110 surrounding the opening section 111a of the nozzle section 111 is preferably subjected to a liquid repellent treatment.

Internal Structure

The internal structure of the reagent cartridge 100 will be described with reference to FIG. 8. FIG. 8 is a cross-sectional view taken along the line A-A in FIG. 4. The line A-A is a line segment extending in the Z-axis direction.

Figure 8:
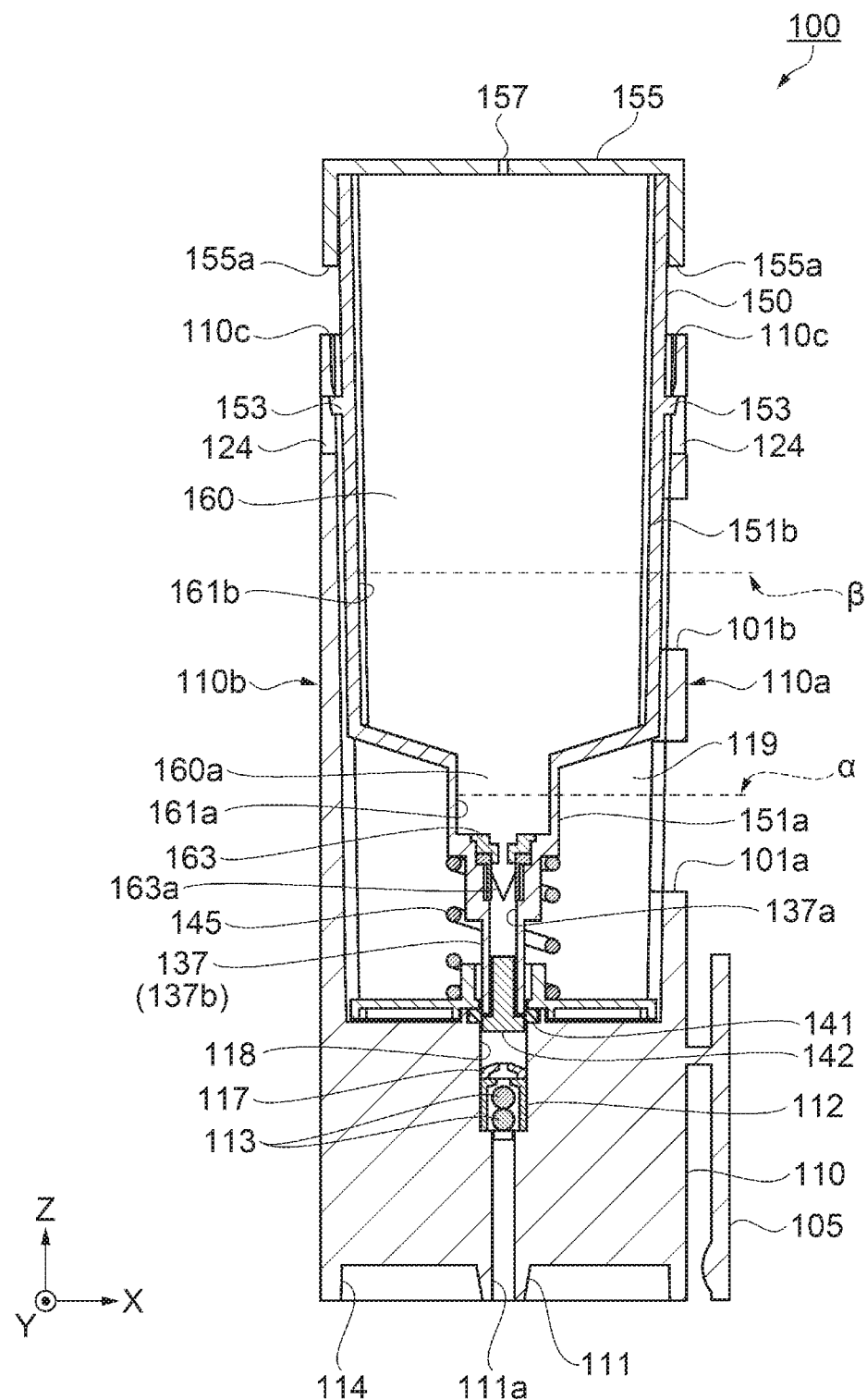
FIG. 8 is a cross-sectional view taken along the line A-A in FIG. 4.

As shown in FIG. 8, the reagent cartridge 100 is formed by inserting (housing) the drug solution storage section 150 having a drug solution chamber 160 which can store the drug solution into a housing section 119 of the case section 110. The drug solution storage section 150 includes the drug solution chamber 160 which communicates with the communication hole 157 on the upper side inside.

The drug solution chamber 160 has a constricted section 160a on the tip side on the lower side (the negative Z-axis direction as the first direction). The width in the X-axis direction and the length in the Z-axis direction of the constricted section 160a are about one-third and about one-seventh those of the drug solution chamber 160 other than the constricted section 160a, respectively.

It is preferred that the drug solution chamber 160 can store the drug solution in an amount of 1 mL (milliliter) or more and 50 mL or less. According to this, for example, with respect to a treatment using 200 μL of the drug solution per treatment, the volume for about 250 times at the maximum can be ensured, and also the increase in the size of the reagent cartridge 100 can be suppressed. In the reagent cartridge 100 of this embodiment, the drug solution in an amount of 30 mL at the maximum can be stored in the drug solution chamber 160. Further, the volume of the constricted section 160a in the drug solution chamber 160 is about 1 mL.

The drug solution to be stored in the drug solution chamber 160 (reagent cartridge 100) is a reagent to be used in a method for preparing a tissue specimen (pathological specimen) by an immunohistochemical staining (immunohistochemistry: IHC) method or an in situ hybridization (ISH) method for observing the expression level of a gene in a biological tissue or a cell, and is one type selected from the group consisting of a primary antibody reagent, a secondary antibody reagent, a coloring reagent, a tissue staining reagent, a nuclear staining reagent, an endogenous peroxidase blocking reagent, hematoxylin, a color developing reagent, a reagent for a deparaffinization treatment, a reagent for activation, a washing solution, and the like.

The reagent cartridges 100 storing these drug solutions may be used as a reagent cartridge set including two or more types of reagent cartridges. By configuring a reagent cartridge set, in treatments such as an antigen-antibody reaction treatment, a coloring reaction treatment, a deparaffinization treatment, an activation treatment, an endogenous peroxidase (PO) blocking treatment, and a washing treatment, two or more types of treatments can be performed.

Specific examples of the drug solution include, but are not particularly limited to, a primary antibody reagent such as Hep-parl, a secondary antibody reagent such as EnVision+ Dual Link (Dako, Inc.), a linker reagent such as HQ linker (Roche Diagnostics K.K.), a coloring reagent or a tissue staining reagent such as 3,3'-diaminobenzidine (DAB), 3-amino-9-ethylcarbazole (AEC), or 3,3',5,5'-tetramethylbenzidine (TMB), a nuclear staining (counter staining) reagent such as hematoxylin, an endogenous peroxidase (PO) blocking reagent such as an aqueous hydrogen peroxide solution, a blocking reagent for a substrate such as bovine albumin, skim milk, or gelatin, a reagent for a deparaffinization treatment, a reagent for activation, and a washing solution such as pure water, phosphate-buffered saline (PBS), PBS containing a nonionic surfactant Tween 20 (PBS-T) having a blocking action and Tris-buffered saline (TBS), and an oil for prevention of reagent evaporation (liquid paraffin), and the drug solution is preferably one type selected from the group consisting of these solutions. The oil for prevention of evaporation (liquid paraffin) can prevent evaporation of an activation solution due to heating by, for example, coating a reagent for activation with the oil. Further, the oil for prevention of evaporation (liquid paraffin) can prevent evaporation of an antibody in an antigen-antibody reaction step. By storing such a drug solution, the reagent cartridge 100 can be used in any of a variety of treatments for preparing a pathological specimen such as an antigen-antibody reaction treatment, a coloring reaction treatment, an endogenous peroxidase (PO) blocking treatment, a deparaffinization treatment, an activation treatment, and washing.

In the drug solution chamber 160 (reagent cartridge 100), other than the above-mentioned reagents, a liquid to be used for preparing a tissue specimen may be stored. Examples of such a liquid include liquids for treatments such as liquid paraffin, ethanol, and xylene.

The case section 110 has a ball chamber 112 having a cylindrical inner face on the upper side of the opening section 111a having a cylindrical inner face. The upper face of the ball chamber 112 communicates with an opening 117b of the below-mentioned contact section 117. In the ball chamber 112, two balls 113, each of which is a spherical body having a diameter of about 2.0 mm, are inserted vertically side by side in the Z-axis direction. The height (the size in the Z-axis direction) of the ball chamber 112 is formed slightly larger than twice the diameter of the ball 113, and the inner diameter of the ball chamber 112 is slightly larger than the diameter of the ball 113. Therefore, the two balls 113 can move vertically inside the ball chamber 112.

The diameter of the ball 113 is larger than the inner diameter of the opening section 111a of the nozzle section 111, and therefore, the ball 113 does not entirely sink in the opening section 111a. As the forming material of the ball 113, a forming material which has a smaller density than that of the drug solution to be stored in the reagent cartridge 100, is not affected by the drug solution, and does not contaminate the drug solution is used. As such a forming material, a resin such as polyethylene or polypropylene is exemplified. According to this, the ball 113 floats upward (in the positive Z-axis direction) in the drug solution. The number of balls 113 to be inserted into the ball chamber 112 is not limited to 2, and may be 1 or 3 or more.

On the upper face of the ball chamber 112, the contact section 117 is provided. The contact section 117 has a disk shape with a raised central portion and is provided with an opening to serve as a drug solution flow path at the center. The contact section 117 is formed of a flexible member, for example, a rubber member. On the upper side of the contact section 117, a stroke chamber 118 having a cylindrical inner face is provided. Here, the case section 110 has a drug solution flow path including the ball chamber 112 and the stroke chamber 118.

On the lower side of the constricted section 160a of the drug solution storage section 150 (drug solution chamber 160), a protruding section 137 is provided. The protruding section 137 has a second drug solution flow path which has a cylindrical inner face 137a and communicates with the drug solution chamber 160 through a valve 163 with a movable section 163a. The valve 163 is fused to a wall portion of the drug solution chamber 160 using, for example, a thermal fusion method, an ultrasonic fusion method, or the like. This thermal fusion can be achieved by being performed at, for example, 4 sites along the outer periphery of the valve 163. On the inside of the tip of the protruding section 137, a cap 142 is inserted. The protruding section 137 including the cap 142 is inserted into the stroke chamber 118 of the case section 110.

The inner face 137a of the protruding section 137 of the drug solution storage section 150, the stroke chamber 118, the ball chamber 112, and the nozzle section 111 of the case section 110 have different inner diameters, but are disposed so that the center lines thereof substantially coincide with the center line of the opening section 111a. The stroke chamber 118, the ball chamber 112, and the opening section 111a from the inner face of the protruding section 137 form a drug solution path from the drug solution chamber 160 to the nozzle section 111.

A coil-shaped spring 145 is disposed so as to go around a cylindrical outer face 137b of the protruding section 137. One end of the spring 145 is in contact with the periphery of the case section 110 where the protruding section 137 is inserted and the other end of the spring 145 is in contact with the base portion of the protruding section 137.

The spring 145 is a biasing unit which biases the drug solution storage section 150 in the positive Z-axis direction (upward) with respect to the case section 110. Therefore, the drug solution storage section 150 is biased upward in the housing section 119, however, by the locking of the locking convex section 153 and the upper edge of the opening section 124, the detachment of the drug solution storage section 150 from the case section 110 is suppressed. FIG. 8 shows a state where the drug solution storage section 150 is not pushed downward. Such a state is referred to as "initial state". When the drug solution storage section 150 is pushed in the negative Z-axis direction (downward) against the biasing force of the spring 145, the drug solution storage section 150 moves downward in the housing section 119. In conjunction with this, the protruding section 137 moves downward in the stroke chamber 118.

The downward movement of the drug solution storage section 150 is possible until a contact section 155a on the outer edge of the cartridge lid 155 and a contact section 110c of the edge of the upper face of the case section 110 come into contact with each other. In other words, by the contact of the contact section 155a with the contact section 110c, the downward movement of the drug solution storage section 150 is regulated. According to such a configuration, the drug solution storage section 150 can reciprocate in the housing section 119 in the positive and negative Z-axis direction from the locking position of the locking convex section 153 and the opening section 124 to the contact position of the contact section 155a and the contact section 110c. The moving distance in the positive and negative Z-axis direction of the drug solution storage section 150 is referred to as "stroke".

On the inside of the left side face 110b of the constricted section 160a, a reflection section 161a is provided facing the second window section 101a in the X-axis direction through the drug solution chamber 160 (constricted section 160a). On the inside of the left side face 110b side of the drug solution chamber 160, a reflection section 161b is provided facing the second window section 101b in the X-axis direction (second direction) through the drug solution chamber 160.

The reflection sections 161a and 161b have a property of reflecting a light beam having a predetermined wavelength and preferably have a reflectance such that they reflect 30% or more of the light beam having a predetermined wavelength. The first window sections 151a and 151b have light transmissivity. Here, the "light transmissivity" as used herein refers to having a light transmittance of 70% or more with respect to the light beam having a predetermined wavelength. The light beam having a predetermined wavelength is not particularly limited, however, examples thereof include a light beam having a wavelength of 570 nm or more and 750 nm or less. In the case where the forming material of the drug solution chamber 160 has the above-mentioned reflectance with respect to the predetermined wavelength, the reflection sections 161a and 161b may not be provided.

The drug solution storage section 150 (first window sections 151a and 151b) may be formed of a forming material having the above-mentioned reflectance and light transmissivity. Such a forming material is not particularly limited, however, for example, a resin such as polyethylene or polypropylene is exemplified. Such a forming material may be visually transparent or semi-transparent. Further, as the forming material of the reflection sections 161a and 161b, a thin film of a metal, a metal oxide, etc., a metal plate, or the like may be used.

The second window section 101a, the first window section 151a, the inside of the drug solution chamber 160 (constricted section 160a), and the reflection section 161a are disposed along the X-axis direction and form a first optical path a as an optical path. That is, the first optical path α as an optical path includes the constricted section 160a. Further, the second window section 101b, the first window section 151b, the inside of the drug solution chamber 160, and the reflection section 161b are disposed along the X-axis direction and form a second optical path β as the second optical path. Therefore, in the reagent cartridge 100, the optical path includes the first optical path α and the second optical path β.

When a light beam having a predetermined wavelength is irradiated onto the first optical path α and the second optical path β from the negative X-axis direction, the light beam is incident from the second window sections 101a and 101b and reaches the reflection sections 161a and 161b through the first window sections 151a and 151b and the inside of the drug solution chamber 160. Subsequently, the light beam is reflected by the reflection sections 161a and 161b, and thereafter travels through the first optical path α and the second optical path β in the positive X-axis direction and is emitted from the second window sections 101a and 101b. At this time, when the drug solution is present on the first optical path α and the second optical path β inside the drug solution chamber 160, the luminous quantity of the emitted light beam is attenuated with respect to the irradiated light beam. Therefore, by detecting the attenuation of this luminous quantity, the presence or absence of the drug solution on the first optical path α and the second optical path β can be confirmed.

The first optical path α is set at a position (Z-axis direction) where the "absence of the drug solution" is detected when the residual amount of the drug solution in the drug solution chamber 160 is below 800 μL (microliters). According to this, in the case where a drug solution which has a short pot life such as DAB and is difficult to refill the reagent cartridge 100 therewith is used, a dead volume is reduced, and the drug solution can be effectively used.

The second optical path β is set at a position where the "absence of the drug solution" is detected when the residual amount of the drug solution in the drug solution chamber 160 is below 10 mL to 15 mL. Then, in the below-mentioned pathological specimen preparation device 300 (see FIGS. 25 and 26), the calculated value of the residual amount is determined from the amount of the drug solution filled in the reagent cartridge 100 and the consumed amount of the drug solution calculated from the discharged amount of the drug solution and the number of discharges, and may be collated with the detection result of the "absence of the drug solution" on the second optical path β. By doing this, the calculated value of the consumed amount of the drug solution is corrected, and the consumed amount of the drug solution thereafter may be estimated. The position (Z-axis direction) of the second optical path β is not limited to the above-mentioned position. Further, the number of optical paths is not limited to two, and may be set to one or three or more.

The second window sections 101a and 101b and the first window sections 151a and 151b may be formed of a material having a high visible light transmittance, so that the presence or absence of the drug solution may be made confirmable by visual observation in addition to the optical detection using the light beam described above.

Drug Solution Path

Figure 9A:
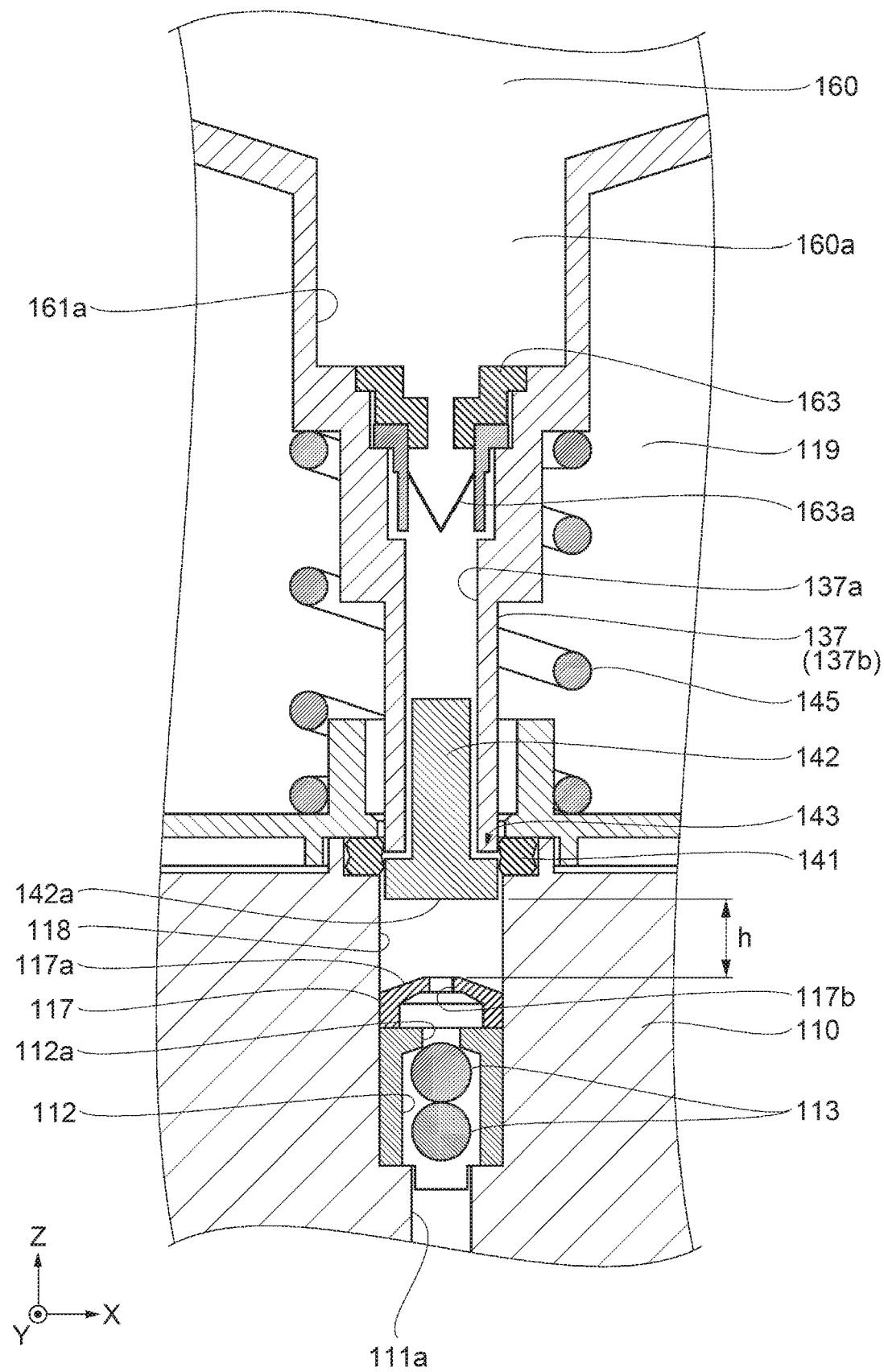
FIG. 9A is a cross-sectional view showing a drug solution path around a cap.
Figure 9B:
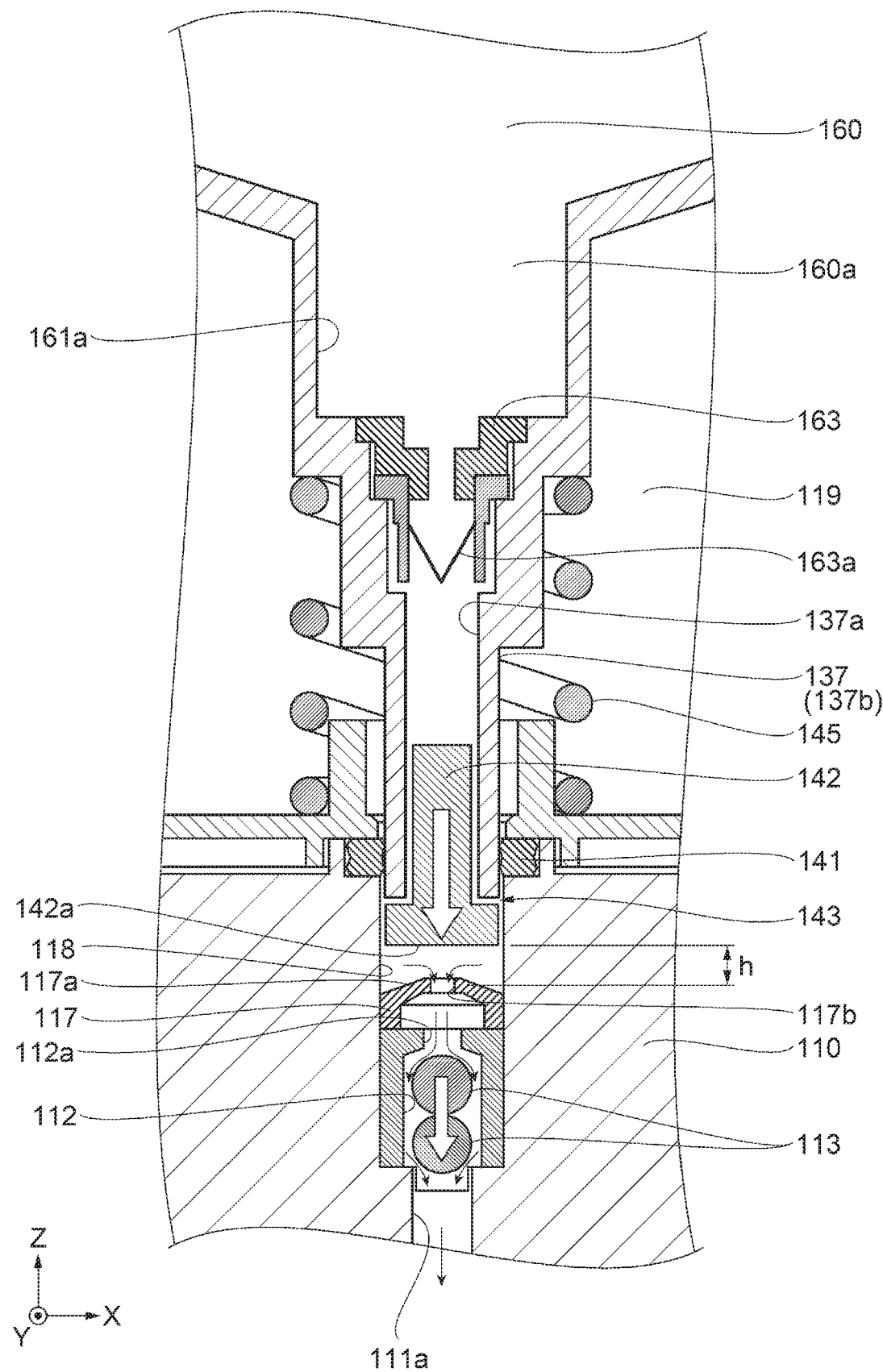
FIG. 9B is a cross-sectional view showing the drug solution path around the cap.
Figure 9C:
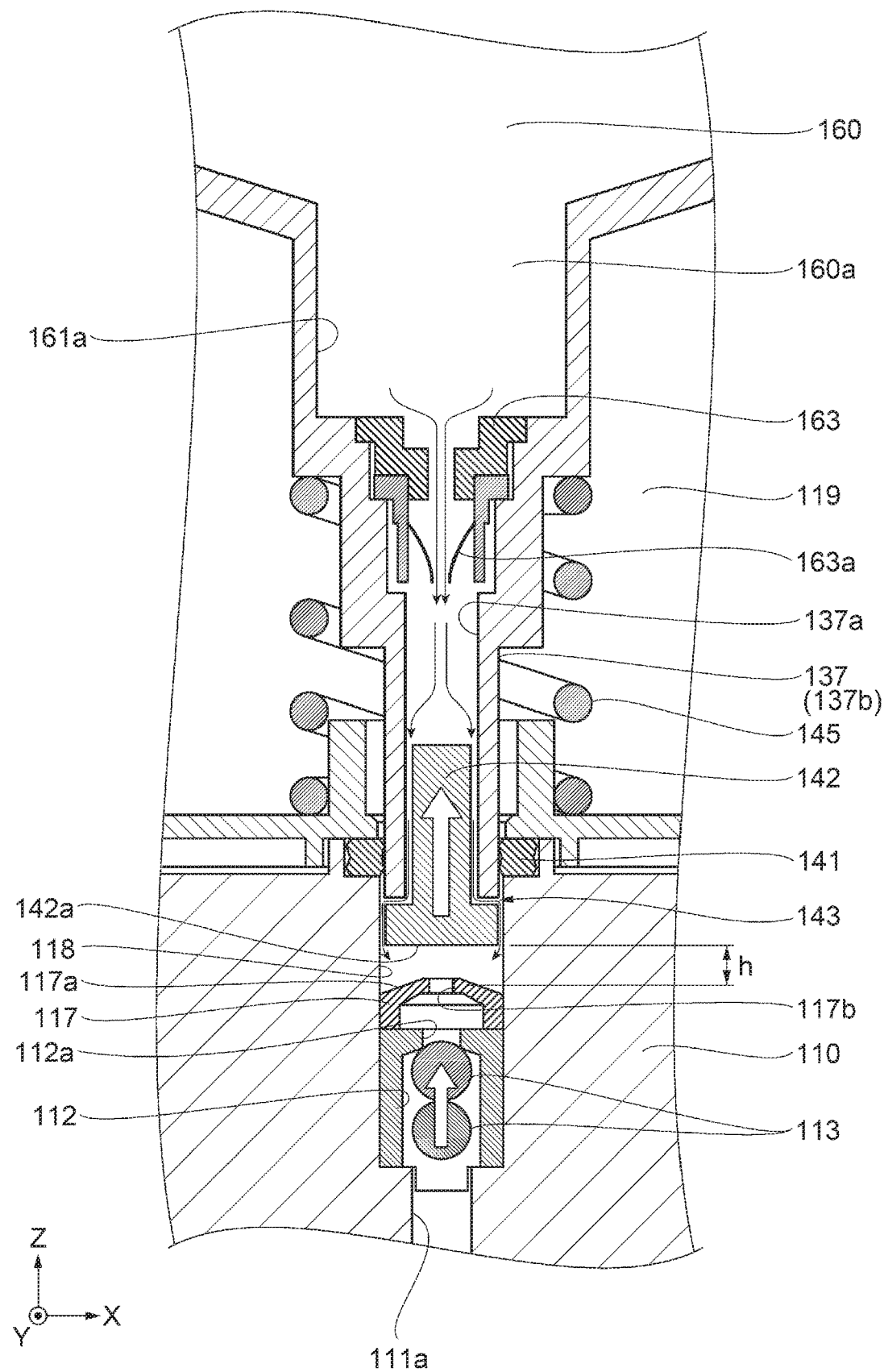
FIG. 9C is a cross-sectional view showing the drug solution path around the cap.

A drug solution path when the drug solution is discharged will be described with reference to FIGS. 9A, 9B, and 9C. FIGS. 9A to 9C are cross-sectional views each showing a drug solution path around the cap.

In FIG. 9A, the surroundings of the cap 142 in the initial state in the same manner as in FIG. 8 are enlarged and shown. As shown in FIG. 9A, a gap is provided between the inner face 137a of the protruding section 137 and the cap 142 inserted into the protruding section 137. This gap communicates with a supply port 143 in an end portion of the protruding section 137.

On the upper side of the stroke chamber 118 into which the protruding section 137 is inserted, an O-ring 141 as the ring member having elasticity is disposed. The O-ring 141 has a function to prevent the leakage of the drug solution between the case section 110 and the outer face 137b by being closely adhered to the outer face 137b of the protruding section 137. In other words, the O-ring 141 is provided so that the outer face 137b of the protruding section 137 can slide in the first direction. Further, in the initial state, the supply port 143 is sealed by the O-ring 141. According to this, the drug solution path from the drug solution chamber 160 to the opening section 111a is blocked by the supply port 143, and therefore, in the initial state, the drug solution does not flow out to the stroke chamber 118 from the drug solution chamber 160 through the supply port 143. Further, the O-ring 141 is configured to be a so-called X-shaped ring (X-ring) which has a substantially rectangular cross-sectional shape, and in which a central portion of each of an inner face and an outer face is recessed. By using the O-ring 141 having such a configuration, the contact area of the outer face 137b of the protruding section 137 can be decreased, and the slidability of the protruding section 137 can be improved while maintaining the adhesion to the protruding section 137 (sealability).

The ball chamber 112 has an opening section 112a which communicates with the opening 117b of the contact section 117 on the upper face. The ball 113 has a diameter larger than the inner diameter of the opening section 112a, and therefore has a function to block the opening section 112a when a portion of the ball 113 sinks in the opening section 112a. As described above, the ball 113 floats in the drug solution, and therefore, when the drug solution is present between the ball chamber 112 and the opening section 111a and the ball 113 is in a stationary state, a portion of the ball 113 on the upper side blocks the opening section 112a, and thereby dripping of the drug solution from the nozzle section 111 is suppressed.

A distance h between the lower face 142a of the cap 142 and the upper face 117a of the contact section 117 is equal to the above-mentioned stroke (the moving distance in the positive and negative Z-axis direction of the drug solution storage section 150). That is, when the drug solution storage section 150 is pushed downward once, the drug solution in an amount (predetermined amount) equal to the volume obtained by multiplying the internal cross-sectional area of the stroke chamber 118 by the distance h is discharged from the nozzle section 111. The predetermined amount can be adjusted mainly by changing the stroke, and is preferably 10 µL or more and 1 mL or less. According to this, the drug solution in a volume corresponding to the type or size of the tissue specimen (pathological specimen), the type of the drug solution, or the like can be discharged. In this embodiment, the above-mentioned predetermined amount of discharge per push is set to 50 µL.

On the cylindrical inner face of the valve 163, the movable section 163a is provided. The movable section 163a is a pair of films having flexibility and is, for example, formed of a material such as rubber. The pair of films (movable section 163a) is disposed such that the distance between the films gradually decreases toward the protruding section 137 and the tips thereof on the protruding section 137 side are closely adhered to each other. Therefore, in the initial state, the drug solution chamber 160 and the inside of the protruding section 137 are separated by the movable section 163a.

The movable section 163a has flexibility, and therefore, the pair of films is bent according to the internal pressure difference between the drug solution chamber 160 and the inside of the protruding section 137, and the movable section 163a can move so as to release the adhesion of the tips thereof. More specifically, when the internal pressure of the inside of the protruding section 137 is lower than the internal pressure of the drug solution chamber 160, that is, when the internal pressure of the protruding section 137 becomes negative, the adhesion is released and the drug solution chamber 160 and the inside of the protruding section 137 communicate with each other. Note that in addition to the initial state, also in the case where the internal pressure of the protruding section 137 is positive, the adhesion of the tips is not released.

FIG. 9B shows a state where the drug solution storage section 150 is pushed downward. Such a state is referred to as "discharge state". As shown in FIG. 9B, when the drug solution storage section 150 is pushed downward with respect to the case section 110, the protruding section 137 moves downward in the stroke chamber 118 as compared with the initial state.

At this time, the internal volume of the stroke chamber 118 is compressed, and therefore, positive pressure is generated. By the positive pressure, the ball 113 is pushed downward, and the blocking of the opening section 112a by the ball 113 is released, and the drug solution is discharged from the nozzle section 111 (see FIG. 8). At the same time, by the downward movement of the protruding section 137, the blocking of the supply port 143 by the O-ring 141 is also released. Further, since the internal pressure of the protruding section 137 does not become negative, the movable section 163a of the valve 163 is maintained in a state where the pair of films is closely adhered to each other.

The gap between the inner face 137a of the protruding section 137 and the cap 142, the supply port 143, and the like are narrower than the drug solution path downstream of the stroke chamber 118, and therefore, function as communication holes so as to prevent the generation of negative pressure in the stroke chamber 118 in the discharge state. Further, also in the discharge state, the O-ring 141 and the outer face 137b of the protruding section 137 are closely adhered to each other so as to maintain airtightness, and thus, the drug solution is prevented from moving along the outer face 137b and leaking out to the housing section 119.

FIG. 9C shows a state in the middle of returning from the discharge state to the initial state after completion of discharge of the drug solution. More specifically, when the lower face 142a of the cap 142 and the upper face 117a of the contact section 117 come into contact with each other to complete downward pushing of the drug solution storage section 150, the drug solution storage section 150 moves upward by the biasing force of the spring 145. In conjunction with this, the protruding section 137 also moves upward in the stroke chamber 118. At this time, negative pressure is generated in the stroke chamber 118, and therefore, the ball 113 is sucked up and blocks the opening section 112a again. Due to this, the discharge of the drug solution from the nozzle section 111 is stopped.

On the other hand, the supply port 143 is opened, and therefore, the drug solution inside the protruding section 137 is supplied to the stroke chamber 118 through the supply port 143 so as to release the negative pressure. At this time, by the negative pressure, the internal pressure of the protruding section 137 also becomes negative with respect to the drug solution chamber 160. Therefore, the movable section 163a is opened so that the drug solution chamber 160 and the inside of the protruding section 137 communicate with each other and the drug solution is supplied inside the protruding section 137 from the drug solution chamber 160. In this manner, the state transitions from the discharge state to the initial state.

In the drug solution path described above, a portion from the gap between the inner face 137a of the protruding section 137 and the cap 142 to the opening section 111a corresponds to a discharge mechanism. By the discharge mechanism, the drug solution stored in the drug solution storage section 150 (drug solution chamber 160) is discharged in a predetermined amount (50 μL) from the nozzle section 111 by one push.

The forming materials of the drug solution storage section 150 and the case section 110 constituting the reagent cartridge 100 and the components constituting these sections are not particularly limited, and it is preferred to use a resin, a metal, or the like, which is hardly affected by a liquid such as the drug solution to be stored, and with which a component, an additive, an impurity, or the like contained in the forming material is hardly eluted in the drug solution. According to this, the occurrence of denaturation or deterioration of a liquid to be stored is suppressed, and also the reliability of pathological diagnosis results can be improved. In particular, as the forming material of a component constituting the drug solution path, it is preferred to use a resin from the viewpoint of ease of molding the component or the like. Examples of such a resin include polymer compounds such as polyethylene, polypropylene, polyphenylene ether, polyphenylene sulfide, polystyrene, polyamide, polyacetal, an acrylonitrile-butadiene-styrene copolymer (ABS), urethane, an acrylic resin, polycarbonate, polybutylene terephthalate (PBT), ethylene propylene rubber (EPM), ethylene propylene diene rubber (EPDM), nitrile rubber (NBR), butyl rubber, and silicone rubber, and one or more types selected from the group consisting of these compounds can be applied. In the case where the drug solution to be stored is an oil (liquid paraffin), it is preferred to apply nitrile rubber (NBR) as the forming material of a component constituting the ball chamber 112, the contact section 117, the cap 142, and the valve 163 because it prevents swelling by the oil (liquid paraffin). Further, the forming material to be used for the case section 110 and the forming material to be used for the drug solution storage section 150 may be the same or different.

With the use of the reagent cartridge 100 according to the first embodiment described above, the residual amount of the stored drug solution can be easily ascertained. More specifically, the presence or absence of the drug solution inside the drug solution chamber 160 can be optically confirmed using the optical paths (the first optical path α and the second optical path β) from the outside of the reagent cartridge 100. Therefore, it is not necessary to confirm the residual amount of the drug solution by visual observation, and it becomes easy to ascertain the time when the reagent cartridge 100 is to be replaced. That is, the reagent cartridge 100 which is favorable for the below-mentioned pathological specimen preparation device 300 (see FIG. 26) to be used in an intraoperative pathological diagnosis can be provided.

Second Embodiment

Figure 10:
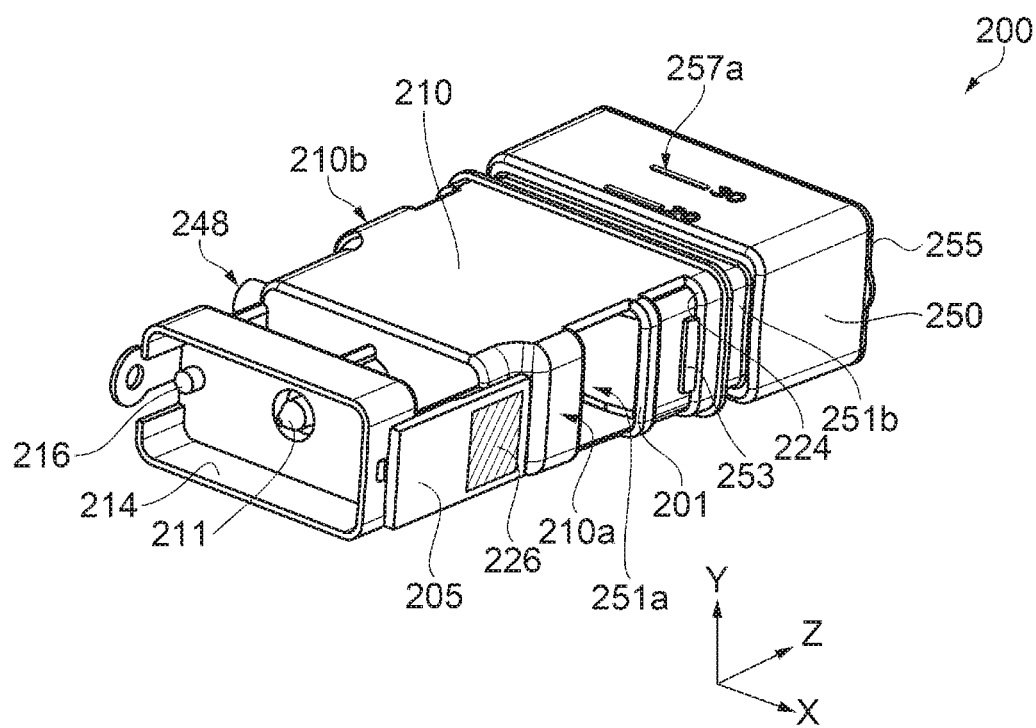
FIG. 10 is a front side perspective view showing the external appearance of a reagent cartridge according to a second embodiment.
Figure 11:
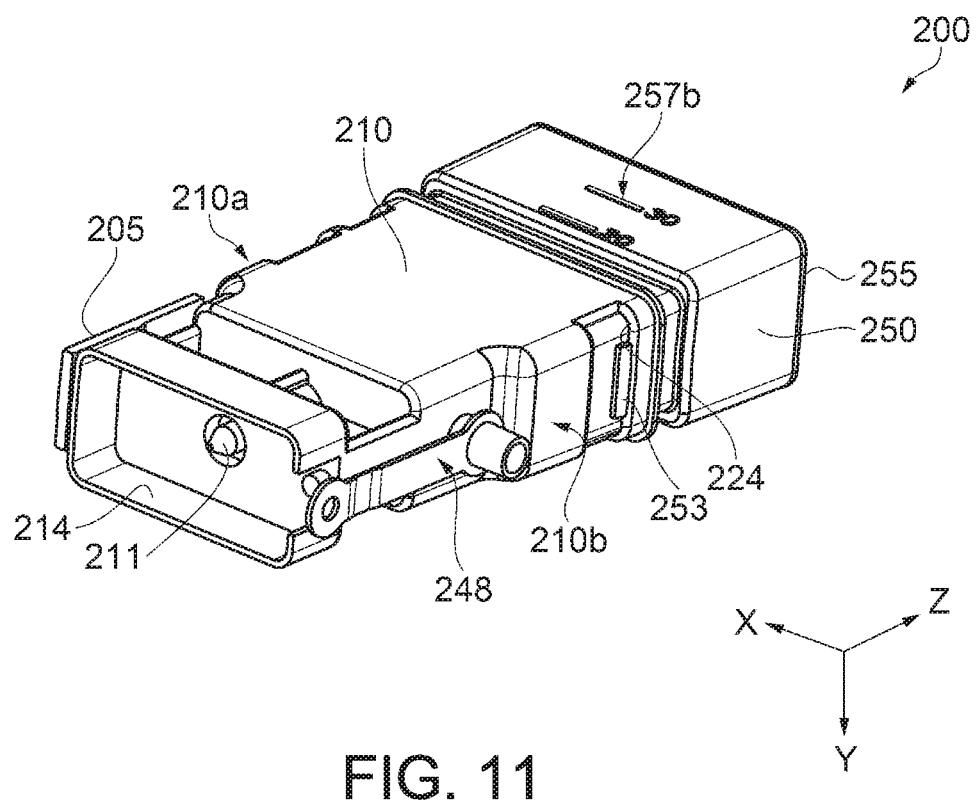
FIG. 11 is a rear side perspective view showing the external appearance of the reagent cartridge according to the second embodiment.

A reagent cartridge and a reagent cartridge set according to a second embodiment will be described.
Reagent Cartridge
External Appearance A schematic structure of a reagent cartridge of a second embodiment will be described with reference to FIGS. 10 to 17. FIGS. 10 and 11 are perspective views each showing the external appearance of the reagent cartridge according to the second embodiment and are sequentially a front side perspective view and a rear side perspective view, respectively. FIGS. 12, 13, 14, 15, 16A, and 16B are sequentially a front view, a rear view, a right side view, a left side view, a top view, and a bottom view showing the external appearance of the reagent cartridge according to the second embodiment, respectively. Note that a state shown in FIG. 10 shows a posture in a used state (a posture in use) of each member, each component, and a device. Unless otherwise specified, the following description is made with respect to a posture in use, and for convenience of explanation, the direction indicated by the Z-axis arrow is sometimes referred to as "positive direction" or "upper side", and the direction opposite thereto is sometimes referred to as "negative Z-axis direction" or "lower side". Further, components similar to those of the above-mentioned first embodiment are denoted by the same reference numerals, and the description thereof is sometimes omitted.

As shown in FIGS. 10 and 11, a reagent cartridge 200 according to the second embodiment includes a locking section 205 and a case section 210 which has a light transmissive first window section 251a, a drug solution storage section 250 capable of storing a drug solution, a light transmissive second window section 201, and a nozzle section 211, and holds the drug solution storage section 250 movably in the negative Z-axis direction as a first direction. The reagent cartridge 200 can discharge a predetermined amount of a stored drug solution from the nozzle section 211 by the moving motion of the drug solution storage section 250 in the negative Z-axis direction in a predetermined range. The second window section 201 and the locking section 205 are provided on a right side face 210a as a first side face of the case section 210. Further, in the reagent cartridge 200, a nozzle cap 248 is attached on a left side face 210b on the opposite side to the right side face 210a on which the locking section 205 is provided.

On each of the right side face 210a and the left side face 210b of the case section 210, an opening section 224 having a substantially rectangular shape is provided on the upper side of the second window section 201 and at a position opposed thereto. In the drug solution storage section 250, a locking convex section 253 is provided at a position corresponding to the opening section 224. The locking convex section 253 functions as a fitting member when the drug solution storage section 250 is housed in the case section 210.

The reagent cartridge 200 is a substantially rectangular parallelepiped body, and the case section 210 which is a main exterior component of the reagent cartridge 200 is also a substantially rectangular parallelepiped body. Among the six faces having a substantially rectangular shape constituting the reagent cartridge 200, faces facing each other in the Z-axis direction are referred to as "upper face" (face on the upper side) and "bottom face" (face on the lower side), side faces facing each other in the Y-axis direction are referred to as "front face" and "rear face", and faces facing each other in the X-axis direction as a second direction crossing the Z-axis direction are referred to as "right side face 210a" and "left side face 210b". Therefore, in the reagent cartridge 200, the substantially rectangular areas constituting the front face and the rear face are the largest, the areas of the left and right side faces 210b and 210a are the second largest, and the areas of the upper face and the bottom face are the smallest. Here, among the above-mentioned six faces having a substantially rectangular shape, the upper face is constituted by the drug solution storage section 250 protruding from the case section 210, and the other faces are constituted by the case section 210. That is, a portion on the upper side of the drug solution storage section 250 housed in the case section 210 is exposed from the case section 210.

On the front face and the rear face of apart of the outer face on the upper side of the drug solution storage section 250 exposed from the case section 210, scales 257a and 257b indicating the volume of the below-mentioned drug solution chamber 260 (see FIG. 17) are provided, respectively. By providing the scales 257a and 257b in this manner, the volume of the drug solution housed in the drug solution chamber 260 of the drug solution storage section 250 can be easily found. The drug solution storage section 250 in the portions where the scales 257a and 257b are provided have light transmissivity, and therefore, the drug solution housed in the drug solution chamber 260 can be visually confirmed.

In the case section 210 (reagent cartridge 200), a face where the second window section 201 is located on the right side is determined to be "front face". On the bottom face of the case section 210 (reagent cartridge 200), the nozzle section 211 and a projecting section 216 are provided. On the outer edge of the bottom face of the case section 210, a rib 214 is provided. The base portion of the nozzle section 211 and the base portion of the rib 214 are on the same plane, and the nozzle section 211 is surrounded by the rib 214. Therefore, by the rib 214, the nozzle section 211 is protected from collision or the like with other members or the like. Further, the nozzle section 211 is formed protruding from the bottom face of the case section 210, and therefore, when the drug solution is discharged, the liquid draining is improved, and the drug solution is prevented from going around the nozzle section 211 and adhering thereto. Further, the projecting section 216 has a function to fasten the nozzle cap 248.

Figure 12:
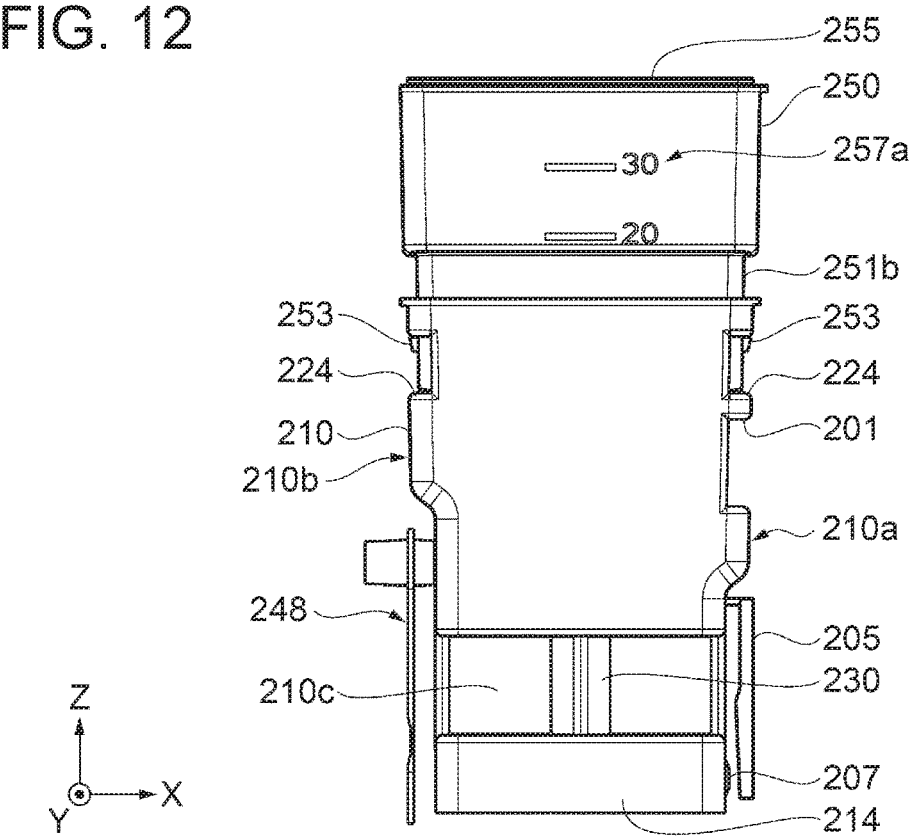
FIG. 12 is a front view showing the external appearance of the reagent cartridge.
Figure 13:
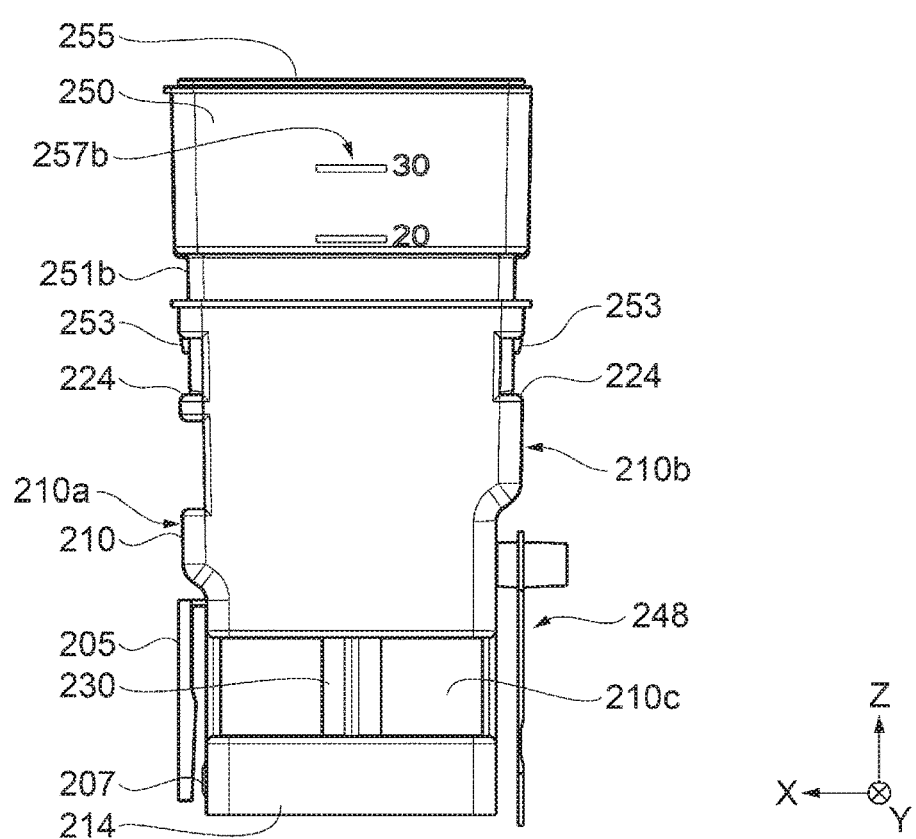
FIG. 13 is a rear view showing the external appearance of the reagent cartridge.

As shown in FIG. 12 (front view) and FIG. 13 (rear view), on the right side face 210a of the case section 210, the locking section 205 is provided. The locking section 205 is supported by the case section 210 slightly protruding in the positive X-axis direction from the right side face 210a of the case section 210 and extends downward. When viewed from the Y-axis direction, about a 2-mm gap is provided between the locking section 205 and the right side face 210a of the case section 210. This gap opens downward, and therefore, when the reagent cartridge is held in the below-mentioned pathological specimen preparation device 300 (see FIG. 25), by inserting a holding section or the like provided in the pathological specimen preparation device 300 into the gap, the case section 210 is locked.

On the lower end portion side of the right side face 210a of the case section 210 at a position facing the locking section 205, a locking projection section 207 protruding from the right side face 210a is provided. By this locking projection section 207, the gap between the locking section 205 and the case section 210 becomes slightly smaller, so that the lower end portion of the locking section 205 can be prevented from easily coming off from the holding section, and thus, the reagent cartridge 200 can be stably attached to the pathological specimen preparation device 300.

Further, the lower end portion of the locking section 205 may be molded into a rib-like shape by slightly narrowing the gap so that the locking section hardly comes off from the holding section of the pathological specimen preparation device 300. In this embodiment, an example in which the locking section 205 is provided on the right side face 210a of the case section 210 is shown, however, the invention is not limited thereto. The locking section 205 may be provided on the left side face 210b (the face on the left side when facing FIG. 12) as the second side face facing the right side face 210a of the case section 210 according to the specification of the below-mentioned pathological specimen preparation device 300, or the like.

As shown in FIGS. 12 and 13, on the lower side of each of the front face and the rear face of the case section 210, a recessed section 210c which opens to the front face or the rear face is provided. The bottom face of the recessed section 210c is formed integrally with the case section 210 and the outer peripheral section 230 of the below-mentioned second drug solution flow path. Then, the outer peripheral section 230 of the second drug solution flow path protrudes in the recessed section 210c. Since the outer peripheral section 230 of the second drug solution flow path is in the recessed section 210c in this manner, the thickness of the outer peripheral section 230 becomes thinner, and thus, it is possible to facilitate the visual confirmation of the state of the drug solution in the second drug solution flow path by seeing it through the outer peripheral section 230.

Figure 14:
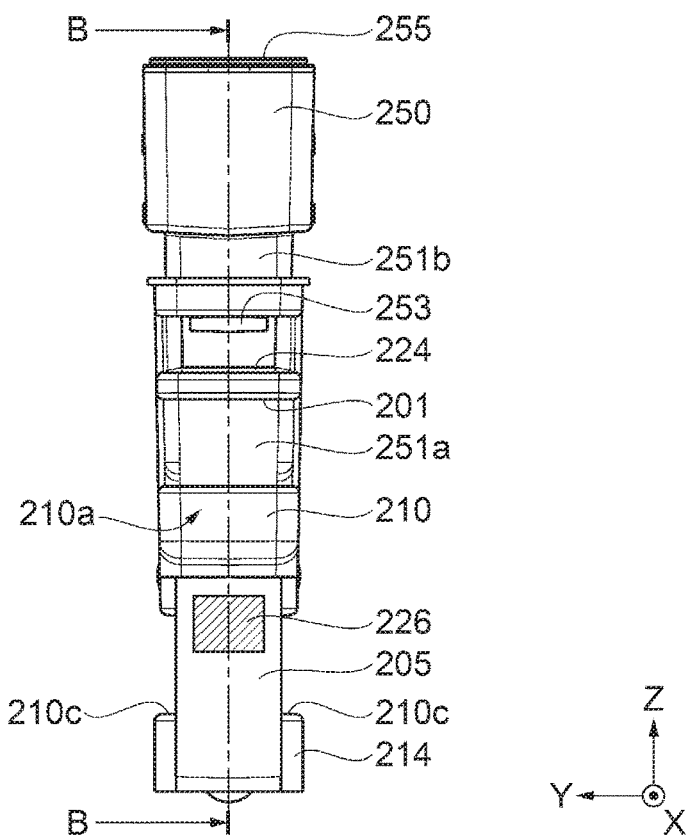
FIG. 14 is a right side view showing the external appearance of the reagent cartridge.

As shown in FIG. 14 (right side view), on the right side face 210a (first side face) of the case section 210, the second window section 201 is provided in the middle of the Z-axis direction. The second window section 201 is a substantially rectangular opening. It is possible to face the first window section 251a of the drug solution storage section 250 housed in the case section 210 through the second window section 201. The second window section 201 is not limited to the opening, and may be covered with a forming material having light transmissivity. Further, the shape of the second window section 201 is not limited to a substantially rectangular shape, and may be a circular shape, a polygonal shape, or the like.

On the right side face 210a of the case section 210, the opening section 224 having a substantially rectangular shape is provided on the upper side of the second window section 201. In the drug solution storage section 250, the locking convex section 253 is provided at a position corresponding to the opening section 224. The locking convex section 253 is formed into a convex shape protruding in the X-axis direction, and therefore, when the drug solution storage section 250 is housed in the case section 210, the opening section 224 and the locking convex section 253 are fitted to each other.

On the face facing the positive X-axis direction of the locking section 205, a barcode 226 relating to the information of the drug solution stored in the reagent cartridge 200 is attached. According to this, information such as the type of the drug solution, the amount of content, the date of preparation, or the matters to be attended can be held on the reagent cartridge 200. The form of the barcode 226 is not particularly limited, and any of a one-dimensional code and a two-dimensional code such as a data matrix or a QR code (registered trademark) can be applied.

Figure 15:
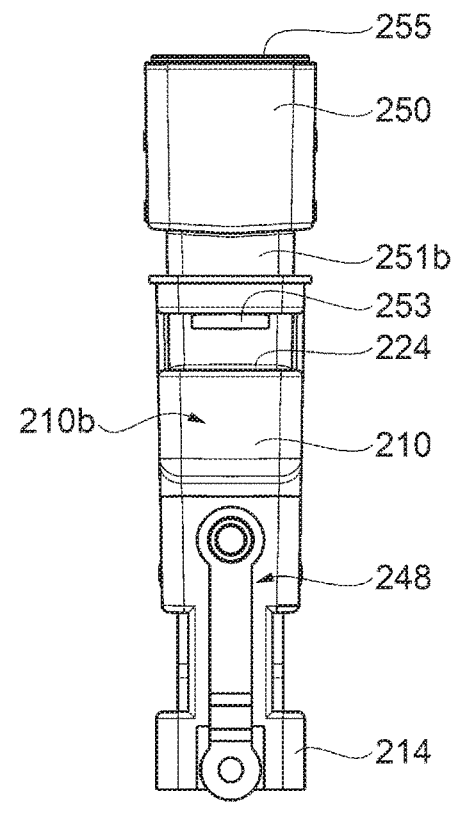
FIG. 15 is a left side view showing the external appearance of the reagent cartridge.

As shown in FIG. 15 (left side view), on the left side face 210b (the face on the left side when facing FIG. 12) facing the right side face 210a of the case section 210, in the same manner as the right side face 210a, the opening section 224 having a substantially rectangular shape is provided, and on the left side face 210b of the drug solution storage section 250, a locking convex section 253 having a convex shape protruding in the X-axis direction is provided at a position corresponding to the opening section 224. Also on the side of the left side face 210b, when the drug solution storage section 250 is housed in the case section 210, the opening section 224 and the locking convex section 253 are fitted to each other. In this manner, on the right side face 210a and the left side face 210b, by fitting the opening section 224 and the locking convex section 253 to each other, when the drug solution storage section 250 in which the drug solution is stored is housed in the case section 210, the drug solution storage section 250 is hardly detached from the case section 210. In other words, the drug solution storage section 250 cannot be easily pulled out from the case section 210.

Figure 16A:
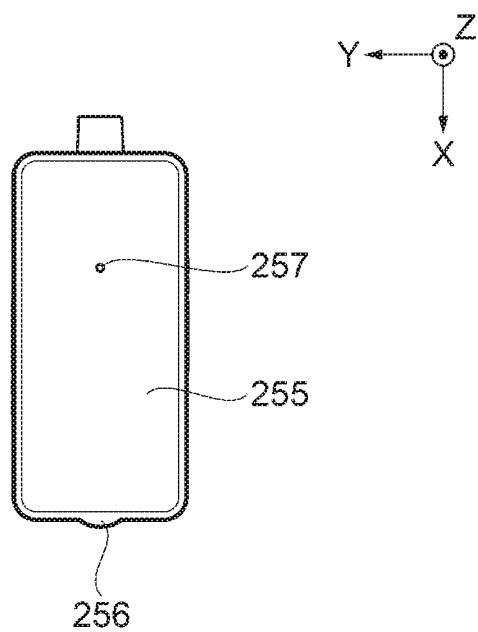
FIG. 16A is a top view showing the external appearance of the reagent cartridge.

As shown in FIG. 16A (top view), the reagent cartridge 200 has a cartridge lid 255 which can be attached to and detached from the drug solution storage section 250, and the cartridge lid 255 has a communication hole 257 which communicates with the below-mentioned drug solution chamber 260 (see FIG. 17). The communication hole 257 is a substantially circular opening and allows the inside and the outside of the drug solution storage section 250 to communicate with each other. By using such a cartridge lid 255, mixing or contamination with a foreign substance from the outside into the stored drug solution can be suppressed. Further, the inside and the outside of the drug solution storage section 250 communicate with each other through the communication hole 257, and therefore, even if the drug solution is discharged so as to reduce the amount of the stored drug solution, an increase in the negative pressure in the drug solution chamber 250 is suppressed. Accordingly, the discharge of the drug solution can be promptly performed. The shape of the opening of the communication hole 257, and the number and arrangement of the communication holes 257 are not particularly limited. Further, an air-permeable waterproof film may be provided on the opening of the communication hole 257 so as to prevent mixing with moisture (liquid) or liquid leakage. Alternatively, when the drug solution stored in the drug solution storage section 250 is in an unused state, the communication hole 257 may be blocked by covering the upper face (cartridge lid 255) thereof with a film or the like. Further, the cartridge lid 255 may be provided with a brim 256 protruding from the outer face of the drug solution storage section 250 in a plan view from the Z-axis direction for facilitating the attachment and detachment thereof to and from the drug solution storage section 250.

Figure 16B:
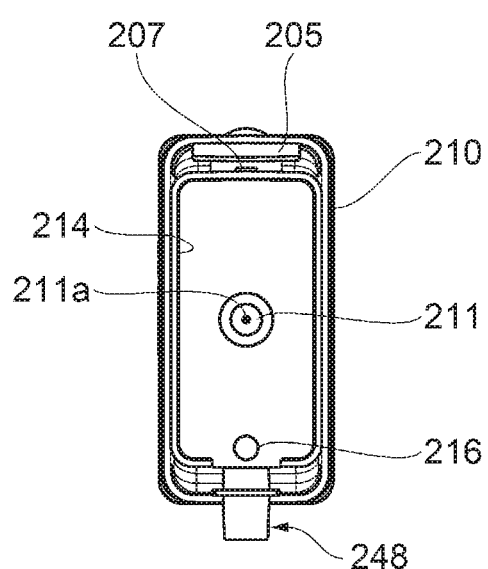
FIG. 16B is a bottom view showing the external appearance of the reagent cartridge.

As shown in FIG. 16B (bottom view), the nozzle section 211 is formed facing the negative Z-axis direction on the bottom face of the case section 210. On the bottom face of the case section 210, the nozzle section 211 is disposed approximately on the central side in the Y-axis direction and the X-axis direction. At the tip of the nozzle section 211, an opening section 211a having a cylindrical inner face and an inner diameter of about 2.0 mm is provided for discharging the drug solution stored in the reagent cartridge 200. Further, the projecting section 216 is a circular cylinder protruding from the bottom face of the case section 210 and has a function to fasten the nozzle cap 248. In the same manner as the reagent cartridge 100 of the above-mentioned first embodiment, also in the reagent cartridge 200 of this embodiment, the discharged amount of the drug solution to be discharged from the nozzle section 211 by one discharge is very small, and therefore, the liquid draining from the nozzle section 211 is important, and in order to further improve the liquid draining, the bottom face of the case section 210 surrounding the opening section 211a of the nozzle section 211 is preferably subjected to a liquid repellent treatment.

Internal Structure

The internal structure of the reagent cartridge 200 will be described with reference to FIG. 17. FIG. 17 is a cross-sectional view taken along the line B-B in FIG. 14. The line B-B is a line segment extending in the Z-axis direction.

Figure 17:
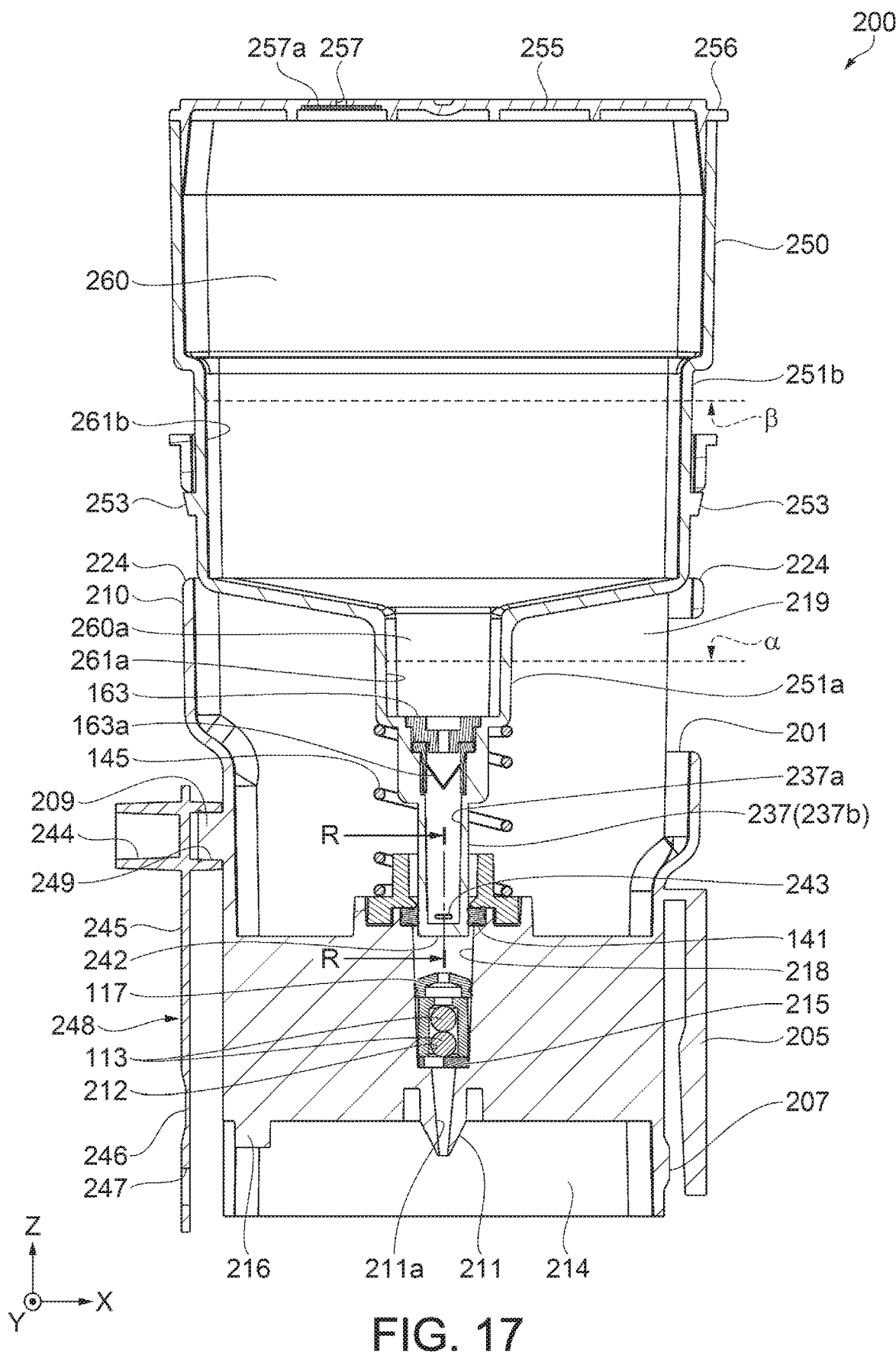
FIG. 17 is a cross-sectional view taken along the line B-B in FIG. 14.

As shown in FIG. 17, the reagent cartridge 200 is formed by inserting (housing) the drug solution storage section 250 having the drug solution chamber 260 which can store the drug solution into a housing section 219 of the case section 210. The drug solution storage section 250 includes the drug solution chamber 260 which communicates with the communication hole 257 on the upper side inside. On the opening on the drug solution chamber 260 side of the communication hole 257, an air-permeable waterproof film 257a formed into, for example, a mesh shape is provided. The air-permeable waterproof film 257a has such a property that it is permeable to gas, but impermeable to water (liquid), and can prevent mixing with moisture (liquid) or liquid leakage, for example, in the case where the reagent cartridge 200 is tipped over.

The drug solution chamber 260 has a constricted section 260a on the tip side on the lower side (the negative Z-axis direction as the first direction). The width in the X-axis direction and the length in the Z-axis direction of the constricted section 260a are about one-third those of the drug solution chamber 260 other than the constricted section 260a, respectively.

The height of the drug solution chamber 260 is reduced as compared with the drug solution chamber 160 of the above-mentioned first embodiment, and the drug solution chamber 260 can store the drug solution in an amount of 1 mL (milliliter) or more and 30 mL or less. According to this, the height of the reagent cartridge 200 is reduced, and also, for example, with respect to a treatment using 200 µL of the drug solution per treatment, the volume for about 150 times at the maximum can be ensured. In the reagent cartridge 200 of the second embodiment, the drug solution in an amount of 30 mL at the maximum can be stored in the drug solution chamber 260. Further, the volume of the constricted section 260a in the drug solution chamber 260 is about 1 mL.

The drug solution to be stored in the drug solution chamber 260 (reagent cartridge 200) is the same as that in the above-mentioned first embodiment, and therefore, the description thereof is omitted.

The reagent cartridges 200 storing such drug solutions may be used as a reagent cartridge set including two or more types of reagent cartridges. By configuring a reagent cartridge set, in treatments such as an antigen-antibody reaction treatment, a coloring reaction treatment, a deparaffinization treatment, an activation treatment, an endogenous peroxidase (PO) blocking treatment, and a washing treatment, two or more types of treatments can be performed.

The case section 210 has a ball chamber 212 having a cylindrical inner face on the upper side of the opening section 211a having a cylindrical tapered inner face which becomes gradually narrower downward. The upper face of the ball chamber 212 communicates with the opening of the below-mentioned contact section 117. The lower face of the ball chamber 212 is in contact with the below-mentioned ball stopper section 215. In the ball chamber 212, two balls 113, each of which is a spherical body having a diameter of about 2.0 mm, are inserted vertically side by side in the Z-axis direction. The height (the size in the Z-axis direction) of the ball chamber 212 is formed slightly larger than twice the diameter of the ball 113, and the inner diameter of the ball chamber 212 is slightly larger than the diameter of the ball 113. Therefore, the two balls 113 can move vertically inside the ball chamber 212. Here, the height of the ball chamber 212 is set as a distance from the below-mentioned ball stopper section 215 to the contact section 117.

Figure 20A:
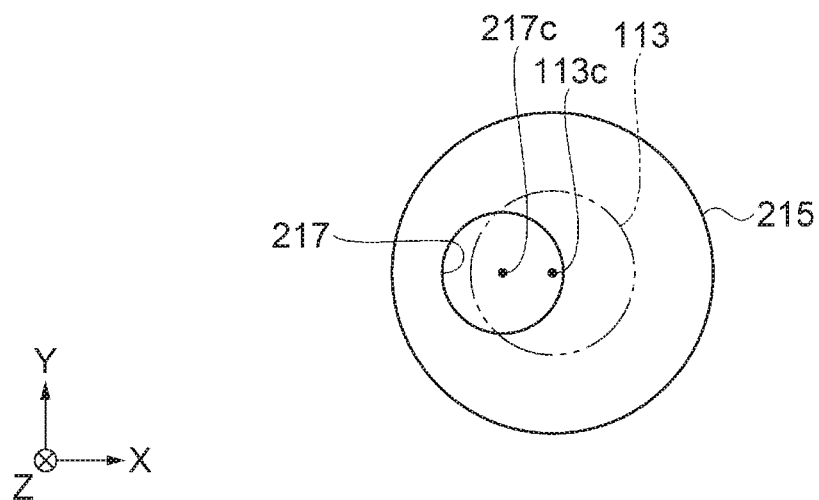
FIG. 20A is a plan view showing the external appearance of a ball stopper section.

On the lower face of the ball chamber 212, the ball stopper section 215 is provided. The ball stopper section 215 is provided attachably to and detachably from the ball chamber 212. Here, the ball stopper section 215 will be described with reference to FIG. 20A. FIG. 20A is a plan view showing the external appearance of the ball stopper section. As shown in FIG. 20A, the ball stopper section 215 has a disk shape having substantially the same outer diameter as that of the ball chamber 212, and includes an opening section 217 having a circular planar shape, in which the center 217c is disposed at a position eccentric with respect to the center 113c of the ball 113 housed in the ball chamber 212. Since the center 217c of the opening section 217 is eccentric with respect to the center 113c of the ball 113 in this manner, the ball 113 does not entirely sink in the opening section 217, and cannot block the opening section 217 of the ball stopper section 215, and therefore, the ball chamber 212 and the opening section 211a communicate with each other. Accordingly, the drug solution can always be retained in the ball chamber 212 and the opening section 211a.

Figure 20B:
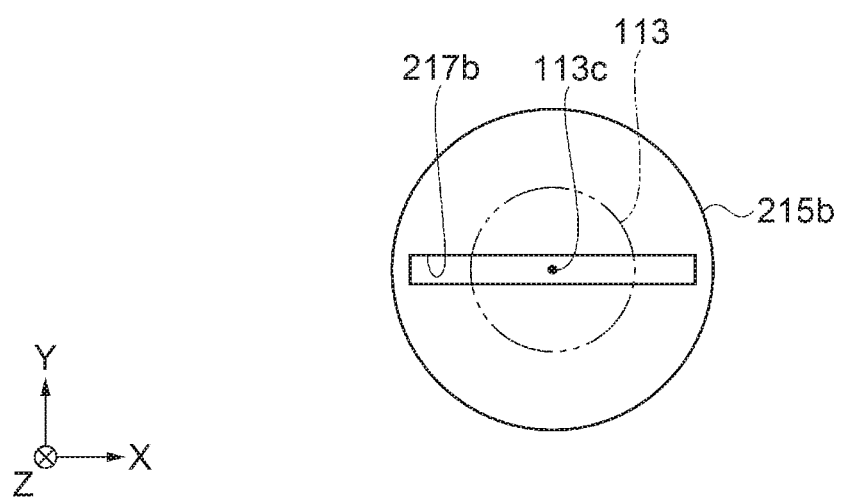
FIG. 20B is a plan view showing the external appearance of a first modification example of the ball stopper section.
Figure 20C:
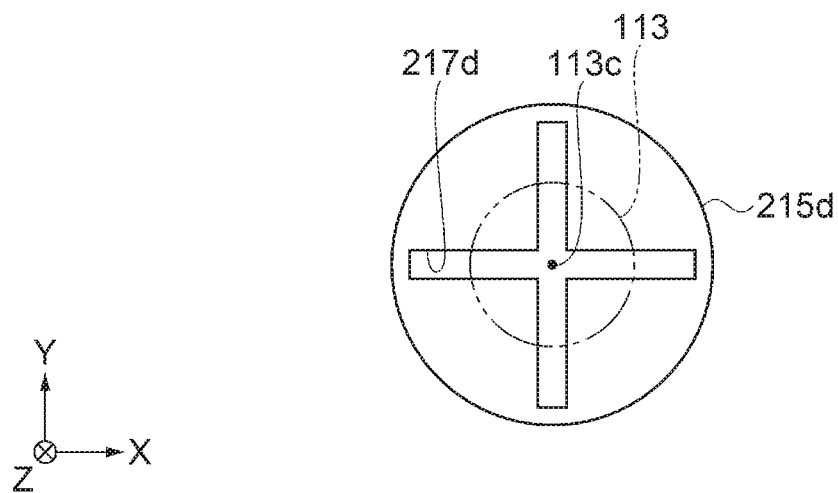
FIG. 20C is a plan view showing the external appearance of a second modification example of the ball stopper section.

The shape of the opening section 217 of the ball stopper section 215 is not limited to a circle eccentric with respect to the center 113c of the ball 113, and there is no restriction on the shape as long the ball 113 does not entirely sink therein. As other configuration examples of the ball stopper section 215, a ball stopper section 215b of a first modification example shown in FIG. 20B, a ball stopper section 215d of a second modification example shown in FIG. 20C, etc. can be applied. FIG. 20B is a plan view showing the external appearance of the first modification example of the ball stopper section. Further, FIG. 20C is a plan view showing the external appearance of the second modification example of the ball stopper section. The ball stopper section 215b shown in FIG. 20B has a through groove 217b having a rectangular planar shape. The through groove 217b is configured such that the length dimension in the long-side direction is longer than the diameter of the ball 113, and the width dimension in the short-side direction is shorter than the diameter of the ball 113. Further, the ball stopper section 215d shown in FIG. 20C has a through groove 217d having a so-called cruciform planar shape in which through grooves having a rectangular planar shape cross each other. The through groove 217d is configured such that the length dimension in the long-side direction of each groove is longer than the diameter of the ball 113, and the width dimension in the short-side direction thereof is shorter than the diameter of the ball 113. The ball stopper sections 215b and 215d of such modification examples can also exhibit the same effect as that of the ball stopper section 215 described above.

The configuration and operation of the ball 113 are the same as those in the first embodiment described above, and therefore, the description thereof is omitted here. Further, on the upper face of the ball chamber 212, the contact section 117 is provided. The configuration of the contact section 117 is the same as that in the first embodiment described above, and therefore, the description thereof is omitted here. On the upper side of the contact section 117, a strong chamber 218 having a cylindrical inner face is provided.

As shown in FIG. 17, on the lower side of the constricted section 260a of the drug solution storage section 250 (drug solution chamber 260), a protruding section 237 is provided. The protruding section 237 includes a second drug solution flow path which has a cylindrical inner face 237a therein and communicates with the drug solution chamber 260 through a valve 163 with a movable section 163a. At the tip in the negative Z-axis direction as the first direction of the protruding section 237, a bottom section 242 which closes the tip of the protruding section 237 is provided. Further, on the tip side in the negative Z-axis direction as the first direction of the protruding section 237, two slit-shaped through-holes 243, each of which passes through from the inner face 237a to an outer face 237b, are provided. Then, the protruding section 237 is inserted into the stroke chamber 218 of the case section 210.

The inner face 237a of the protruding section 237 of the drug solution storage section 250, the stroke chamber 218, the ball chamber 212, and the nozzle section 211 of the case section 210 have different inner diameters, but are disposed so that the center lines thereof substantially coincide with the center line of the opening section 211a. Here, the stroke chamber 218, the ball chamber 212, and the opening section 211a from the inner face of the protruding section 237 form a drug solution path from the drug solution chamber 260 to the nozzle section 211.

A coil-shaped spring 145 is disposed so as to go around the cylindrical outer face 237b of the protruding section 237. One end of the spring 145 is in contact with the periphery of the case section 210 where the protruding section 237 is inserted and the other end of the spring 145 is in contact with the base portion of the protruding section 237.

The spring 145 is a biasing unit which biases the drug solution storage section 250 in the positive Z-axis direction (upward) in the same manner as in the first embodiment. Therefore, the drug solution storage section 250 is biased upward with respect to the case section 210 in the housing section 219, however, by the locking of the locking convex section 253 and the upper edge of the opening section 224, the detachment of the drug solution storage section 250 from the case section 210 is suppressed. FIG. 17 shows a state where the drug solution storage section 250 is not pushed downward. Such a state is referred to as "initial state". When the drug solution storage section 250 is pushed in the negative Z-axis direction (downward) against the biasing force of the spring 145, the drug solution storage section 250 moves downward in the housing section 219. In conjunction with this, the protruding section 237 moves downward in the stroke chamber 218.

The downward movement of the drug solution storage section 250 is possible until the lower face (outer face) 242a (see FIG. 19A) of the bottom section 242 of the protruding section 237 and the contact section 117 come into contact with each other. In other words, by the contact of the lower face 242a of the bottom section 242 with the contact section 117, the downward movement of the drug solution storage section 250 is regulated. According to such a configuration, the drug solution storage section 250 can reciprocate in the housing section 219 in the positive and negative Z-axis direction from the locking position of the locking convex section 253 and the opening section 224 to the contact position of the lower face 242a of the bottom section 242 with the contact section 117. The moving distance in the positive and negative Z-axis direction of the drug solution storage section 250 is referred to as "stroke".

On the inside of the left side face side of the constricted section 260a, a reflection section 261a is provided facing the second window section 201 in the X-axis direction through the drug solution chamber 260 (constricted section 260a). Further, a light transmissive section 251b having light transmissivity is provided in a portion of the drug solution chamber 260 exposed in the opposite direction (positive Z-axis direction) to the first direction in a state of being held in the case section 210. On the inside of the left side face 210b of the drug solution chamber 260, a reflection section 261b is provided facing the light transmissive section 251b in the X-axis direction (second direction) through the drug solution chamber 260.

The reflection sections 261a and 261b have a property of reflecting a light beam having a predetermined wavelength and preferably have a reflectance such that they reflect 30% or more of the light beam having a predetermined wavelength. The first window section 251a and the light transmissive section 251b have light transmissivity. Here, the "light transmissivity" as used herein refers to having a light transmittance of 70% or more with respect to the light beam having a predetermined wavelength. The light beam having a predetermined wavelength is not particularly limited, however, examples thereof include a light beam having a wavelength of 570 nm or more and 750 nm or less. In the case where the forming material of the drug solution chamber 260 has the above-mentioned reflectance with respect to the predetermined wavelength, the reflection sections 261a and 261b may not be provided.

The drug solution storage section 250 (the first window sections 251a and the light transmissive section 251b) may be formed of a forming material having the above-mentioned reflectance and light transmissivity. Such a forming material is not particularly limited, however, for example, a resin such as polyethylene or polypropylene is exemplified. Such a forming material may be visually transparent or semi-transparent. Further, as the forming material of the reflection sections 261a and 261b, a thin film of a metal, a metal oxide, etc., a metal plate, or the like may be used.

The second window section 201, the first window section 251a, the inside of the drug solution chamber 260 (constricted section 260a), and the reflection section 261a are disposed along the X-axis direction and form a first optical path α as an optical path. That is, the first optical path α includes the constricted section 260a. Further, the light transmissive section 251b, the inside of the drug solution chamber 260, and the reflection section 261b are disposed along the X-axis direction and forms a second optical path β as another optical path. That is, the second optical path β is parallel to the first optical path α. In this manner, the reagent cartridge 200 includes two optical paths: the first optical path α as an optical path and the second optical path β as another optical path.

When a light beam having a predetermined wavelength is irradiated onto the first optical path α from the negative X-axis direction, the light beam is incident from the second window section 201 and reaches the reflection section 261a through the first window section 251a and the inside of the drug solution chamber 260 (constricted section 260a). Subsequently, the light beam is reflected by the reflection section 261a, and thereafter travels through the first optical path α in the positive X-axis direction and is emitted from the second window sections 201. At this time, when the drug solution is present on the first optical path α inside the drug solution chamber 260, the luminous quantity of the emitted light beam is attenuated with respect to the irradiated light beam. Therefore, by detecting the attenuation of this luminous quantity, the presence or absence of the drug solution on the first optical path α can be confirmed.

Further, when a light beam having a predetermined wavelength is irradiated onto the second optical path β from the negative X-axis direction, the light beam is incident from the light transmissive section 251b and reaches the reflection section 261b through the inside of the drug solution chamber 260. Subsequently, the light beam is reflected by the reflection section 261b, and thereafter travels through the second optical path β in the positive X-axis direction and is emitted from the light transmissive section 251b. At this time, when the drug solution is present on the second optical path β inside the drug solution chamber 260, the luminous quantity of the emitted light beam is attenuated with respect to the irradiated light beam. Therefore, by detecting the attenuation of this luminous quantity, the presence or absence of the drug solution on the second optical path β can be confirmed.

The first optical path α is set at a position (Z-axis direction) where the "absence of the drug solution" is detected when the residual amount of the drug solution in the drug solution chamber 260 is, for example, below 800 μL (microliters). According to this, in the case where a drug solution which has a short pot life such as DAB and is difficult to refill the reagent cartridge 200 therewith is used, a dead volume is reduced, and the drug solution can be effectively used.

The second optical path β is set at a position where the "absence of the drug solution" is detected when the residual amount of the drug solution in the drug solution chamber 260 is, for example, below 10 mL to 15 mL. Then, in the below-mentioned pathological specimen preparation device 300 (see FIGS. 25 and 26), the calculated value of the residual amount is determined from the amount of the drug solution filled in the reagent cartridge 200 and the consumed amount of the drug solution calculated from the discharged amount of the drug solution and the number of discharges, and may be collated with the detection result of the "absence of the drug solution" on the second optical path β. By doing this, the calculated value of the consumed amount of the drug solution is corrected, and the consumed amount of the drug solution thereafter may be estimated. The position (Z-axis direction) of the second optical path β is not limited to the above-mentioned position. Further, the number of optical paths is not limited to two, and may be set to one or three or more.

The second window section 201, the first window section 251a, and the light transmissive section 251b may be formed of a material having a high visible light transmittance so that the presence or absence of the drug solution may be made confirmable by visual observation in addition to the optical detection using the light beam described above.

On the side face on the left side of the case section 210, a nozzle cap 248 is detachably attached. The nozzle cap 248 includes a cap section 244, a strip-like section 245 connected to the cap section 244, a thin wall section 246 provided in the strip-like section 245, a locking hole 247 provided in the strip-like section 245, and a fitting hole 249 provided on the opposite side to the cap section 244. The nozzle cap 248 is a member which can be attached so as to cover the nozzle section 211 with the cap section 244. The nozzle cap 248 is fitted on the case section 210 by inserting the fitting hole 249 into a fastening projection 209 provided on the case section 210. The nozzle cap 248 can be attached to the case section 210 by fitting the locking hole 247 provided in the strip-like section 245 into the projecting section 216 provided on the bottom face of the case section 210.

Attaching Example of Nozzle Cap

Figure 18A:
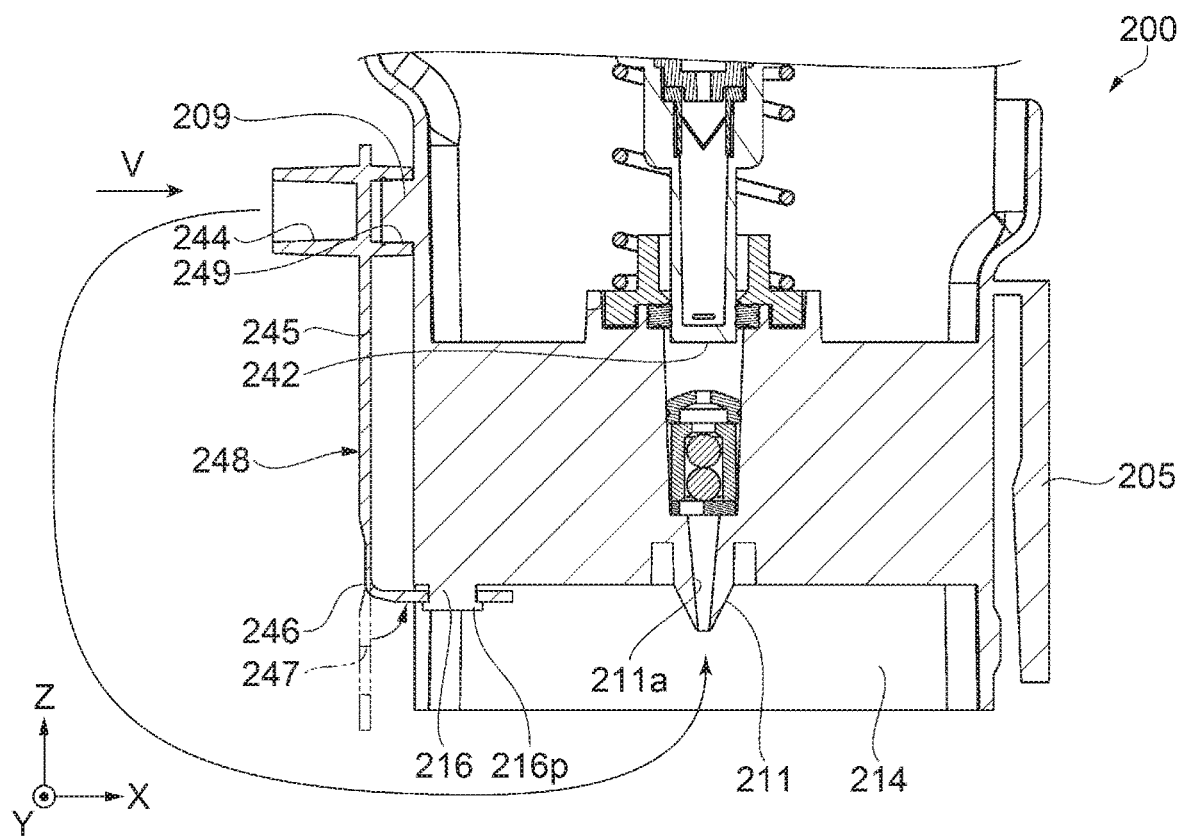
FIG. 18A is a cross-sectional view taken along the line B-B in FIG. 14 showing an attaching example of a nozzle cap.
Figure 18B:
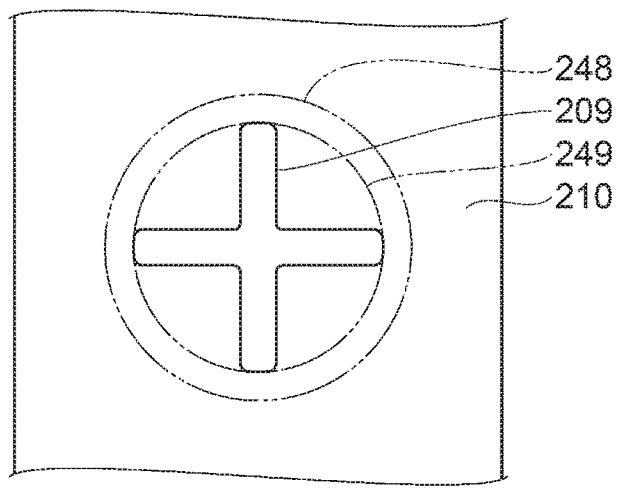
FIG. 18B is a view seen in the direction V shown in FIG. 18A showing a locking projection section which locks the nozzle cap.

Here, an attaching example of the nozzle cap 248 will be described with reference to FIGS. 18A and 18B. FIG. 18A is a cross-sectional view taken along the line B-B in FIG. 14 showing an attaching example of the nozzle cap. FIG. 18B is a view seen in the direction V shown in FIG. 18A showing the locking projection section which locks the nozzle cap.

As shown in FIG. 18A, the nozzle cap 248 can be attached to the case section 210 in a state where the locking hole 247 provided in the strip-like section 245 is inserted through the projecting section 216 provided on the bottom face of the case section 210. Specifically, the nozzle cap 248 can be attached to the case section 210 by bending the strip-like section 245 at the position of the thin wall section 246, inserting the locking hole 247 through the projecting section 216 on the bottom face of the case section 210, and, for example, deforming a top portion of the projecting section 216 into a rivet shape by heating and pressing so as to form a caulking section 216P. By doing this, the nozzle cap 248 is attached to the case section 210 in a portion of the locking hole 247 located in an end portion on the opposite side to the cap section 244. Then, in the nozzle cap 248, the cap section 244 is detached from the fastening projection 209 provided on the case section 210 as needed, and by bending the thin wall section 246 of the strip-like section 245 or by deforming the strip-like section 245 into a curved shape, the cap section 244 can be attached to the nozzle section 211 (capping). The nozzle cap 248 may be attached to the case section 210 pivotably in the circumferential direction of the locking hole 247 with a small gap between the caulking section 216P and the strip-like section 245 facing the caulking section 216P.

By attaching the nozzle cap 248 to the case section 210 in a portion of the locking hole 247 in this manner, the nozzle cap 248 is prevented from being detached from the reagent cartridge 200. Accordingly, misuse or the like of the nozzle cap 248 attached to another reagent cartridge 200 in which another drug solution is housed can be prevented. Further, the nozzle cap 248 can be prevented from being lost.

The planar shape of the fastening projection 209 provided on the case section 210 when it is seen from the left side face 210b (see FIG. 11) of the case section 210 as the front face is a cruciform shape as shown in FIG. 19. The fastening projection 209 is provided such that it protrudes from the case section 210, and the cruciform outer periphery can fasten the fitting hole 249 of the nozzle cap 248. By adopting the cruciform shape as the planar shape of the fastening projection 209 in this manner, the fitting hole 249 of the nozzle cap 248 can be smoothly attached and detached. The outer shape of the fastening projection 209 is not limited to a cruciform shape, and may be a circular shape, a polygonal shape, for example, such as a triangle or a hexagon, or the like.

Drug Solution Path

Figure 19A:
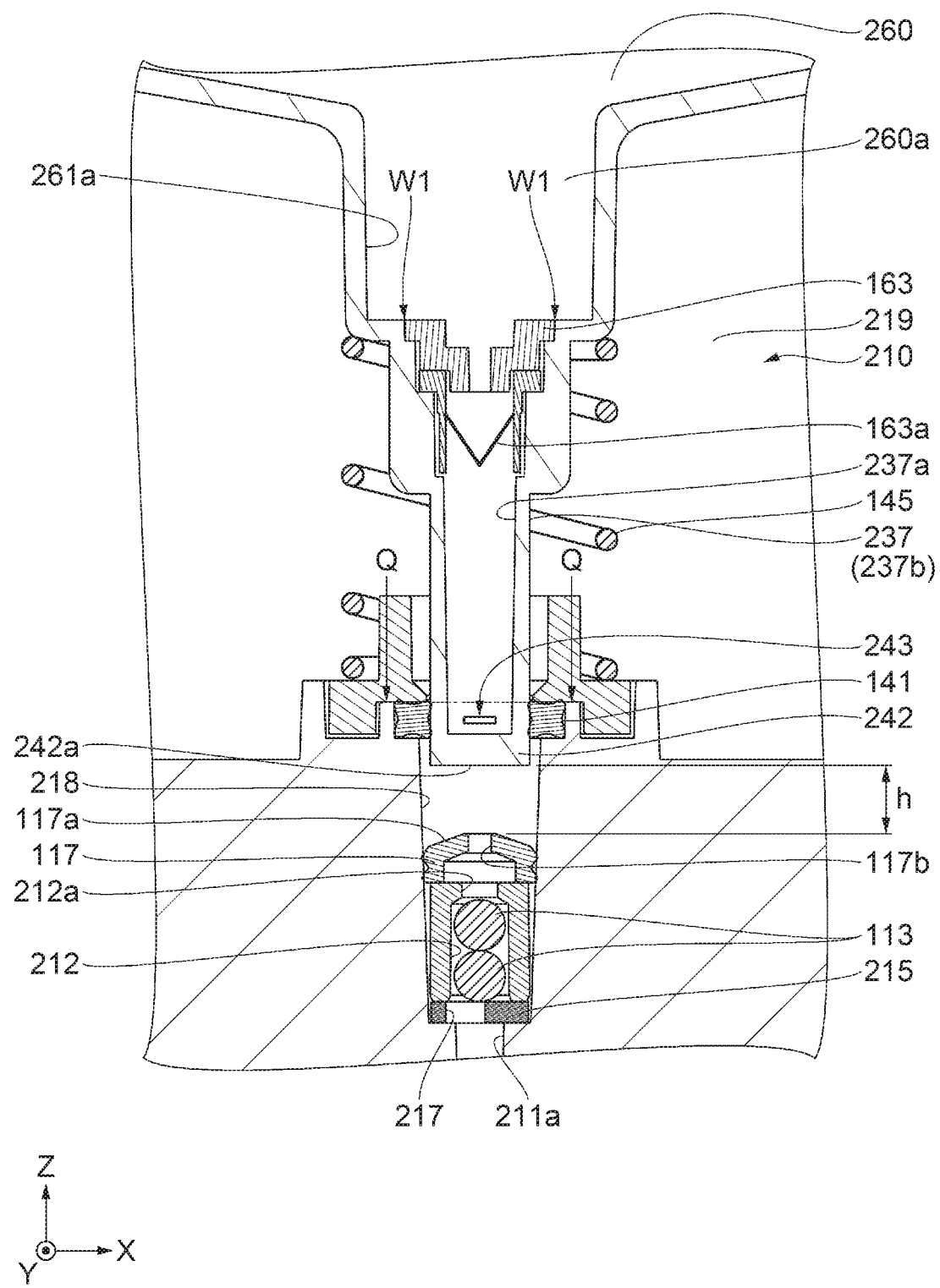
FIG. 19A is a cross-sectional view showing a drug solution path around a stroke chamber.
Figure 19B:
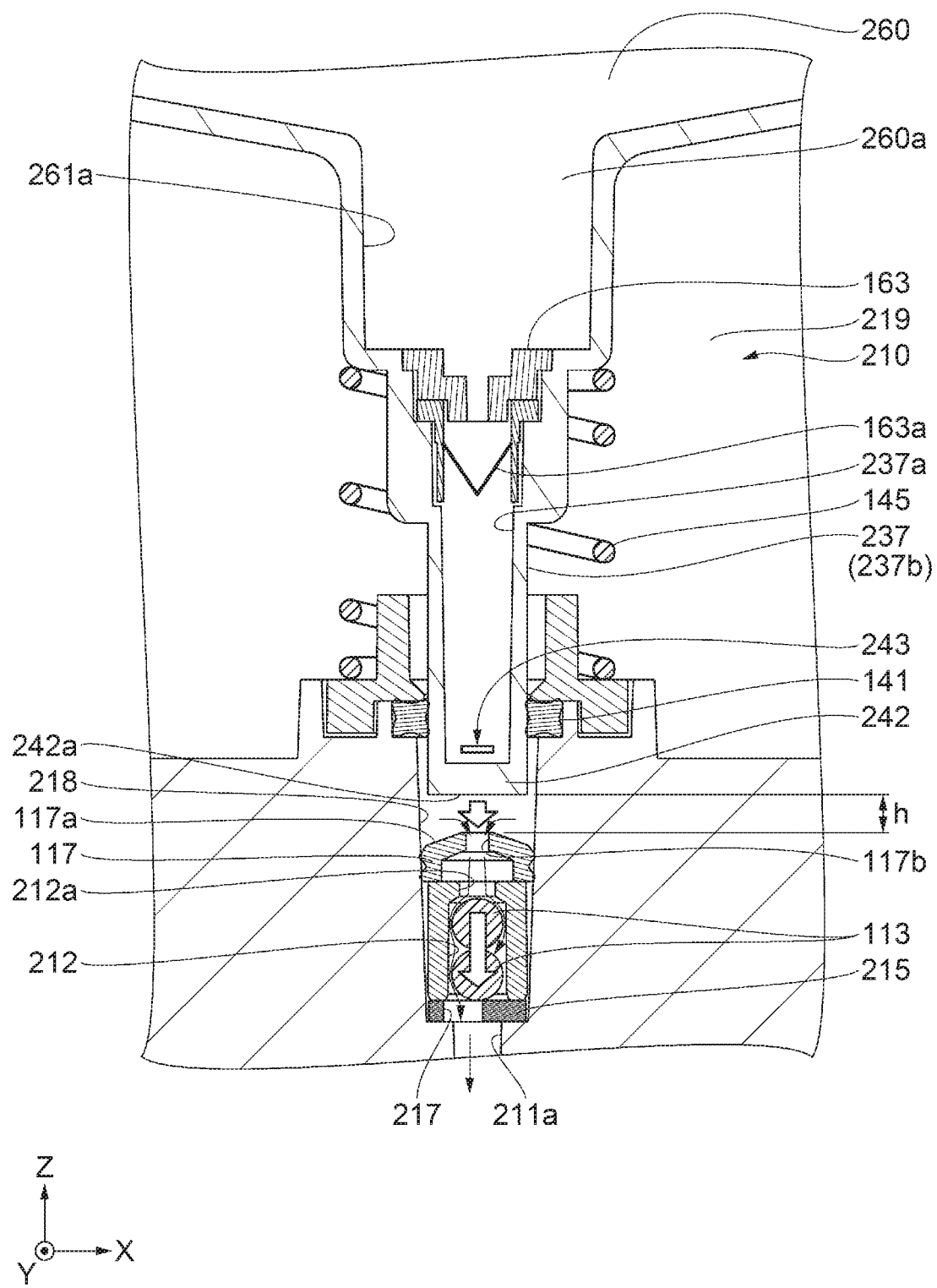
FIG. 19B is a cross-sectional view showing the drug solution path around the stroke chamber.
Figure 19C:
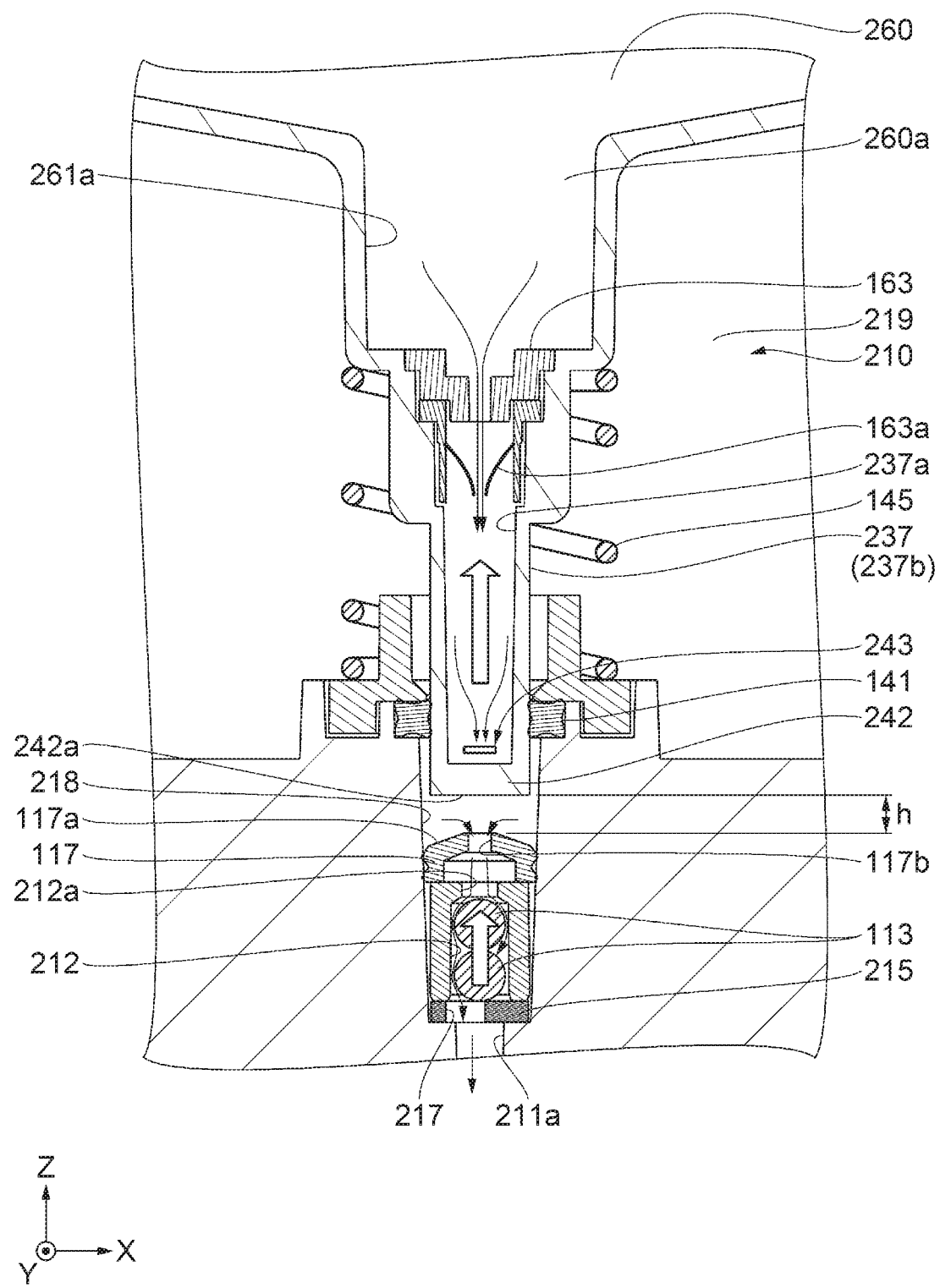
FIG. 19C is a cross-sectional view showing the drug solution path around the stroke chamber.
Figure 21A:
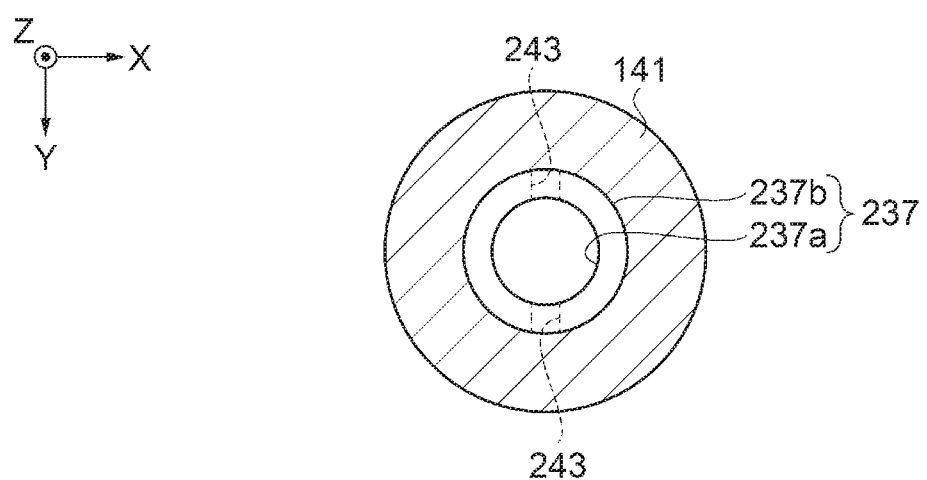
FIG. 21A is a cross-sectional view taken along the line Q-Q in FIG. 19A showing the arrangement of a through-hole provided in a protruding section.
Figure 21B:
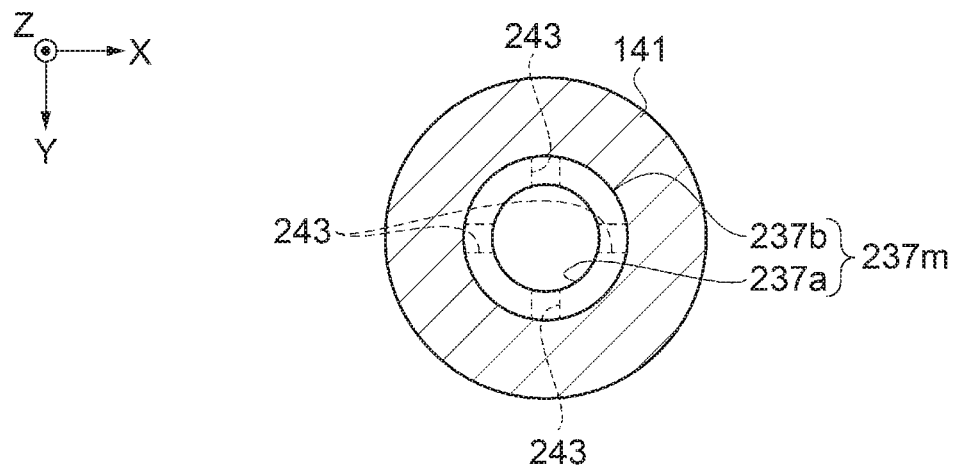
FIG. 21B is a cross-sectional view similar to FIG. 21A showing a first modification example of the arrangement of the through-hole.
Figure 21C:
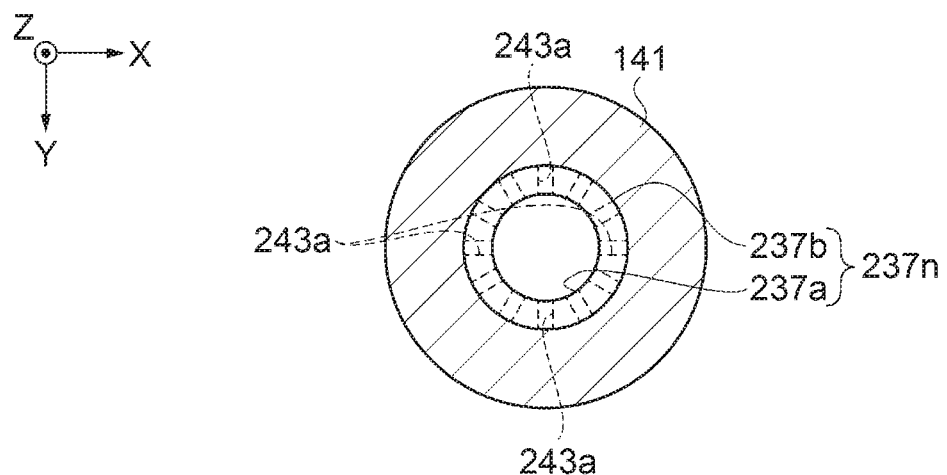
FIG. 21C is a cross-sectional view similar to FIG. 21A showing a second modification example of the arrangement of the through-hole.
Figure 22A:
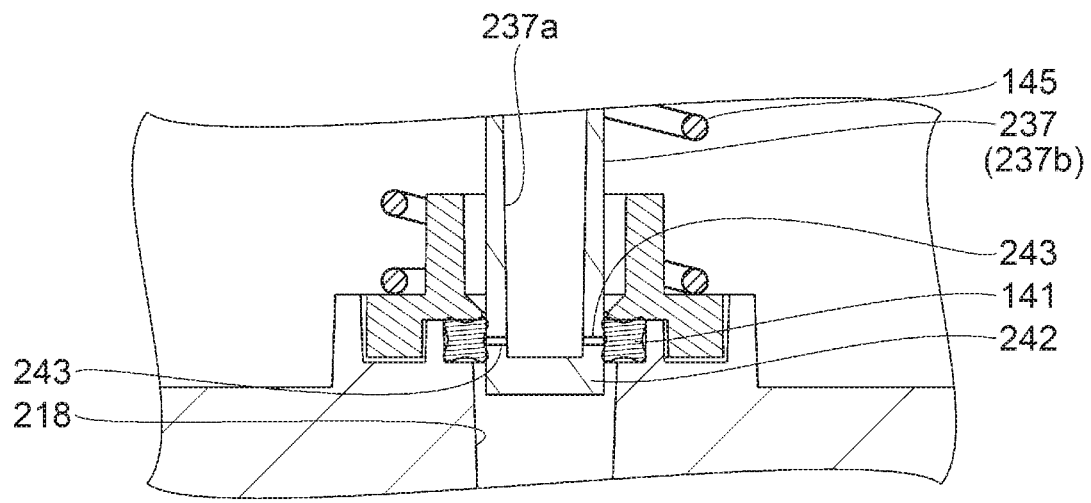
FIG. 22A is a cross-sectional view taken along the line R-R in FIG. 17 showing the position of the through-hole in an initial state.
Figure 22B:
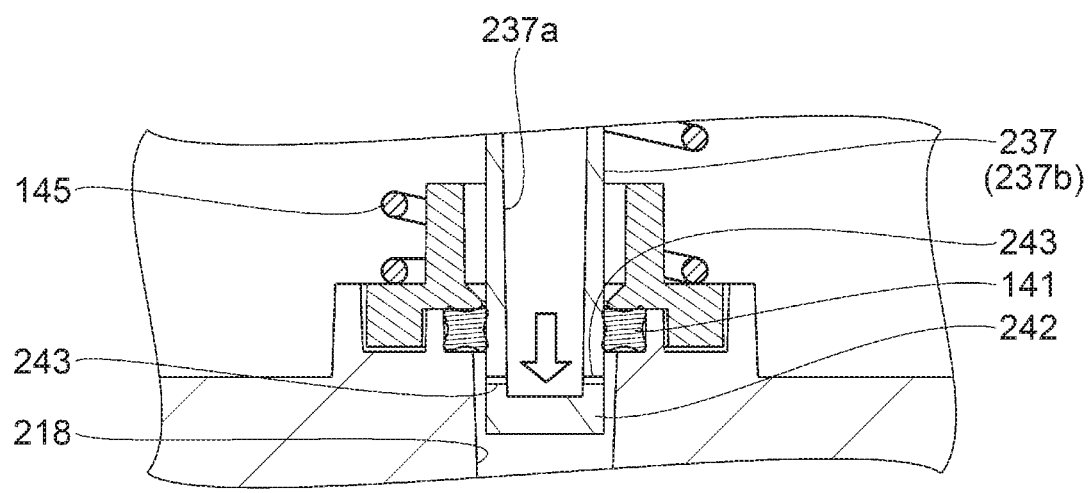
FIG. 22B is a cross-sectional view taken along the line R-R in FIG. 17 showing the position of the through-hole in a moving state.
Figure 23:
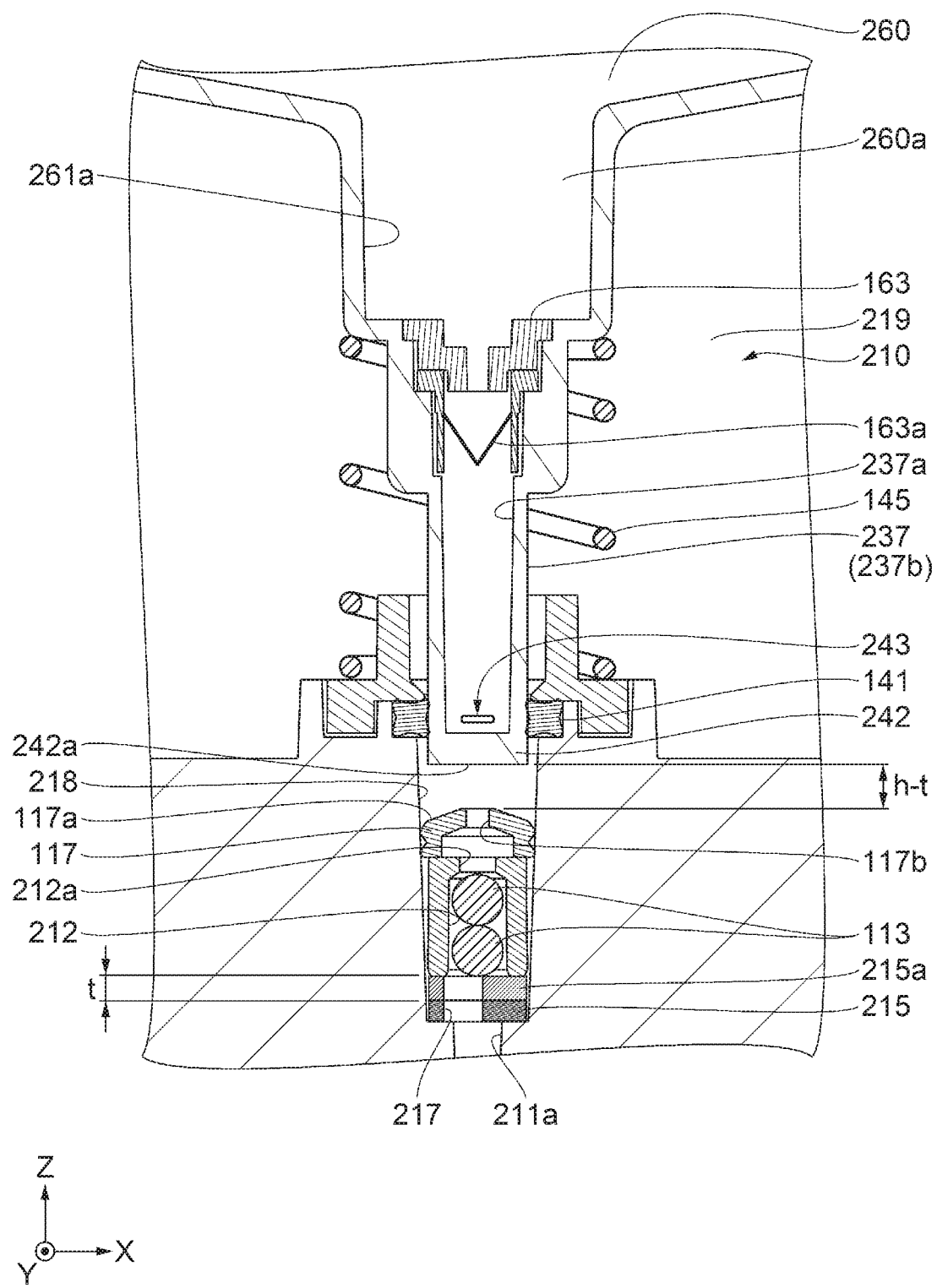
FIG. 23 is a cross-sectional view showing an application example of the arrangement of the ball stopper section.

A drug solution path when the drug solution is discharged will be described with reference to FIGS. 19A, 19B, 19C, 21A, 21B, 21C, 22A, 22B, and 23. FIGS. 19A to 19C are cross-sectional views each showing a drug solution path around the stroke chamber. FIG. 21A is a cross-sectional view taken along the line Q-Q in FIG. 19A showing the arrangement of the through-hole provided in the protruding section. That is, FIG. 22A depicts a cross section (a cross section along the Y axis) from a direction (X-axis direction) rotated by 90° with respect to FIG. 19A for facilitating the understanding of the arrangement correlation of the through-hole with other components. FIGS. 21B and 21C are each a cross-sectional view similar to FIG. 21A showing a modification example of the arrangement of the through-hole, and FIG. 21B is a view showing a first modification example, and FIG. 21C is a view showing a second modification example. FIGS. 22A and 22B are each a cross-sectional view taken along the line R-R in FIG. 17 showing the position of the through-hole, and FIG. 22A is a view showing an initial state, and FIG. 22B is a view showing a moving state. FIG. 23 is a cross-sectional view showing an application example of the arrangement of the ball stopper section.

In FIG. 19A, the surroundings of the stroke chamber 218 in the initial state in the same manner as in FIG. 17 are enlarged and shown. As shown in FIG. 19A, on the tip side in the negative Z-axis direction of the protruding section 237, the slit-shaped through-hole 243 which passes through from the inner face 237a to the outer face 237b is provided. As shown in FIG. 21A, two through-holes 243 are provided so as to pass through the protruding section 237 in the Y-axis direction. In the initial state, this through-hole 243 faces an O-ring 141 and is sealed by the O-ring 141. The through-hole 243 is not limited to the above-mentioned form, and a configuration in which four groove-shaped through-holes 243 are provided along two directions (X-axis and Y-axis directions) in which projecting sections 237m cross each other as shown in FIG. 21B may be adopted. Further, a configuration in which, for example, 12 through-holes 243a having a circular cross-sectional shape are radially provided in a projecting section 237n as shown in FIG. 21C may be adopted. The arrangement and the number of the through-holes 243 or 243a are not limited to the above-mentioned examples, and there is no restriction on the arrangement and the number.

As shown in FIG. 19A, on the upper side of the stroke chamber 218 into which the protruding section 237 is inserted, the O-ring 141 as the ring member having elasticity is disposed. The O-ring 141 is provided so that the outer face 237b of the protruding section 237 can slide in the first direction. The O-ring 141 has a function to prevent the leakage of the drug solution between the case section 210 and the outer face 237b by being closely adhered to the outer face 237b of the protruding section 237. Further, as shown in FIG. 22A, in the initial state, the through-hole 243 is sealed by the O-ring 141. According to this, the drug solution path from the drug solution chamber 260 to the opening section 211a is blocked by the through-hole 243, and therefore, in the initial state, the drug solution does not flow out to the stroke chamber 218 through the through-hole 243 from the drug solution chamber 260. Further, the O-ring 141 is configured to be a so-called X-shaped ring (X-ring) which has a substantially rectangular cross-sectional shape, and in which a central portion of each of an inner face and an outer face is recessed. By using the O-ring 141 having such a configuration, the contact area of the outer face 237b of the protruding section 237 can be decreased, and the slidability of the protruding section 237 can be improved while maintaining the adhesion to the protruding section 237 (sealability).

As shown in FIG. 19A, the ball chamber 212 has an opening section 212a which communicates with the opening 117b of the contact section 117 on the upper face. The ball 113 has a diameter larger than the inner diameter of the opening section 212a, and therefore has a function to block the opening section 212a when a portion of the ball 113 sinks in the opening section 212a. As described above, the ball 113 floats in the drug solution, and therefore when the drug solution is present between the ball chamber 212 and the opening section 211a and the ball 113 is in a stationary state, a portion of the ball 113 on the upper side blocks the opening section 212a, and thereby dripping of the drug solution from the nozzle section 211 is suppressed.

A distance h between the lower face (outer face) 242a of the bottom section 242 of the protruding section 237 and the upper face 117a of the contact section 117 is equal to the above-mentioned stroke (the moving distance in the positive and negative Z-axis direction of the drug solution storage section 250). That is, when the drug solution storage section 250 is pushed downward once, the drug solution in an amount (predetermined amount) equal to the volume obtained by multiplying the internal cross-sectional area of the stroke chamber 218 by the distance h is discharged from the nozzle section 211. The predetermined amount can be adjusted mainly by changing the stroke, and is preferably 10 µL or more and 1 mL or less. According to this, the drug solution in a volume corresponding to the type or size of the tissue specimen (pathological specimen), the type of the drug solution, or the like can be discharged. In this embodiment, the above-mentioned predetermined amount of discharge per push is set to 50 µL.

This stroke can be changed by changing the thickness of the ball stopper section 215 located on the lower face of the ball chamber 212 and provided attachably to and detachably from the ball chamber 212. That is, the stroke can be made variable by preparing the ball stopper section 215 having a different thickness, and replacing the ball stopper section 215 with another one so as to achieve a necessary thickness.

Further, as shown in FIG. 23, a plurality of ball stopper sections 215 are prepared, and a second ball stopper section 215a configured to have a thickness t is stacked and disposed on the previously disposed ball stopper section 215, whereby the stroke corresponding to the thickness t of the second ball stopper section 215a can be set to a distance h-t. As in this example, the stroke can be made variable also by using a plurality of ball stopper sections 215 and 215a. Incidentally, in the case where a plurality of ball stopper sections 215 and 215a are used in a stacked state in this manner, it is preferred that the ball stopper sections 215 and 215a are disposed so that the opening sections 217 provided in the respective ball stopper sections 215 and 215a are overlapped with each other, and bonded to each other to form an integrated body by, for example, thermal fusion or the like, and the resulting material is used. According to the configuration of the ball stopper sections 215 and 215a in this manner, the movement of the drug solution can be reliably performed.

On the cylindrical inner face of the valve 163, the movable section 163a is provided. The valve 163 is fused to a wall portion of the drug solution chamber 160 using, for example, a thermal fusion method, an ultrasonic fusion method, or the like in the same manner as in the above-mentioned first embodiment. In this thermal fusion, fusion is performed at, for example, 4 sites along the outer periphery of the valve 163, for example, as indicated by the arrow W1 shown in FIG. 19A. However, the fusion sites are not limited to four sites and may be any number of sites. The configuration and operation of the valve 163 and the movable section 163a are the same as those in the first embodiment described above, and therefore, the description thereof is omitted here.

FIG. 19B shows a state where the drug solution storage section 250 is pushed downward. Such a state is referred to as "discharge state". As shown in FIG. 19B, when the drug solution storage section 250 is pushed downward with respect to the case section 210, the protruding section 237 moves downward in the stroke chamber 218 as compared with the initial state.

At this time, the internal volume of the stroke chamber 218 is compressed, and therefore, positive pressure is generated. By the positive pressure, the ball 113 is pushed downward, and the blocking of the opening section 212a by the ball 113 is released, and the drug solution is discharged from the nozzle section 211 (see FIG. 17). At the same time, by the downward movement of the protruding section 237, the blocking of the through-hole 243 by the O-ring 141 is also released as shown in FIG. 22B. Further, since the internal pressure of the protruding section 237 does not become negative, the movable section 163a of the valve 163 is maintained in a state where the pair of films is closely adhered to each other.

The groove width of the through-hole 243 provided in the protruding section 237 is narrower than the drug solution path downstream of the stroke chamber 218, and therefore, the through-hole 243 functions as a communication hole so as to prevent the generation of negative pressure in the stroke chamber 218 in the discharge state. Further, also in the discharge state, the O-ring 141 and the outer face 237b of the protruding section 237 are closely adhered to each other so as to maintain airtightness, and thus, the drug solution is prevented from moving along the outer face 237b and leaking out to the housing section 219.

FIG. 19C shows a state in the middle of returning from the discharge state to the initial state after completion of discharge of the drug solution. More specifically, when the lower face (outer face) 242a of the bottom section 242 of the protruding section 237 and the upper face 117a of the contact section 117 come into contact with each other to complete downward pushing of the drug solution storage section 250, the drug solution storage section 250 moves upward by the biasing force of the spring 145. In conjunction with this, the protruding section 237 also moves upward in the stroke chamber 218. At this time, negative pressure is generated in the stroke chamber 218, and therefore, the ball 113 is sucked up and blocks the opening section 212a again. Due to this, the discharge of the drug solution from the nozzle section 211 is stopped.

On the other hand, the through-hole 243 is opened, and therefore, the drug solution inside the protruding section 237 is supplied to the stroke chamber 218 through the through-hole 243 so as to release the negative pressure. At this time, by the negative pressure, the internal pressure of the protruding section 237 also becomes negative with respect to the drug solution chamber 260. Therefore, the movable section 163a is opened so that the drug solution chamber 260 and the inside of the protruding section 237 communicate with each other and the drug solution is supplied inside the protruding section 237 from the drug solution chamber 260. In this manner, the state transitions from the discharge state to the initial state.

In the drug solution path described above, a portion from the through-hole 243 of the protruding section 237 to the opening section 211a corresponds to a discharge mechanism. That is, the discharge mechanism is provided in the drug solution flow path of the case section 210 (see FIG. 17) and includes the stroke chamber 218, the O-ring 141, the ball chamber 212, the ball 113, and the ball stopper section 215. By the discharge mechanism, the drug solution stored in the drug solution storage section 250 (drug solution chamber 260) is discharged in a predetermined amount (50 µL) from the nozzle section 211 by one push.

Incidentally, as described above with reference to FIG. 23, in the case where the second ball stopper section 215a configured to have a thickness t is stacked and disposed on the previously disposed ball stopper section 215, the stroke can be decreased. According to the configuration as shown in FIG. 23, the predetermined amount of the drug solution to be discharged from the nozzle section 211 by one push can be changed, for example, from 50 μL to 30 μL.

The forming materials of the drug solution storage section 250 and the case section 210 constituting the reagent cartridge 200 and the components constituting these sections are not particularly limited, and it is preferred to use a resin, a metal, or the like, which is hardly affected by a liquid such as the drug solution to be stored, and with which a component, an additive, an impurity, or the like contained in the forming material is hardly eluted in the drug solution. According to this, the occurrence of denaturation or deterioration of a liquid to be stored is suppressed, and also the reliability of pathological diagnosis results can be improved. In particular, as the forming material of a component constituting the drug solution path, it is preferred to use a resin from the viewpoint of ease of molding the component or the like. Examples of such a resin include polymer compounds such as polyethylene, polypropylene, polyphenylene ether, polyphenylene sulfide, polystyrene, polyamide, polyacetal, an acrylonitrile-butadiene-styrene copolymer (ABS), urethane, an acrylic resin, polycarbonate, polybutylene terephthalate (PBT), ethylene propylene rubber (EPM), ethylene propylene diene rubber (EPDM), nitrile rubber (NBR), butyl rubber, and silicone rubber, and one or more types selected from the group consisting of these compounds can be applied. In the case where the drug solution to be stored is an oil (liquid paraffin), it is preferred to apply nitrile rubber (NBR) as the forming material of a component constituting the ball chamber 212, the contact section 117, and the valve 163 because it prevents swelling by the oil (liquid paraffin). Further, the forming material to be used for the case section 210 and the forming material to be used for the drug solution storage section 250 may be the same or different.

With the use of the reagent cartridge 200 according to the second embodiment described above, the residual amount of the stored drug solution can be easily ascertained. More specifically, the presence or absence of the drug solution inside the drug solution chamber 260 can be optically confirmed using the two optical paths (the first optical path α and the second optical path β) from the outside of the reagent cartridge 200. Therefore, it is not necessary to confirm the residual amount of the drug solution by visual observation, and it becomes easy to ascertain the time when the reagent cartridge 200 is to be replaced. That is, the reagent cartridge 200 which is favorable for the below-mentioned pathological specimen preparation device 300 (see FIG. 26) to be used in an intraoperative pathological diagnosis can be provided.

Further, with the use of the reagent cartridge 200 according to the second embodiment, the stroke by pushing the drug solution storage section 250 downward can be made variable by replacing the ball stopper section 215. According to this, the variation in the push-in amount by pushing the drug solution storage section 250 downward once can be suppressed.

Tissue Specimen

Figure 24:
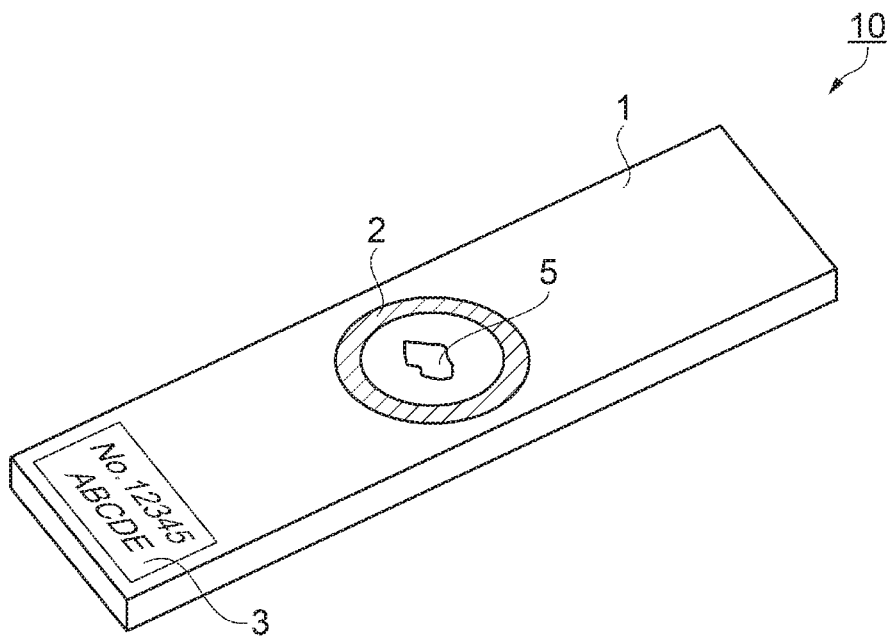
FIG. 24 is a perspective view showing a substrate having a tissue specimen fixed thereto.

Next, a tissue specimen will be described with reference to FIG. 24. FIG. 24 is a perspective view showing a substrate having a tissue specimen fixed thereto.

From a pathological specimen to be prepared in a pathological department, important information on diagnosis and prognosis of a patient, and selection of medical treatment is obtained. As a method for preparing a pathological specimen, an immunohistochemical staining (IHC) method for observing the expression level of a protein in a tissue or a cell or an in situ hybridization (ISH) method for observing the expression level of a gene in a tissue or a cell while observing the shape of the tissue or the cell as a tissue specimen, or the like is exemplified.

As shown in FIG. 24, a tissue specimen 5 to be used in the preparation of a pathological specimen is fixed to a substrate 1. As the substrate 1, a colorless and transparent microscope slide which is standardized in JIS R 3703:1998 and has a width of 26 mm, a length of 76 mm, and a thickness of 1.1 mm is used. On the substrate 1, in order to hold a liquid such as a drug solution to be supplied to the fixed tissue specimen 5 within a predetermined range, for example, a water-repellent ring 2 is formed. The tissue specimen 5 is fixed inside the water-repellent ring 2, for example, in a sliced state. The water-repellent ring 2 may be formed by applying a water repellent agent in a ring form to the substrate 1, or a ring-shaped sticker having water repellency may be attached to the substrate 1. The water-repellent ring 2 may be formed so as to surround the tissue specimen 5 on the substrate 1 having the tissue specimen 5 fixed thereto. The shape of the water-repellent portion of the water-repellent ring 2 is not limited to a circular shape, and may be a polygonal shape such as a rectangular shape.

In the substrate 1, a marking region 3 for discriminating the fixed tissue specimen 5 is provided on one end portion side in the longitudinal direction of the substrate 1. On the marking region 3, for example, a sticker on which the name, ID number, or the like of the fixed tissue specimen 5 is written maybe attached, or a coating face on which the name, ID number, or the like of the fixed tissue specimen 5 can be written may be formed.

The number of water-repellent rings 2 to be formed for the substrate 1 is not limited to 1, and for example, two water-repellent rings 2 may be formed for the substrate 1. An active tissue specimen is fixed within one water-repellent ring 2, and a negative tissue specimen for comparison may be fixed within the other water-repellent ring 2. Hereinafter, the substrate 1 having the tissue specimen 5 fixed thereto is referred to as "substrate 10".

Third Embodiment

Pathological Specimen Preparation Device

Figure 25:
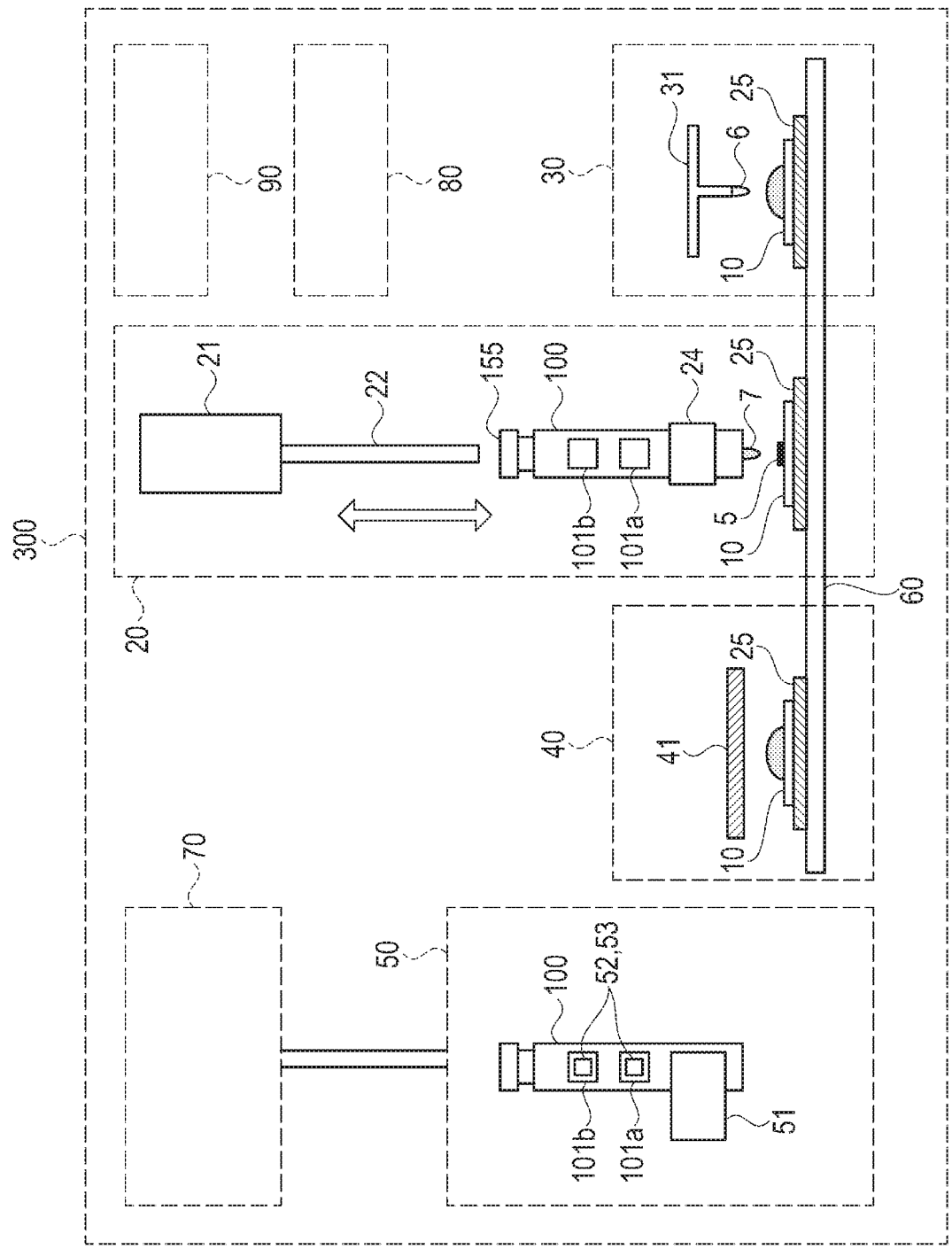
FIG. 25 is a schematic outline view showing a structure of a pathological specimen preparation device according to a third embodiment.

The pathological specimen preparation device according to a third embodiment will be described with reference to FIG. 25. FIG. 25 is a schematic outline view showing a structure of the pathological specimen preparation device. In a pathological specimen preparation device 300 shown in FIG. 25, either of the above-mentioned reagent cartridges 100 and 200 of the first embodiment and the second embodiment can be used, however, for convenience of explanation, a configuration using the reagent cartridge 100 will be illustrated and described.

The pathological specimen preparation device 300 according to this embodiment includes a cartridge operation section 20, a washing section 30, an electric field stirring section 40, a drug solution information acquisition section 50, a stage moving mechanism 60, an arithmetic section 70, a control unit 80, a display section 90, etc.

The pathological specimen preparation device 300 shown in FIG. 25 includes a holding section 24 capable of attaching and detaching the reagent cartridge 100 thereto and therefrom, a stage 25 capable of supporting the substrate 10 having the tissue specimen 5 fixed thereto, and the cartridge operation section 20 capable of supplying a reagent 7 as the drug solution stored in the reagent cartridge 100 to the substrate 10 supported by the stage 25. The cartridge operation section 20 has an electric pusher 22 as a pusher capable of a reciprocating motion in the Z-axis direction. The electric pusher 22 comes into contact with the upper face (cartridge lid 155) of the drug solution storage section 150 of the reagent cartridge 100 attached to the holding section 24 by the reciprocating motion in the Z-axis direction so as to push and move the drug solution storage section 150 downward (in the negative Z-axis direction).

The washing section 30 can supply a washing solution 6 to the substrate 10 supported by the stage 25. The electric field stirring section 40 can perform stirring by applying an electric field to the reagent 7 or the washing solution 6 supplied to the substrate 10 supported by the stage 25. The stage moving mechanism 60 can move the stage 25 to the washing section 30, the electric field stirring section 40, and the cartridge operation section 20. The drug solution information acquisition section 50 includes an emission section 52 which can emit a light beam onto a first optical path α and a second optical path β, and a light receiving section 53. The arithmetic section 70 calculates the luminous quantity of the light beam received by the light receiving section 53 and converts the luminous quantity into an electrical signal. The control unit 80 can display information based on the arithmetic result of the arithmetic section 70 on the display section 90.

The stage moving mechanism 60 is, for example, an electric stepping motor-driven conveyor. The stage moving mechanism 60 moves the stage 25 in a fourth direction in which the cartridge operation section 20, the washing section 30, and the electric field stirring section 40 are disposed. According to this, treatments such as supplying of the reagent 7, washing with the washing solution 6, and stirring of the reagent 7 or the washing solution 6 supplied can be performed for the substrate 10 (tissue specimen 5) placed on the stage 25. Here, the fourth direction is, for example, the positive and negative Y-axis direction, but is not limited thereto. The fourth direction may be the positive and negative Z-axis direction, the positive and negative X-axis direction, or a direction inclined with respect to the XYZ axes other than these directions. In FIG. 25, a power supply device, a drive section, a structure, etc. are omitted.

In the method for preparing a pathological specimen such as IHC or ISH, examples of a common step include a washing treatment step of supplying the washing solution 6 to the substrate 10 and performing washing and a reaction treatment step of supplying the reagent 7 to the substrate 10 and allowing the tissue specimen 5 to react with the reagent 7. Examples of the reagent 7 include a primary antibody reagent and a secondary antibody reagent to be used in an antigen-antibody reaction treatment step, and a coloring reagent to be used in a coloring reaction treatment step as described above. The washing treatment step is performed not only before such a reaction treatment step, but also after the reaction treatment step for removing the remaining unnecessary reagent 7. In the pathological specimen preparation device 300, in order to allow the preparation of a pathological specimen to efficiently proceed, an electric field stirring step of performing stirring by applying an electric field to a liquid such as the reagent 7 discharged on the substrate 10 from the reagent cartridge 100 and supplied to the tissue specimen 5 is adopted. The substrate 10 is moved back and forth and subjected to the washing treatment step, the reaction treatment step, and the electric field stirring step by the stage moving mechanism 60.

Cartridge Operation Section

The cartridge operation section 20 includes the holding section 24, the electric pusher 22, and a drive section 21 for driving the electric pusher 22. The drive section 21 is, for example, a stepping motor. In the case where the reagent cartridge 100 is located at a position where the reagent 7 is discharged to the substrate 10, when the electric pusher 22 is driven and pushed downward, the cartridge lid 155 of the reagent cartridge 100 and the tip of the electric pusher 22 come into contact with each other. Further, the electric pusher 22 is pushed downward, and therefore, the cartridge lid 155 is pushed downward. The case section 110 of the reagent cartridge 100 is held by the holding section 24 by the step 115 (see FIG. 4), and therefore, the drug solution storage section 150 moves while sinking in the case section 110. By moving the drug solution storage section 150 by a distance corresponding to the stroke (distance h), the reagent 7 is discharged from the reagent cartridge 100 and supplied to the tissue specimen 5.

Washing Section

The washing section 30 supplies the washing solution 6 from a nozzle 31 to the substrate 10 placed on the stage 25. The nozzle 31 is connected to a washing solution tank (not shown) in which the washing solution 6 is stored through a pipe via a pump (not shown), and the washing solution 6 is supplied from the washing solution tank. A plurality of washing solution tanks and a plurality of pumps may be used according to the types of the washing solution 6. For example, a washing solution tank in which PBS, TBS, or the like is stored, a washing solution tank in which pure water is stored, and the like for preventing drying or the like of the tissue specimen 5 and maintaining the fixed state of the tissue specimen 5 are individually used. The pipes from the plurality of washing solution tanks to the nozzle 31 are switched by opening and closing a valve, and the washing solution may be selectively supplied to the substrate 10 from the nozzle 31.

The washing solution 6 used for washing is eliminated from the substrate 10 as a waste liquid. The waste liquid is collected by a gutter (not shown) and stored in a waste liquid tank (not shown) disposed on the lower side of the pathological specimen preparation device 300. A mechanism for eliminating the washing solution from the substrate 10 is not particularly limited, and a known method can be used. In the pathological specimen preparation device 300, in the washing section 30, a method for eliminating the waste liquid by tilting the substrate 10 together with the stage 25 is used. A plurality of types of the waste liquid tanks may also be used according to the types in the same manner as the washing solution tanks.

Electric Field Stirring Section

The electric field stirring section 40 performs stirring by applying an electric field to a liquid such as the reagent 7 or the washing solution 6 supplied to the substrate 10 placed on the stage 25. Therefore, in the electric field stirring section 40, an upper electrode 41 as an electrode on the upper side and the stage 25 which also functions as a lower electrode as an electrode on the lower side are disposed at a predetermined distance facing each other vertically (in the Z-axis direction). Between the upper electrode 41 and the stage 25, for example, a rectangular potential which changes between 0 kV and 4 kV is applied in a predetermined cycle, and thus, an electric field is generated. By a Coulomb force generated with an increase in the potential, the liquid on the substrate 10 is deformed as if it were drawn toward the upper electrode 41 side. The Coulomb force decreases with a decrease in the potential, and the liquid drawn toward the upper electrode 41 side is deformed as if it were dropped by gravity. Therefore, since the potential periodically changes, the liquid is repeatedly deformed, and thus is subjected to stirring.

Drug Solution Information Acquisition Section

The reagent cartridge 100 is transported to the drug solution information acquisition section 50 by the holding section 24 and a transport mechanism (not shown). The drug solution information acquisition section 50 includes the emission section 52 and the light receiving section 53, with which the presence or absence of the drug solution in the reagent cartridge 100 is detected, and a barcode reader 51 which reads the barcode 126 (see FIG. 4) relating to the information of the reagent 7 attached to the reagent cartridge 100, and is connected to the arithmetic section 70, the control unit 80, and the like.

In the drug solution information acquisition section 50, two sets of the emission section 52 and the light receiving section 53 are disposed side by side in the Z-axis direction corresponding to the second window sections 101*a* and 101*b* of the reagent cartridge 100 in a state where the light beam emitted from the emission section 52 can be received by the light receiving section 53. According to this, when the reagent cartridge 100 is transported to the drug solution information acquisition section 50, the presence or absence of the reagent 7 in the reagent cartridge 100 can be detected using the first optical path α and the second optical path β (see FIG. 8) of the reagent cartridge 100 described above.

The emission section 52 and the light receiving section are, for example, reflection-type distance measuring sensors, and the wavelength of the light beam emitted from the emission section 52 is preferably 570 nm or more and 750 nm or less. By using the light beam having a wavelength within the above range, the occurrence of denaturation of a component contained in the reagent 7, for example, a protein or the like can be suppressed. Further, the light beam is outside the infrared range, and therefore, excessive heating of the reagent 7 can be suppressed. In addition, attenuation of the light beam by being absorbed by the molecular structure of a compound contained in the drug solution can be suppressed. In this embodiment, as the light source of the emission section 52, a red light emitting diode is used.

The light beam emitted from the emission section 52 travels through the first optical path α and the second optical path β, and is incident from the second window sections 101*a* and 101*b*, and then reaches the reflection sections 161*a* and 161*b* (see FIG. 8) through the first window sections 151*a* and 151*b* (see FIG. 8) and the inside of the drug solution chamber 160. Then, the light beam is reflected by the reflection sections 161*a* and 161*b* and thereafter travels through the first optical path α and the second optical path β in the reverse direction, and is emitted from the second window sections 101*a* and 101*b*, and received by the light receiving section 53. At this time, in the case where the reagent 7 is present on the first optical path α and the second optical path β in the drug solution chamber 160 (see FIG. 8), the value of a voltage detected by the reflection-type distance measuring sensor is decreased as compared with the case where the reagent 7 is not present. Therefore, by calculating the value of the voltage of the reflection-type distance measuring sensor by the arithmetic section 70 electrically connected to the drug solution information acquisition section 50, the presence or absence of the reagent 7 on the first optical path α and the second optical path β in the drug solution chamber 160 can be detected.

In this embodiment, the emission section 52 and the light receiving section 53 are disposed as an integrated body, however, the invention is not limited thereto, and the emission section 52 and the light receiving section 53 may be disposed separately.

In the drug solution information acquisition section 50, by the barcode reader 51, the barcode 126 relating to the information of the drug solution attached to the reagent cartridge 100 is read. According to this, the information on the stored reagent 7 such as the type, the amount of content, the date of preparation, or the matters to be attended can be collected and managed by the control unit 8 or the like.

Arithmetic Section

The pathological specimen preparation device 300 includes the arithmetic section 70 which calculates a voltage value as the luminous quantity of the light beam received by the light receiving section 53 and converts the luminous quantity into an electrical signal. The arithmetic section 70 has, for example, a CPU (Central Processing Unit) and a memory, and calculates the presence or absence of the reagent 7 from the voltage value output from the light receiving section 53 (reflection-type distance measuring sensor). In other words, the arithmetic section 70 can determine the presence or absence of the drug solution on an optical path or another optical path through which the light beam has passed from the luminous quantity of the light beam. The arithmetic section 70 may have a control function for allowing the pathological specimen preparation device 300 to perform various operations.

The arithmetic section 70 and the cartridge operation section 20 are electrically connected to each other, and by using the arithmetic section 70, the value of the residual amount of the reagent 7 in the reagent cartridge 100 is calculated from the integrated value of the discharged amount of the reagent 7 by the cartridge operation section 20 and the presence or absence of the reagent 7 calculated from the voltage value (the luminous quantity of the light beam) and may be sent to the control unit 80.

Control Unit

The control unit 80 has a control function for allowing the pathological specimen preparation device 300 to perform various operations. Further, the control unit 80 creates display data based on the presence or absence of the reagent 7 or the value of the residual amount of the reagent 7 in the reagent cartridge 100 calculated by the arithmetic section 70, or the like, and displays the data on the display section 90. The control unit 80 may be included in the arithmetic section 70.

Display Section

The pathological specimen preparation device 300 includes a display section 90, and calculates the presence or absence of the drug solution on the first optical path α and the second optical path β in the drug solution chamber 160 through which the light beam has passed from the luminous quantity of the light beam and displays it on the display section 90. Further, on the display section 90, information such as the value of the residual amount of the reagent 7 in the reagent cartridge 100 can be displayed.

The display section 90 is, for example, a liquid crystal display panel, and may include an input section of a touch panel system superimposed on the display section 90. According to this, the display section 90 is electrically connected to the control unit 80 and has a function to display the presence or absence of the reagent 7 in the reagent cartridge 100 and the residual amount thereof, and in addition thereto, has a function as an operation board in the pathological specimen preparation device 300 by various operation buttons as the input section.

The time when the presence or absence of the reagent 7 described above is to be detected is not particularly limited, however, the detection may be performed at a time when the reagent cartridge 100 is attached to the pathological specimen preparation device 300. That is, when the reagent cartridge 100 is attached, a light beam is emitted from the emission section 52, the presence or absence of the reagent 7 on the first optical path α and the second optical path β in the drug solution chamber 160 through which the light beam has passed is calculated and may be displayed on the display section 90. The detection is preferably performed automatically. By notifying the presence or absence of the reagent 7 or the like at a time when the reagent cartridge 100 is attached to the pathological specimen preparation device 300, that is, at a preliminary stage of the preparation of a pathological specimen, a worker can efficiently perform the operation of preparation of a pathological specimen thereafter. The detection may be manually performed according to the instruction of a worker.

Other Configurations

The pathological specimen preparation device 300 may be mounted with a CCD (Charge-Coupled Device) image sensor which images a marking region 3 (see FIG. 24) of the substrate 10 placed on the stage moving mechanism 60. By the CCD image sensor, the information of the tissue specimen such as the name and ID number of the tissue specimen 5 displayed on the marking region 3 is read and may be managed by the control unit 80. Such information may be displayed on the display section 90.

The pathological specimen preparation device 300 may be mounted with a plurality of reagent cartridges 100, that is, a reagent cartridge set. For example, a plurality of holding sections 24 are provided on a loop-shaped transport mechanism, and the reagent cartridge set is placed on the transport mechanism. A configuration in which while moving the transport mechanism in a loop, a desired reagent cartridge 100 can be selected according to the type of the tissue specimen 5 or the treatment may be adopted.

The pathological specimen preparation device 300 may be provided with a plurality of stages 25. The number of stages 25 is not particularly limited, but is, for example, preferably 2 to 10, more preferably 3 to 8. By setting the number of stages 25 within the above range, while improving the work efficiency of the preparation of a pathological specimen, the pathological specimen preparation device 300 can be relatively miniaturized.

Figure 26:
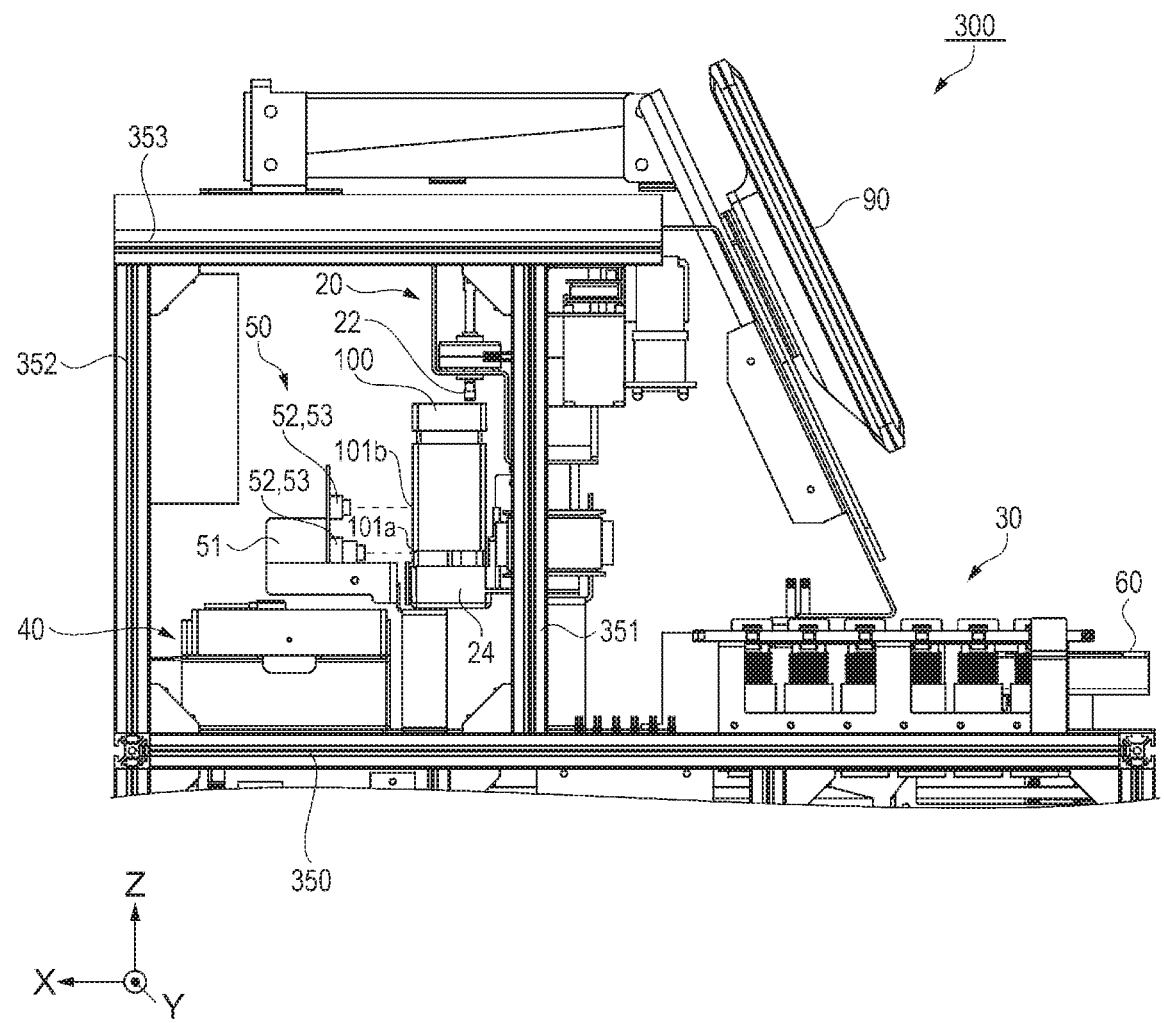
FIG. 26 is a schematic view showing an example of a drug solution information acquisition section, etc.

Next, one example of the form of the drug solution information acquisition section 50, etc. will be described with reference to FIG. 26. FIG. 26 is a schematic view showing an example of the drug solution information acquisition section, etc. The pathological specimen preparation device 300 of FIG. 26 is shown in a state as viewed from the left side of the display section 90 which also functions as an operation panel when detaching the exterior, and the illustration of the structure of the lower part is omitted.

As shown in FIG. 26, in the pathological specimen preparation device 300, a framework is formed by structures 350, 351, 352, and 353 made of a metal, and each of the below-mentioned sections is supported thereby. In FIG. 26, the cartridge operation section 20 including the electric pusher 22, the washing section 30, the electric field stirring section 40, the drug solution information acquisition section 50 including the emission section 52, the light receiving section 53, etc., the stage moving mechanism 60, and the like are shown.

The reagent cartridge 100 is held by the holding section 24. On the upper side of the reagent cartridge 100, the cartridge operation section 20 is disposed, and the tip of the electric pusher 22 can come into contact with the upper face of the reagent cartridge 100.

On the positive X-axis direction of the reagent cartridge 100, the drug solution information acquisition section 50 is disposed, and two sets of the emission section 52 and the light receiving section 53 are provided in the Z-axis direction at positions facing the second window sections 101a and 101b of the reagent cartridge 100. The distances between the two sets of the emission section 52 and the light receiving section 53 provided and the corresponding first window sections 151a and 151b (both see FIG. 8) are substantially equal. That is, the emission section 52 and the light receiving section 53 facing the second window section 101a (first window section 151a) are provided at a position closer to the reagent cartridge 100 than the emission section 52 and the light receiving section 53 facing the second window section 101b (first window section 151b).

In the positive X-axis direction of the emission section 52 and the light receiving section 53, the barcode reader 51 is disposed. That is, when the reagent cartridge 100 is placed in this posture, the detection of the presence or absence of the reagent 7 or the barcode 126 (see FIG. 4) is performed. Further, the electric field stirring section 40 is disposed obliquely below the drug solution information acquisition section 50.

On the obliquely below the display section 90, the washing section 30 is disposed. FIG. 26 shows a state where the stage 25 is positioned in the washing section 30. The stage moving mechanism 60 moves the stage 25 having the substrate 10 placed thereon to the lower side where the reagent cartridge 100 is held or to the electric field stirring section 40 according to the pathological specimen preparation steps, whereby the substrate 10 (not shown) can be subjected to various operations.

As described above, with the use of the reagent cartridge 100, the reagent cartridge set, and the pathological specimen preparation device 300 according to the above-mentioned embodiment, the following effects can be obtained.

The residual amount of the stored reagent 7 can be easily ascertained. More specifically, the presence or absence of the reagent 7 inside the drug solution chamber 160 can be optically confirmed using the first optical path α and the second optical path β from the outside of the reagent cartridge 100. Therefore, it is not necessary to confirm the residual amount of the reagent 7 by visual observation, and it becomes easy to ascertain the time when the reagent cartridge 100 is to be replaced. That is, the reagent cartridge 100 which is favorable for the pathological specimen preparation device 300 to be used in an intraoperative pathological diagnosis can be provided.

Since two optical paths: the first optical path α and the second optical path β are included, the presence or absence of the reagent 7 inside the drug solution chamber 160 corresponding to each optical path can be confirmed. More specifically, the presence or absence of the reagent 7 can be detected in two stages: an amount of 10 mL to 15 mL; and an amount of 800 μL. Further, when the "absence of the drug solution" on the second optical path β is detected, the calculated value of the consumed amount of the drug solution can be corrected by collation with the calculation of the residual amount of the reagent 7 calculated from the discharged amount of the reagent 7 and the number of discharges. According to this, the consumed amount of the reagent 7 thereafter is estimated and can be displayed on the display section 90 of the pathological specimen preparation device 300.

Since the drug solution chamber 160 of the reagent cartridge 100 includes the constricted section 160a, the first optical path α is provided on the tip side with respect to the nozzle section 111 in the drug solution chamber 160. Therefore, as compared with the case where the first optical path α is not provided on the tip side, a state where the residual amount of the reagent 7 is small can be ascertained. Further, the drug solution chamber 160 has a shape constricted on the tip side (constricted section 160a), and therefore, as compared with the case where the shape thereof is not a constricted shape, a state where the residual amount of the reagent 7 is smaller can be confirmed. Accordingly, it becomes possible to ascertain a state where the residual amount of the reagent 7 in the drug solution chamber 160 is smaller, and thus, the reagent 7 can be used up until reaching the state, and the dead volume can be reduced.

The reagent cartridge 100 has the cartridge lid 155 including the communication hole 157, and the cartridge lid 155 can be attached and detached, and therefore, the cartridge lid 155 is detached from the drug solution storage section 150, and the reagent 7 can be stored in the drug solution chamber 160. Further, mixing or contamination with a foreign substance from the outside into the stored reagent 7 can be prevented. Further, the inside and the outside of the drug solution chamber 160 communicate with each other through the communication hole 157, and therefore, even if the reagent 7 is discharged so as to reduce the stored reagent 7, negative pressure is hardly generated in the drug solution chamber 160. Accordingly, the discharge of the reagent 7 can be promptly performed.

Since the reagent cartridge 100 has the locking section 105, the reagent cartridge 100 can be stably attached to the pathological specimen preparation device 300 using the locking section 105.

Since the reagent cartridge 100 can discharge the reagent 7 in a predetermined amount of 10 μL or more and 1 mL or less from the nozzle section 111, the reagent 7 in a volume corresponding to the type or size of the tissue specimen 5, the type of the reagent 7, or the like can be supplied to the tissue specimen 5. Since the drug solution chamber 160 can store the reagent 7 in an amount of 1 mL or more and 50 mL or less, with respect to a treatment using 200 μL of the drug solution per treatment, the volume for about 250 times at the maximum can be ensured, and also the increase in the size of the reagent cartridge 100 can be suppressed.

By the barcode 126, the information on the stored reagent 7 such as the type, the amount of content, the date of preparation, or the matters to be attended can be found. Further, such information can be collected and managed.

By using the reagent 7 discharged from the reagent cartridge 100, an antigen-antibody reaction treatment, a coloring reaction treatment, a deparaffinization treatment, an activation treatment, an endogenous peroxidase (PO) blocking treatment, a washing treatment, or the like can be performed.

By using the reagent cartridge set, in treatments such as an antigen-antibody reaction treatment, a coloring reaction treatment, a deparaffinization treatment, an activation treatment, an endogenous peroxidase (PO) blocking treatment, and a washing treatment, two or more types of treatments can be performed.

By using the pathological specimen preparation device 300, the drug solution storage section 150 is moved downward by the electric pusher 22 and the reagent 7 is discharged from the nozzle section 111, so that the reagent 7 can be supplied to the tissue specimen 5 fixed to the substrate 10. The light receiving section 53 receives a light beam emitted from the emission section 52 onto the first optical path α and the second optical path β, and a voltage value as the luminous quantity of the light beam received by the light receiving section 53 is calculated, whereby the presence or absence of the reagent 7 inside the drug solution chamber 160 through which the light beam has passed can be detected. That is, the residual amount of the reagent 7 in the reagent cartridge 100 can be confirmed.

Since the pathological specimen preparation device 300 includes the display section 90, a user of the pathological specimen preparation device 300 can be notified of information such as the presence or absence of the reagent 7 in the reagent cartridge 100. Further, at the time point when the reagent cartridge 100 is attached, the presence or absence of the reagent 7 in the reagent cartridge 100 is notified. Therefore, according to the residual amount thereof, it is possible to take measures such as planning of pathological specimen preparation or preparation of a new reagent cartridge 100. Moreover, the value of the residual amount of the reagent 7 is notified, and therefore, it becomes easy to make a plan for pathological specimen preparation.

Since the light beam emitted from the emission section 52 of the pathological specimen preparation device 300 has a wavelength of 570 nm or more and 750 nm or less, a visible light beam in a range from yellow light to red light is emitted. Therefore, since the wavelength of the light beam is farther away from ultraviolet light than that of blue light, the occurrence of denaturation of a component contained in the reagent 7, for example, a protein or the like can be suppressed. Further, the light beam is outside the infrared range, and therefore, excessive heating of the reagent 7 can be suppressed. In addition, attenuation of the light beam by being absorbed by the molecular structure of a compound contained in the reagent 7 can be suppressed.

Since the pathological specimen preparation device 300 includes the electric field stirring section 40, the tissue specimen 5 fixed to the substrate 10 can be washed using the washing solution 6. Further, by the electric field stirring, the efficiency of stirring is improved, and a time required for preparing a pathological specimen such as various reaction treatments and a washing operation is reduced. Moreover, by the stage moving mechanism 60, the substrate 10 is promptly moved to the electric field stirring section 40, the washing section 30, and the cartridge operation section 20. Accordingly, the treatment of the tissue specimen 5 can be rapidly performed.

In the description of the pathological specimen preparation device 300, the description has been made by showing an example using the reagent cartridge 100 of the first embodiment, however, the reagent cartridge 200 can be used in place of the reagent cartridge 100. Even in the case of using the reagent cartridge 200, the same effect as in the case of using the reagent cartridge 100 can be exhibited.

In addition, when the reagent cartridge 200 is used, the stroke which is the distance of movement by pushing the drug solution storage section 250 downward by the electric pusher 22 can be made variable by replacing the ball stopper section 215. According to this, when the drug solution storage section 250 is pushed downward by the electric pusher 22, the movement of the drug solution storage section 250 is stopped by the contact section 117 fixed by the ball stopper section 215. Therefore, the variation in the push-in amount by pushing the drug solution storage section 250 downward once can be suppressed.

Further, in the reagent cartridge 200 of the second embodiment, the storable amount of the reagent 7 in the drug solution chamber 260 is set to 1 mL or more and 30 mL or less, and the height dimension which is the dimension in the Z-axis direction shown in FIG. 10 is reduced (reduction in height) as compared with the case where the reagent cartridge 100 of the first embodiment is used, and therefore, the height of the pathological specimen preparation device 300 can be reduced, and thus, the pathological specimen preparation device 300 can be made compact.

Hereinafter, the effect of this embodiment will be specifically described by showing Examples with respect to the detection of the presence or absence of the drug solution of this embodiment.

EXAMPLES

An experiment in which the presence or absence of the drug solution (reagent 7) in the drug solution chamber 160 was detected using the reagent cartridge 100 was performed. More specifically, as the forming material of the drug solution storage section 150 (first window sections 151a and 151b) in the reagent cartridge 100, an acrylic resin was adopted. The thickness in the X-axis direction (the direction in which the first optical path α and the second optical path β transmit) in the first window sections 151a and 151b is about 2 mm. As the reflection sections 161a and 161b, a molded face inside the drug solution chamber 160 of the forming material was used.

As the reflection-type distance measuring sensor (the emission section 52 and the light receiving section 53), 0A41SK (a red light emitting diode, Sharp Corporation) was used, and as the drug solution, pure water was used. The first optical path α was used in Example 1, and the second optical path β was used in Example 2, and the detection voltages (mV) for "absence of drug solution" and "presence of drug solution" when a voltage of 5 V was input to the reflection-type distance measuring sensor were examined. In Example 1 and Example 2, the distance between the reflection-type distance measuring sensor and the first window section 151a is 30 mm.

The measured values (detection voltage) obtained by performing the measurement twice each and the average values are shown in Table 1. Further, the differences between the detection voltages were calculated as ΔVα and ΔVβ and are shown in Table 1.

TABLE 1

| | Example 1 (optical path α) [mV] | | | Example 2 (optical path β) [mV] | | |
|---|---|---|---|---|---|---|
| | Absence of drug solution | Presence of drug solution | ΔVα | Absence of drug solution | Presence of drug solution | ΔVβ |
| First time | 2135 | 2098 | 37 | 2132 | 1963 | 169 |
| Second time | 2145 | 2098 | 47 | 2138 | 1960 | 178 |
| Average | 2140 | 2098 | 42 | 2135 | 1962 | 173 |

As shown in Table 1, a clear difference between the detection voltages according to the presence or absence of the drug solution was observed in both Example 1 and Example 2. Accordingly, it was shown that the presence or absence of the drug solution can be easily ascertained in the reagent cartridge 100.

The detected detection voltages (mV) for the "absence of drug solution" and the "presence of drug solution" can be boosted using, for example, a booster circuit (not shown) such as an operational amplifier. By boosting the detection voltages (mV) in this manner, the difference between the detection voltages according to the presence or absence of the drug solution (ΔVα and ΔVβ) can be increased. Therefore, by using a booster circuit, the detection accuracy for the "absence of drug solution" and the "presence of drug solution" can be further improved.

Fourth Embodiment

Figure 27:
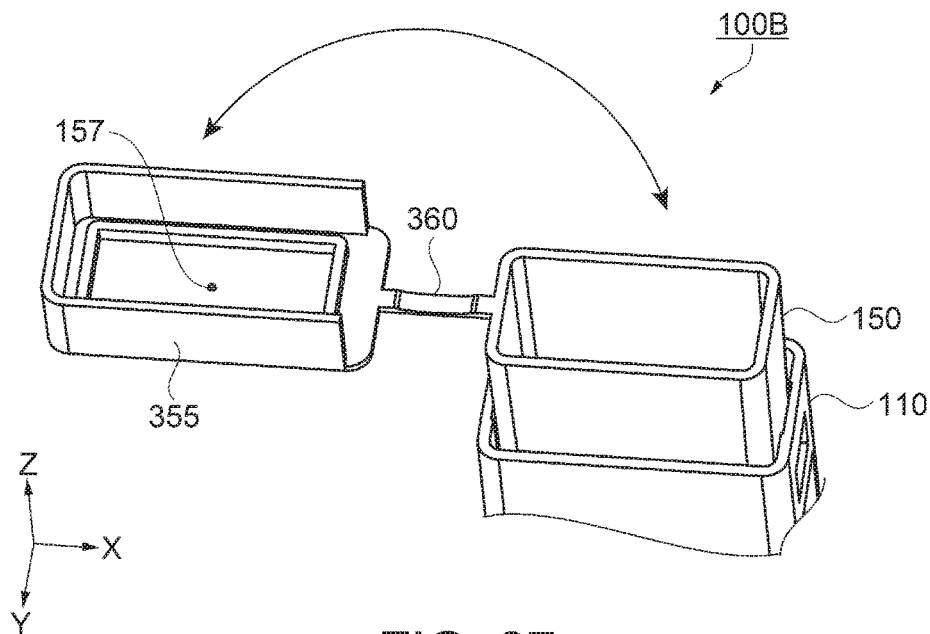
FIG. 27 is a schematic view showing a cartridge lid according to a fourth embodiment.
Figure 28:
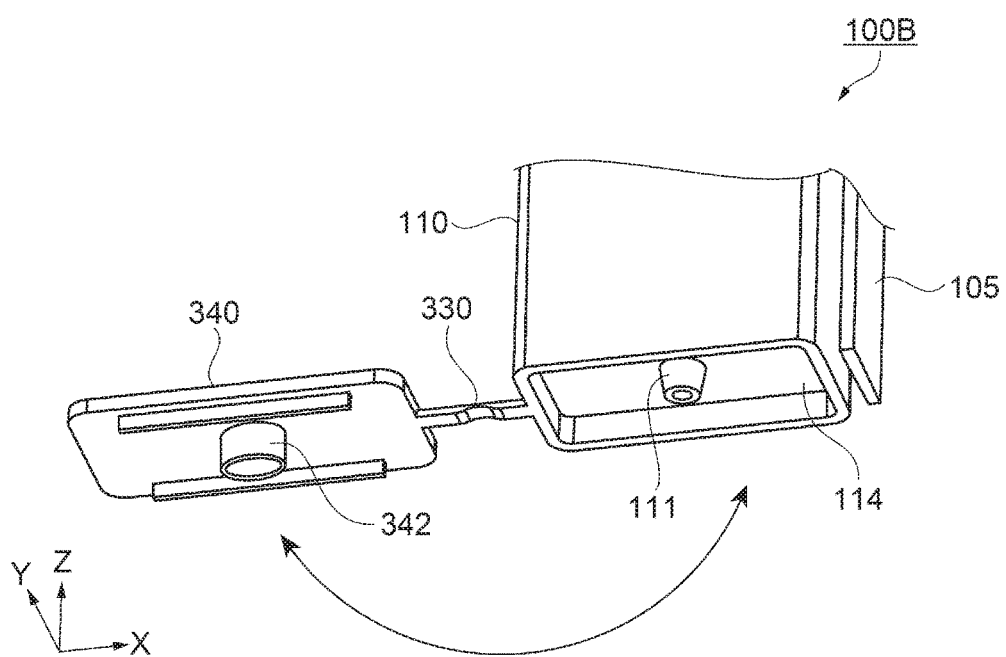
FIG. 28 is a schematic view showing a nozzle cap.

A reagent cartridge according to a fourth embodiment will be described with reference to FIGS. 27 and 28. FIG. 27 is a schematic view showing a cartridge lid according to the fourth embodiment. FIG. 28 is a schematic view showing a nozzle cap. A portion having the same configuration as that of the first embodiment is denoted by the same reference numeral, and a repetitive description is omitted.

Reagent Cartridge

External Appearance

As shown in FIG. 27, a reagent cartridge 100B according to this embodiment has a cartridge lid 355 which is formed integrally with a drug solution storage section 150 and can be attached to and detached from the drug solution storage section 150, and the cartridge lid 355 has a communication hole 157 which communicates with a drug solution chamber (not shown). Further, as shown in FIG. 28, the reagent cartridge 100B has a nozzle cap 340 which is formed integrally with a case section 110 and can be attached so as to cover a nozzle section 111.

In the reagent cartridge 100B shown in FIG. 27, the drug solution storage section 150 and the cartridge lid 355 are molded integrally through a connection portion 360. The cartridge lid 355 has a rib which is fitted to an upper edge of the drug solution storage section 150, and can be attached to and detached from the drug solution storage section 150 in the same manner as in the above-mentioned first embodiment. The connection portion 360 is formed of a forming material having flexibility, and the attachment and detachment of the cartridge lid 355 can be repeated.

In the reagent cartridge 100B shown in FIG. 28, the case section 110 and the nozzle cap 340 are molded integrally through a connection portion 330. The nozzle cap 340 has a rib which is fitted to a rib 114 on the bottom face of the case section 110. Therefore, the nozzle cap 340 can be attached to and detached from the bottom face of the case section 110. The connection portion 330 is formed of a forming material having flexibility, and the attachment and detachment of the nozzle cap 340 can be repeated.

The nozzle cap 340 has a liquid receiver 342 at a position corresponding to the nozzle section 111 when it is attached to the case section 110. The liquid receiver 342 has an open cylindrical shape and is configured such that when the nozzle cap 340 is attached to the case section 110, the nozzle section 111 is fit into the liquid receiver 342. The shape of the liquid receiver 342 is not limited to a cylindrical shape, and may be an open prismatic shape or the like.

The reagent cartridge 100B has the same configuration as that of the reagent cartridge 100 of the above-mentioned first embodiment except for the above-mentioned configuration. According to the above-mentioned configuration, with the use of the reagent cartridge 100B of the fourth embodiment, in addition to the effects of the first embodiment, the following effects can be obtained.

Since the cartridge lid 355 and the drug solution storage section 150 are an integrated body, the cartridge lid 355 can be prevented from being lost during an operation such as filling of the drug solution by opening the cartridge lid 355.

By attaching the nozzle cap 340 when the reagent cartridge 100B in use is detached from the pathological specimen preparation device 300, in the case where the drug solution remains in the nozzle section 111, the adhesion of the drug solution to the other members can be suppressed. Further, by the liquid receiver 342, the adhesion of the remaining drug solution to the other members can be further suppressed. Moreover, since the nozzle cap 340 and the case section 110 are an integrated body, the nozzle cap 340 can be prevented from being lost.

The entire disclosures of Japanese Patent Application No. 2017-179870 filed Sep. 20, 2017 and No. 2018-166986 filed Sep. 6, 2018 are expressly incorporated herein by reference.

The invention claimed is:

1. A reagent cartridge, comprising:
 a drug solution storage section which has a light transmissive first window section and a drug solution chamber capable of storing a drug solution;
 a case section which holds the drug solution storage section movably in a first direction and has a light transmissive second window section, a drug solution flow path, and a nozzle section communicating with the drug solution flow path;
 a biasing unit which biases the drug solution storage section in a direction opposite to the first direction with respect to the case section; and
 a discharge mechanism for discharging a predetermined amount of the drug solution stored in the drug solution chamber from the nozzle section by the moving motion of the drug solution storage section in the first direction within a predetermined range, wherein
 the second window section is provided on a first side face of the case section, and
 the first window section and the second window section are disposed along a second direction crossing the first direction to form an optical path with respect to the drug solution chamber.

2. The reagent cartridge according to claim 1, wherein the drug solution storage section has
 a constricted section disposed in the first direction, and
 a protruding section located on the side closer to the tip than the constricted section in the first direction, and
 the optical path includes the constricted section.

3. The reagent cartridge according to claim 2, wherein
 a portion of the drug solution chamber is exposed in a direction opposite to the first direction in a state where the drug solution storage section is held in the case section and the drug solution storage section has a light transmissive section having light transmissivity in the portion of the drug solution chamber, and
 the light transmissive section forms another optical path in parallel to the optical path.

4. The reagent cartridge according to claim 1, wherein
 the drug solution storage section has a second drug solution flow path which communicates with the drug solution chamber and is provided inside the protruding section,
 the second drug solution flow path includes a through-hole which is provided on the tip side in the first direction of the protruding section and passes through from the inner face to the outer face along the first direction of the protruding section, and a bottom section which closes the tip of the protruding section,
 the discharge mechanism is provided in the drug solution flow path, and includes a stroke chamber in which the protruding section is housed along the first direction,
 a ring member having elasticity, which is disposed on the drug solution storage section side of the stroke chamber, and on which the outer face of the protruding section is provided slidably in the first direction,
 a ball chamber which communicates with the stroke chamber,
 a spherical body which is housed in the ball chamber, and
 a ball stopper section which is disposed on the opposite side to the stroke chamber with respect to the spherical body of the ball chamber, and
 the through-hole is sealed by the ring member when the drug solution storage section is held in the case section by being biased in a direction opposite to the first direction with respect to the case section by the biasing unit, and
 the sealing by the ring member is released and the through-hole faces the stroke chamber when the drug solution storage section moves in the first direction from a state where the drug solution storage section is held in the case section.

5. The reagent cartridge according to claim 4, wherein
 the ball stopper section is provided attachably to and detachably from the ball chamber.

6. The reagent cartridge according to claim 4, wherein
 the ball stopper section includes an opening section having a circular planar shape, and
 the center of the circular opening section is located eccentrically with respect to the center of the spherical body housed in the ball chamber.

7. The reagent cartridge according to claim 4, wherein the ball stopper section includes an opening section having a polygonal shape through which the spherical body housed in the ball chamber is not inserted.

8. The reagent cartridge according to claim 1, wherein the drug solution is selected from the group consisting of a primary antibody reagent, a secondary antibody reagent, a coloring reagent, a tissue staining reagent, a nuclear staining reagent, an endogenous peroxidase blocking reagent, hematoxylin, a color developing reagent, a reagent for a deparaffinization treatment, a reagent for activation, and a washing solution.

9. A reagent cartridge set, comprising two or more types of reagent cartridges according to claim 8.

10. A pathological specimen preparation device, comprising:
 a holding section capable of attaching and detaching the reagent cartridge according to claim 1 thereto and therefrom;
 a stage capable of supporting a substrate having a tissue specimen fixed thereto; and
 a cartridge operation section capable of supplying the drug solution stored in the reagent cartridge to the substrate supported by the stage, wherein
 the cartridge operation section has a pusher capable of a reciprocating motion in the first direction, and
 the pusher comes into contact with the drug solution storage section of the reagent cartridge attached to the holding section by the reciprocating motion in the first direction so as to move the drug solution storage section in the first direction.

11. The pathological specimen preparation device according to claim 10, wherein the drug solution storage section has a light transmissive first window section and a light transmissive section in a portion exposed in a direction opposite to the first direction in a state where the drug solution storage section is held in the case section, and the case section has a light transmissive second window section, the first window section and the second window section form an optical path disposed along a second direction crossing the first direction with respect to the drug solution chamber, and the light transmissive section forms another optical path in parallel to the optical path, the device includes
- an emission section which can emit a light beam onto the optical path and the other optical path,
- a light receiving section, and
- an arithmetic section which calculates the luminous quantity of the light beam received by the light receiving section and converts the luminous quantity into an electrical signal, and the emission section and the light receiving section are disposed in a state where the light receiving section can receive the light beam emitted from the emission section.

12. The pathological specimen preparation device according to claim 11, wherein
the device includes a control unit and a display section,
the arithmetic section determines the presence or absence of the drug solution on the optical path or the other optical path through which the light beam has passed from the luminous quantity of the light beam, and
the control unit displays the presence or absence of the drug solution on the display section.

13. The pathological specimen preparation device according to claim 12, wherein
the arithmetic section emits the light beam from the emission section when the reagent cartridge is attached, and determines the presence or absence of the drug solution on the optical path and the other optical path through which the light beam has passed, and
the control unit displays the presence or absence of the drug solution on the display section.

14. The pathological specimen preparation device according to claim 12, wherein
the arithmetic section calculates the value of the residual amount of the drug solution from the integrated value of the discharged amount of the drug solution by the cartridge operation section and the presence or absence of the drug solution calculated from the luminous quantity of the light beam, and
the control unit displays the value of the residual amount on the display section.

15. The pathological specimen preparation device according to claim 10, wherein the device includes
a washing section which can supply a washing solution to the substrate supported by the stage,
an electric field stirring section which can perform stirring by applying an electric field to the drug solution or the washing solution supplied to the substrate supported by the stage, and
a stage moving mechanism which can move the stage to the washing section, the electric field stirring section, and the cartridge operation section.

* * * * *